United States Patent
Levien et al.

(10) Patent No.: US 9,899,026 B2
(45) Date of Patent: *Feb. 20, 2018

(54) SPEECH RECOGNITION ADAPTATION SYSTEMS BASED ON ADAPTATION DATA

(75) Inventors: Royce A. Levien, Lexington, MA (US);
Richard T. Lord, Tacoma, WA (US);
Robert W. Lord, Seattle, WA (US);
Mark A. Malamud, Seattle, WA (US)

(73) Assignee: ELWHA LLC, Bellevue, WA (US)

( * ) Notice: Subject to any disclaimer, the term of this patent is extended or adjusted under 35 U.S.C. 154(b) by 57 days.

This patent is subject to a terminal disclaimer.

(21) Appl. No.: 13/564,651

(22) Filed: Aug. 1, 2012

(65) Prior Publication Data

US 2014/0039882 A1    Feb. 6, 2014

Related U.S. Application Data

(63) Continuation of application No. 13/564,650, filed on Aug. 1, 2012, now abandoned, and a
(Continued)

(51) Int. Cl.
*G10L 15/06* (2013.01)
*G10L 15/30* (2013.01)
(Continued)

(52) U.S. Cl.
CPC .............. *G10L 15/30* (2013.01); *G10L 15/06* (2013.01); *G10L 15/07* (2013.01); *G10L 15/063* (2013.01); *G10L 15/065* (2013.01)

(58) Field of Classification Search
CPC ...... G10L 15/06; G10L 15/063; G10L 15/065
See application file for complete search history.

(56) References Cited

U.S. PATENT DOCUMENTS

| | | | |
|---|---|---|---|
| 4,972,485 A | 11/1990 | Dautrich et al. | |
| 5,214,615 A | 5/1993 | Bauer | |

(Continued)

FOREIGN PATENT DOCUMENTS

| | | |
|---|---|---|
| CN | 10-1075434 A | 11/2007 |
| EP | 1 205 906 A1 | 5/2002 |
| EP | 2 405 422 A1 | 1/2012 |

OTHER PUBLICATIONS

PCT International Search Report; International App. No. PCT/US13/48640; dated Jan. 14, 2014; pp. 1-2.
(Continued)

*Primary Examiner* — Samuel G Neway

(57) ABSTRACT

The instant application includes computationally-implemented systems and methods that include managing adaptation data, wherein the adaptation data is correlated to at least one aspect of speech of a particular party, facilitating transmission of the adaptation data to a target device, wherein the adaptation data is configured to be applied to the target device to assist in execution of a speech-facilitated transaction, facilitating reception of adaptation result data that is based on at least one aspect of the speech-facilitated transaction between the particular party and the target device, determining whether to modify the adaptation data at least partly based on the adaptation result data, and facilitating transmission of at least a portion of modified adaptation data to a receiving device. In addition to the foregoing, other aspects are described in the claims, drawings, and text.

29 Claims, 46 Drawing Sheets

Related U.S. Application Data continuation-in-part of application No. 13/485,733, filed on May 31, 2012, and a continuation-in-part of application No. 13/485,738, filed on May 31, 2012, and a continuation-in-part of application No. 13/538,855, filed on Jun. 29, 2012, now Pat. No. 9,495,966, and a continuation-in-part of application No. 13/538,866, filed on Jun. 29, 2012, and a continuation-in-part of application No. 13/564,647, filed on Aug. 1, 2012, now Pat. No. 9,620,128, and a continuation-in-part of application No. 13/564,649, filed on Aug. 1, 2012, now Pat. No. 8,843,371.

(51) Int. Cl.
*G10L 15/07* (2013.01)
*G10L 15/065* (2013.01)

(56) References Cited

U.S. PATENT DOCUMENTS

| | | |
|---|---|---|
| 5,794,189 A | 8/1998 | Gould |
| 5,970,451 A | 10/1999 | Lewis et al. |
| 6,006,183 A | 12/1999 | Lai et al. |
| 6,493,506 B1 | 12/2002 | Schoner et al. |
| 6,823,306 B2 | 11/2004 | Reding et al. |
| 7,099,825 B1 | 8/2006 | Cook |
| 7,162,414 B2 | 1/2007 | Stanford |
| 7,174,298 B2 | 2/2007 | Sharma |
| 7,191,133 B1 | 3/2007 | Pettay |
| 7,194,409 B2 | 3/2007 | Balentine et al. |
| 7,219,058 B1 | 5/2007 | Rose et al. |
| 7,243,070 B2 | 7/2007 | Hoffmann et al. |
| 7,346,151 B2 | 3/2008 | Erhart et al. |
| 8,032,383 B1 | 10/2011 | Bhardwaj et al. |
| 8,082,147 B2 | 12/2011 | Parthasarathy et al. |
| 8,374,867 B2 | 2/2013 | Ljolje et al. |
| 8,843,371 B2 | 9/2014 | Levien et al. |
| 9,171,541 B2 | 10/2015 | Kennewick et al. |
| 2001/0039494 A1 | 11/2001 | Burchard et al. |
| 2002/0019734 A1 | 2/2002 | Bartosik |
| 2002/0065656 A1 | 5/2002 | Reding et al. |
| 2002/0091511 A1 | 7/2002 | Hellwig et al. |
| 2002/0138265 A1 | 9/2002 | Stevens et al. |
| 2002/0138274 A1 | 9/2002 | Sharma et al. |
| 2002/0147579 A1 | 10/2002 | Kushner et al. |
| 2002/0188446 A1 | 12/2002 | Gao et al. |
| 2003/0050783 A1 | 3/2003 | Yoshizawa |
| 2003/0088421 A1 | 5/2003 | Maes et al. |
| 2003/0093281 A1 | 5/2003 | Geilhufe et al. |
| 2003/0115289 A1 | 6/2003 | Chinn et al. |
| 2003/0191639 A1 | 10/2003 | Mazza |
| 2004/0064316 A1 | 4/2004 | Gallino |
| 2004/0088162 A1 | 5/2004 | He et al. |
| 2004/0148165 A1 | 7/2004 | Beyerlein |
| 2004/0158457 A1 | 8/2004 | Veprek et al. |
| 2004/0162726 A1 | 8/2004 | Chang |
| 2004/0176953 A1 | 9/2004 | Coyle et al. |
| 2004/0199388 A1 | 10/2004 | Armbruster et al. |
| 2004/0203651 A1 | 10/2004 | Qu et al. |
| 2005/0049868 A1 | 3/2005 | Busayapongchai |
| 2005/0058435 A1 | 3/2005 | Chung et al. |
| 2005/0144255 A1* | 6/2005 | Hennecke ............ H04M 3/493 709/217 |
| 2005/0152565 A1 | 7/2005 | Jouppi et al. |
| 2006/0121949 A1 | 6/2006 | Awada et al. |
| 2007/0136069 A1 | 6/2007 | Veliu et al. |
| 2007/0233487 A1 | 10/2007 | Cohen et al. |
| 2008/0015848 A1 | 1/2008 | Arizmendi et al. |
| 2008/0082332 A1 | 4/2008 | Mallett et al. |
| 2009/0043582 A1 | 2/2009 | Zhou et al. |
| 2009/0063144 A1 | 3/2009 | Rose et al. |
| 2009/0204392 A1* | 8/2009 | Ishikawa ............... G10L 15/063 704/10 |
| 2009/0265217 A1 | 10/2009 | Aurenz |
| 2009/0290689 A1 | 11/2009 | Watanabe et al. |
| 2010/0070277 A1 | 3/2010 | Arakawa et al. |
| 2010/0086108 A1 | 4/2010 | Jaiswal et al. |
| 2010/0131273 A1 | 5/2010 | Aley-Raz et al. |
| 2010/0204988 A1 | 8/2010 | Xu et al. |
| 2010/0283829 A1 | 11/2010 | De Beer et al. |
| 2011/0029307 A1 | 2/2011 | Parthasarathy et al. |
| 2011/0086631 A1 | 4/2011 | Park et al. |
| 2011/0119059 A1 | 5/2011 | Ljolje et al. |
| 2011/0288863 A1 | 11/2011 | Rasmussen |
| 2012/0010887 A1 | 1/2012 | Boregowda et al. |
| 2012/0014568 A1 | 1/2012 | Conwell et al. |
| 2013/0325441 A1 | 12/2013 | Levien et al. |
| 2013/0325446 A1 | 12/2013 | Levien et al. |
| 2013/0325447 A1 | 12/2013 | Levien et al. |
| 2013/0325448 A1 | 12/2013 | Levien et al. |
| 2013/0325449 A1 | 12/2013 | Levien et al. |
| 2013/0325450 A1 | 12/2013 | Levien et al. |
| 2013/0325451 A1 | 12/2013 | Levien et al. |
| 2013/0325452 A1 | 12/2013 | Levien et al. |
| 2013/0325453 A1 | 12/2013 | Levien et al. |
| 2013/0325454 A1 | 12/2013 | Levien et al. |
| 2013/0325459 A1 | 12/2013 | Levien et al. |
| 2013/0325474 A1 | 12/2013 | Levien et al. |
| 2014/0039881 A1 | 2/2014 | Levien et al. |
| 2014/0039882 A1 | 2/2014 | Levien et al. |

OTHER PUBLICATIONS

Yuasa et al.; "Operating Networked Appliances Using Gaze Information and Voice Recognition"; Proceedings of the Third IASTED International Conference, Human-Computer Interaction, bearing a date of Mar. 17-19, 2008; pp. 107-112; Innsbruck Austria.

European Patent Office, Supplementary European Search Report, Pursuant to Rule 62 EPC; App. No. EP 13808577; dated Jan. 19, 2016 (received by our Agent on Jan. 25, 2016); pp. 1-2.

The State Intellectual Property Office of P.R.C., First Office Action, App. No. 2013/80034866.8 (Based on PCT Patent Application No. PCT/US2013/048640); dated Dec. 2, 2016 (received by our Agent on Dec. 12, 2016); pp. 1-5 (machine translation, as provided).

Chinese State Intellectual Property Office, Notification of the Second Office Action, App. No. 201380034866.8 (Based on PCT Patent Application No. PCT/US2013/048640); dated Aug. 22, 2017 (received by our Agent on Aug. 29, 2017); pp. 1-5 (machine translation provided).

* cited by examiner

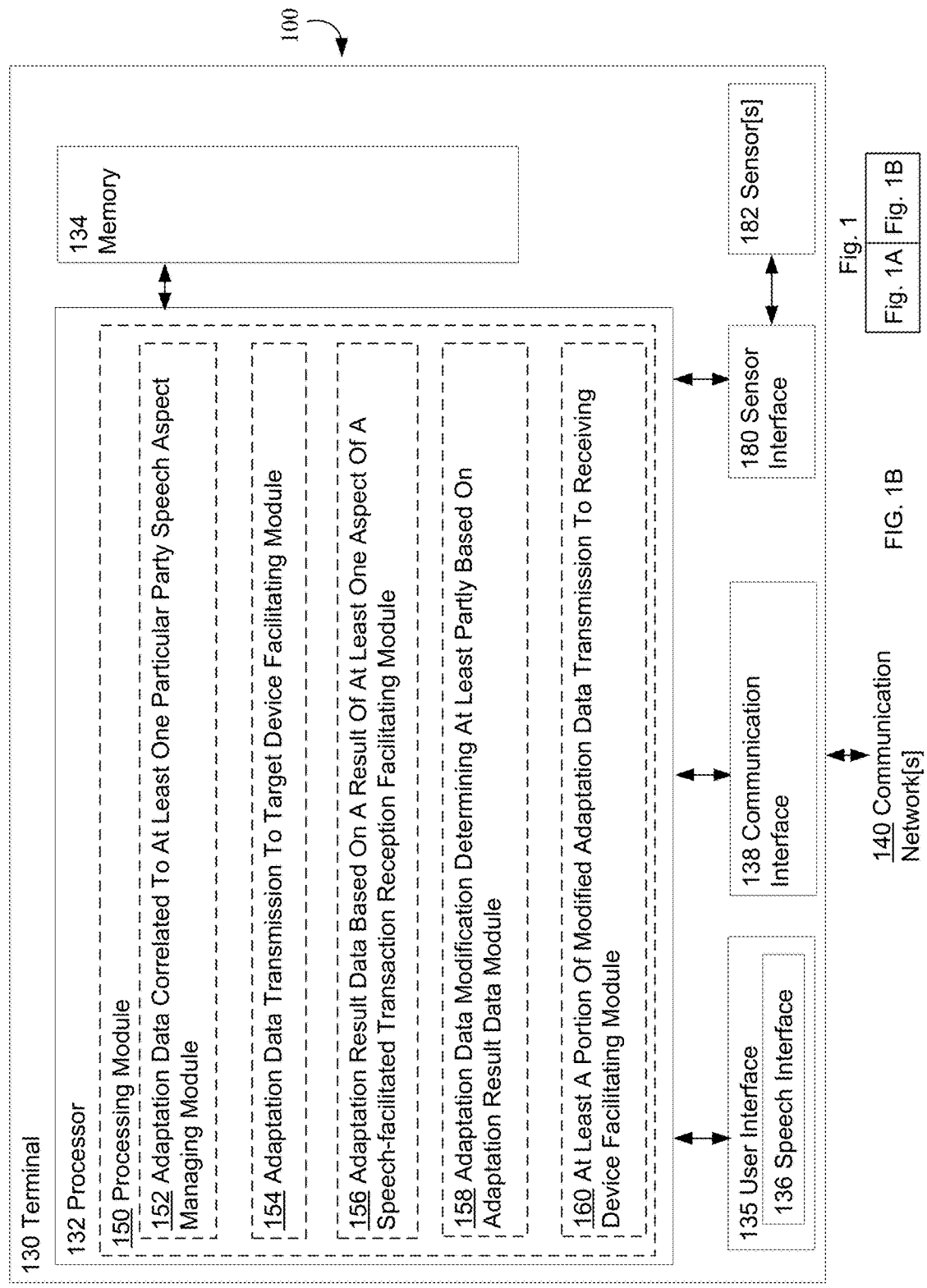

152 Adaptation Data Correlated To At Least One Particular Party Speech Aspect Managing Module 202 Adaptation Data Configured To Assist In Carrying Out At Least A Portion Of A Speech-facilitated Transaction And Correlated To At Least One Particular Party Speech Aspect Managing Module 204 Adaptation Data Configured To Adapt A Speech Recognition Component Of A Target Device Configured To Carry Out A Speech-facilitated Transaction And Correlated To At Least One Particular Party Speech Aspect Managing Module 206 Adaptation Data Comprising A Pronunciation Dictionary Configured To Supplement A Speech Recognition Component Of The Target Device Configured To Carry Out A Speech-facilitated Transaction And Correlated To At Least One Particular Party Speech Aspect Managing Module 208 Adaptation Data Comprising A Pronunciation Dictionary Configured To Supplement A Pronunciation Dictionary Of The Speech Recognition Component Of The Target Device Configured To Carry Out A Speech-facilitated Transaction And Correlated To At Least One Particular Party Speech Aspect Managing Module 210 Adaptation Data Comprising A Pronunciation Dictionary Configured To Replace At Least One Word Of A Pronunciation Dictionary Of The Speech Recognition Component Of The Target Device Configured To Carry Out A Speech-facilitated Transaction And Correlated To At Least One Particular Party Speech Aspect Managing Module 212 Adaptation Data Comprising A Pronunciation Dictionary Configured To Replace At Least One Word Of A Pronunciation Dictionary Of The Speech Recognition Component Of The Target Device Configured To Carry Out A Speech-facilitated Transaction And Based On At Least One Pronunciation Of A Word By The Particular Party Managing Module

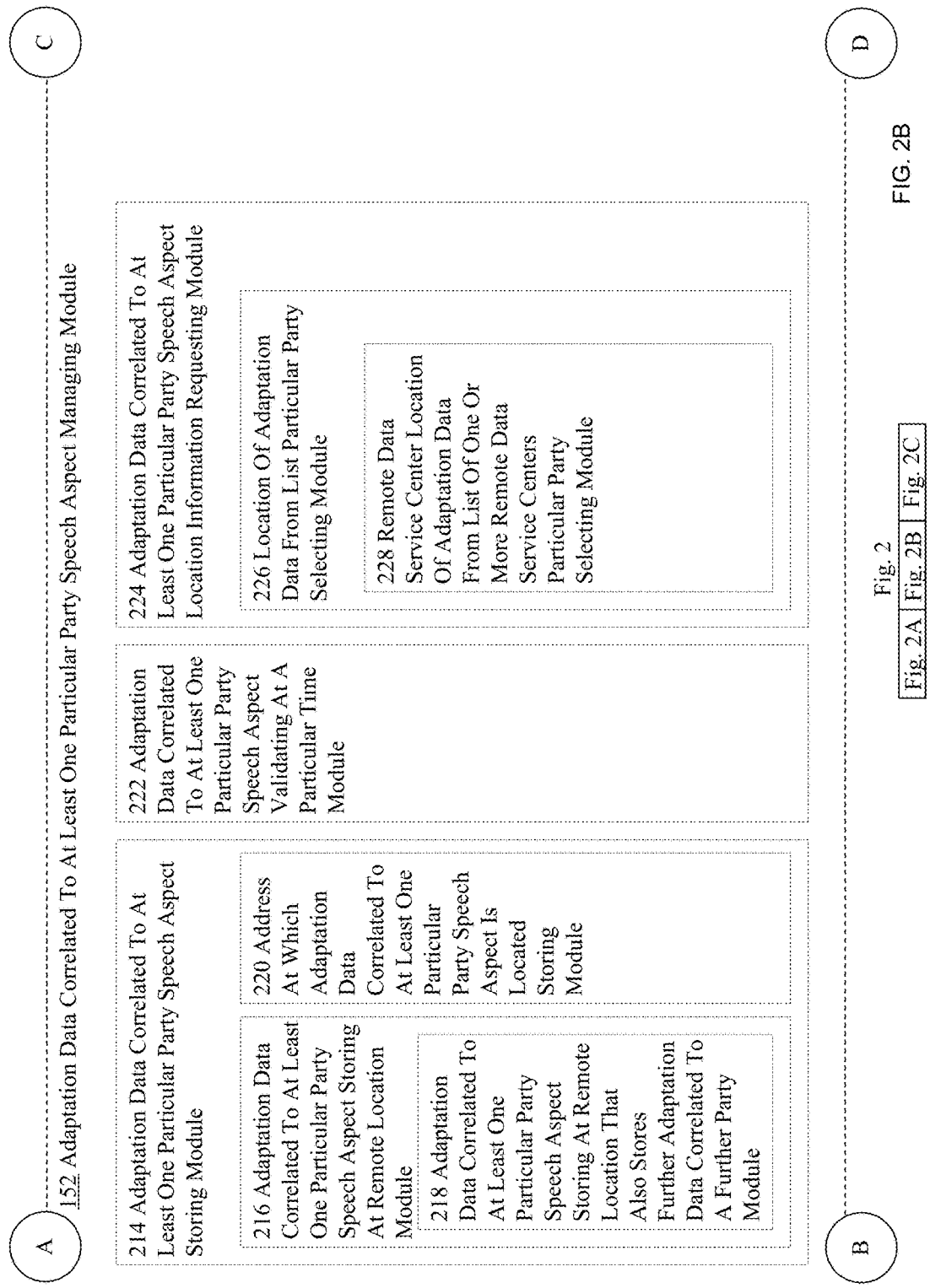

FIG. 2C

152 Adaptation Data Correlated To At Least One Particular Party Speech Aspect Managing Module 230 Adaptation Data Correlated To At Least One Particular Party Speech Aspect Selectively Providing Viewing Authorization Module 232 Adaptation Data Correlated To At Least One Particular Party Speech Aspect Selectively Providing Retrieval Authorization Module

Fig. 2

| Fig. 2A | Fig. 2B | Fig. 2C |

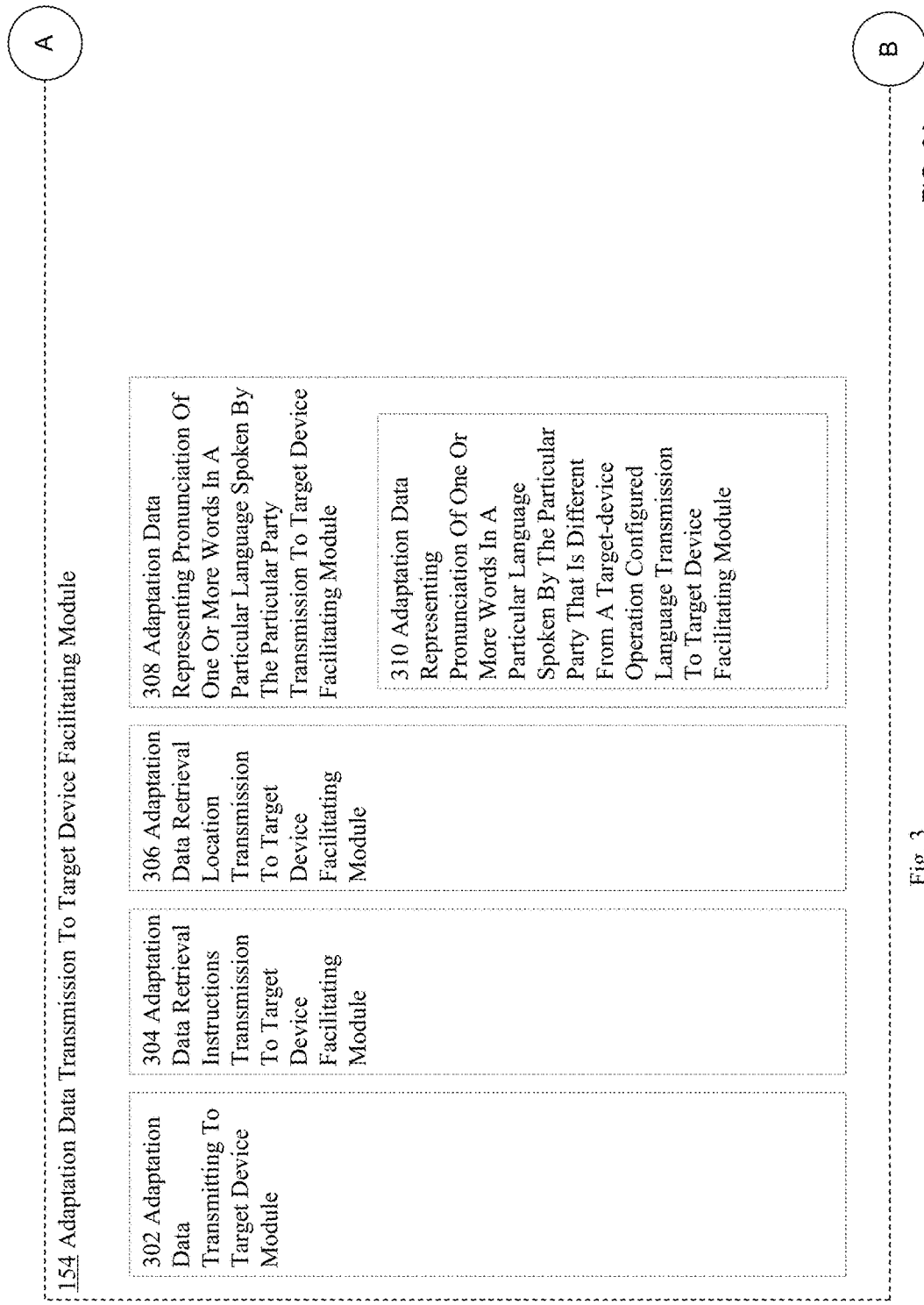

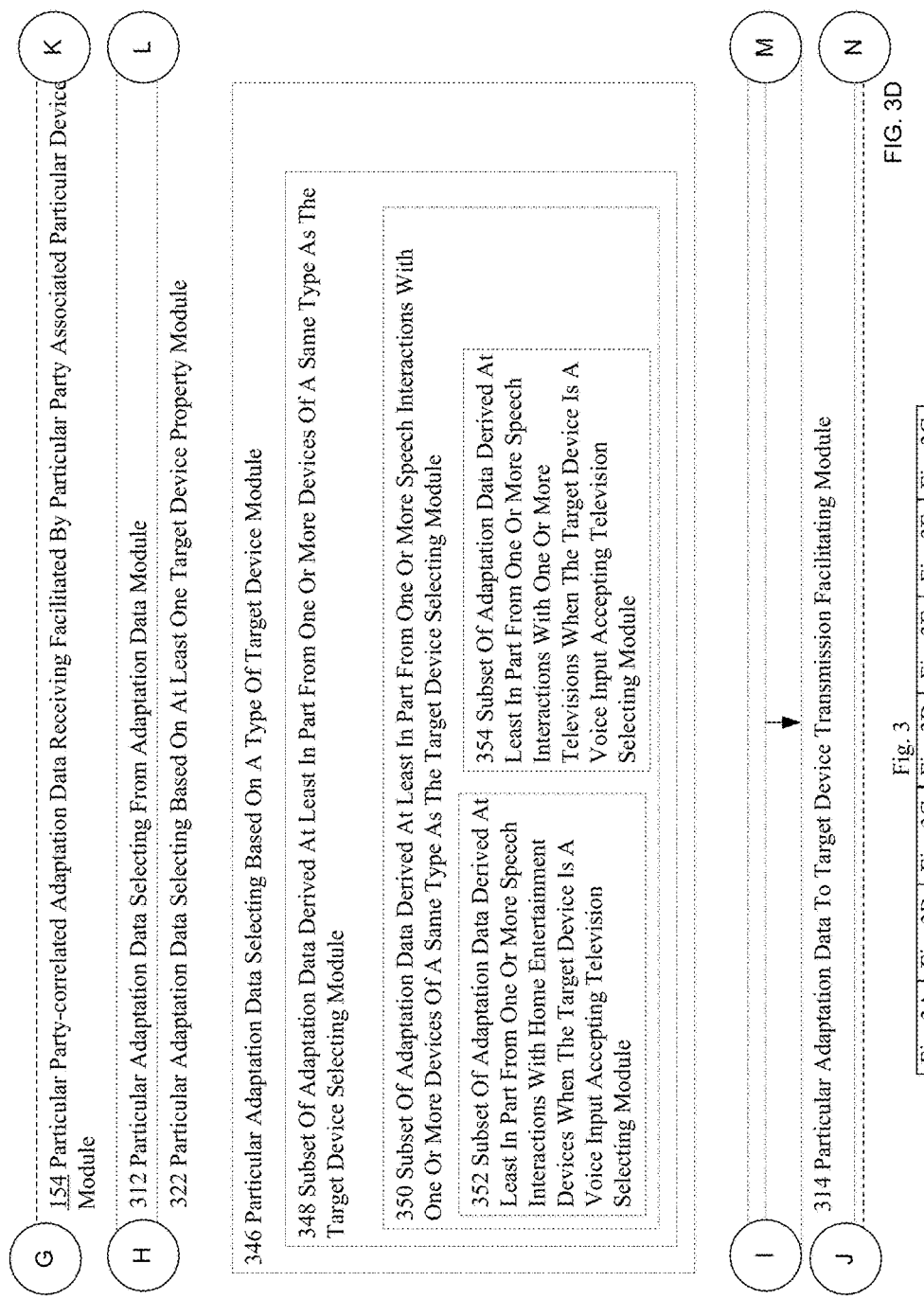

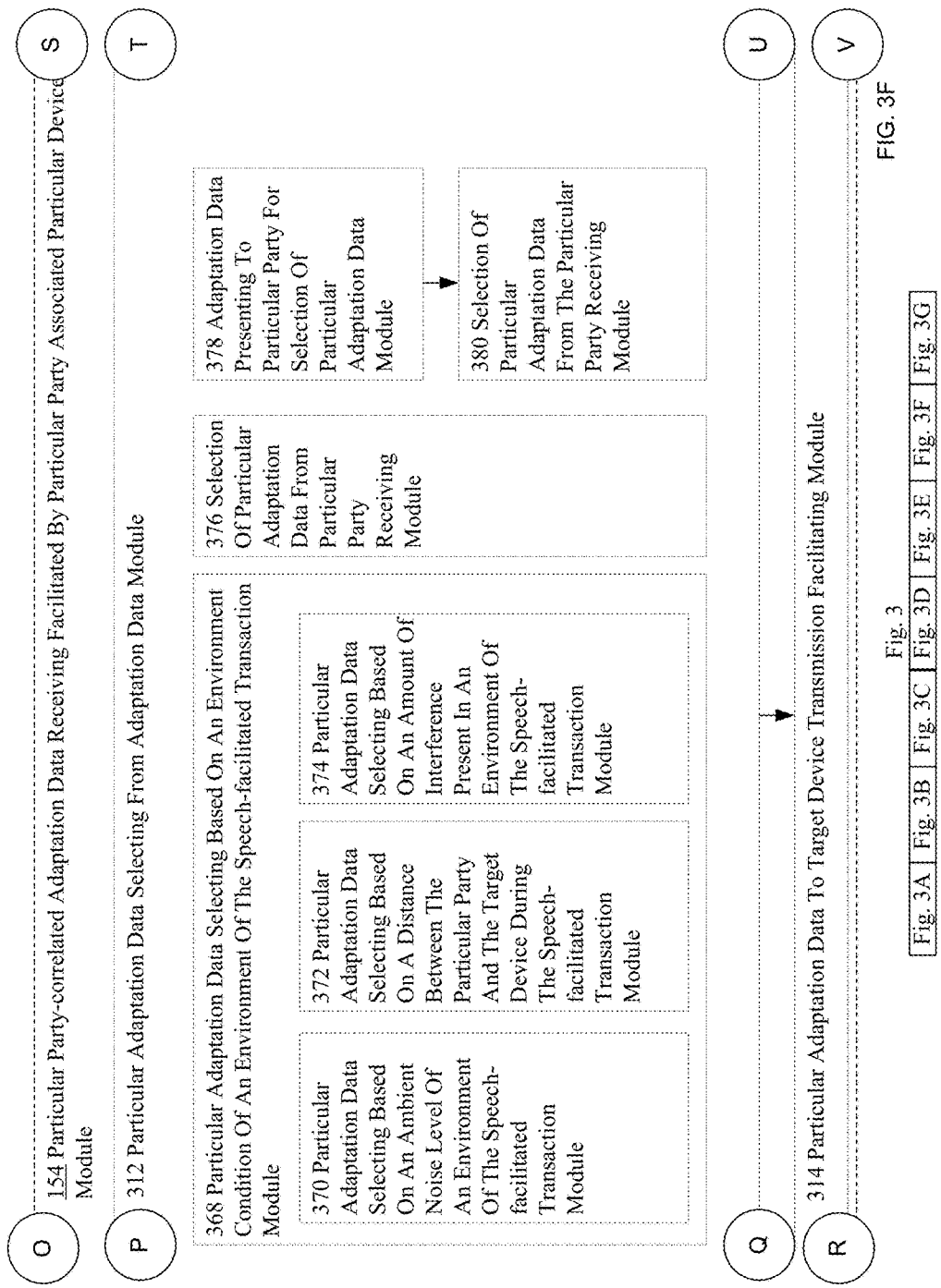

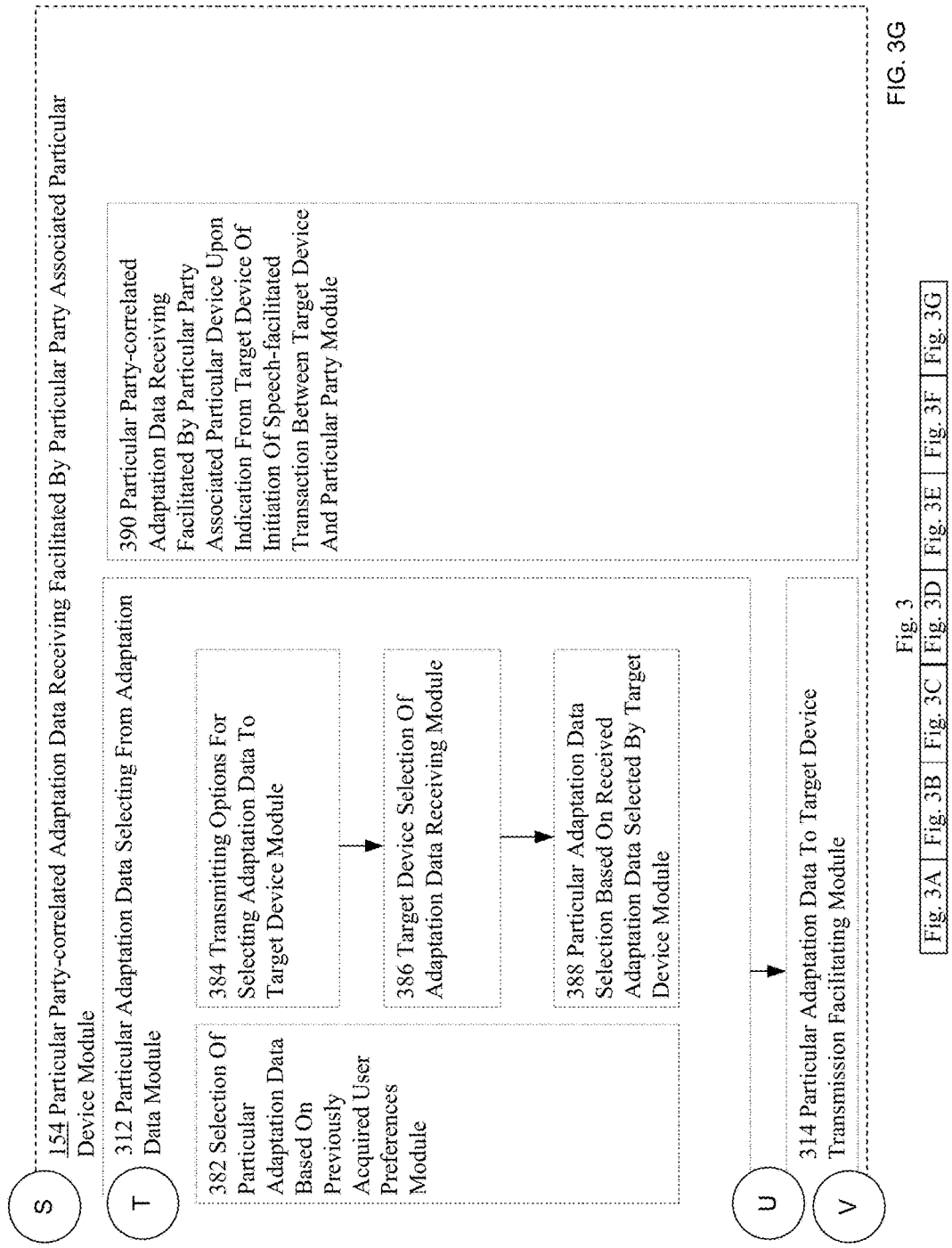

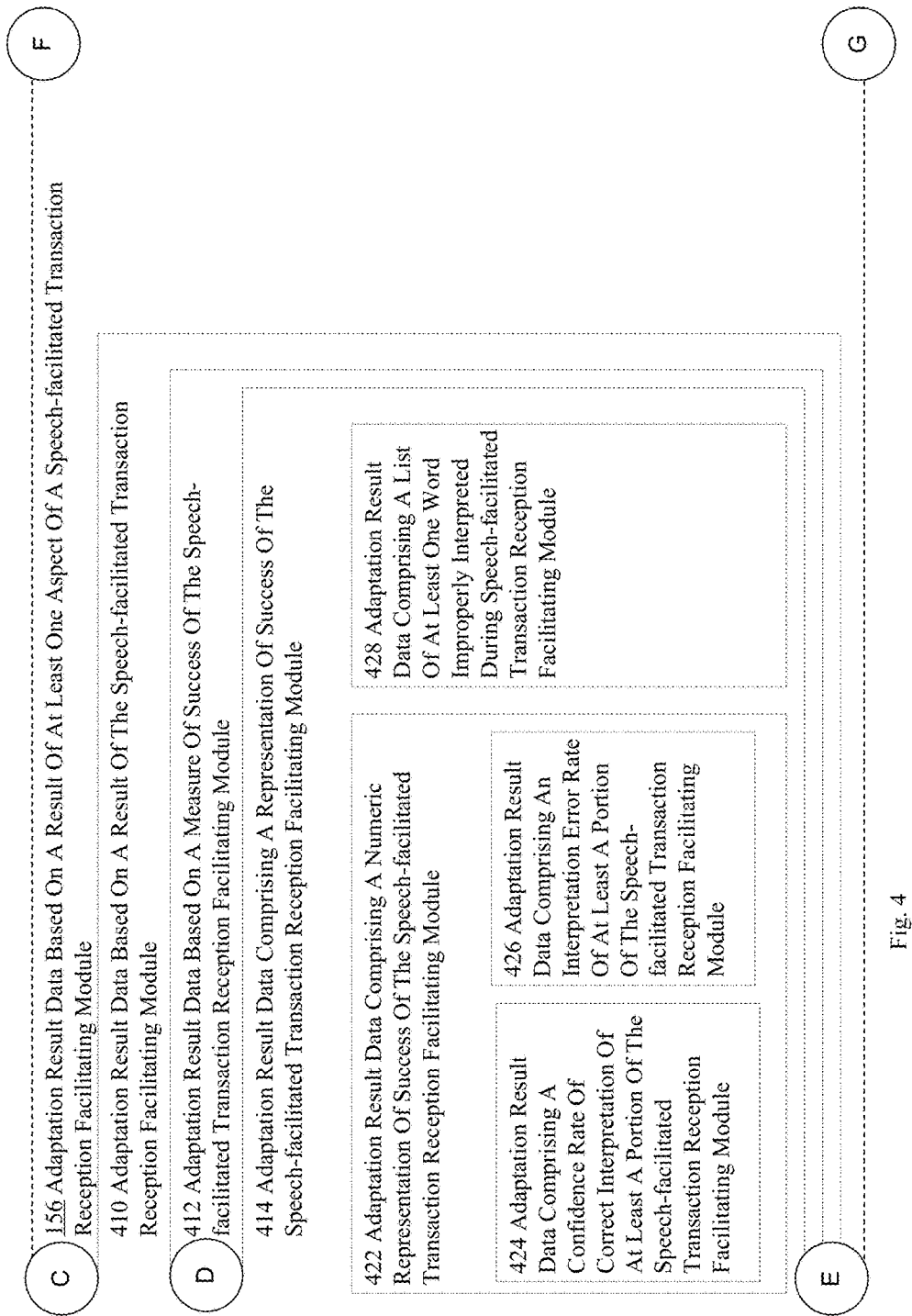

156 Adaptation Result Data Based On A Result Of At Least One Aspect Of A Speech-facilitated Transaction Reception Facilitating Module

430 Adaptation Result Data Comprising A List Of At Least One Word Improperly Interpreted More Than Once During The Speech-facilitated Transaction Reception Facilitating Module

432 Adaptation Result Data Comprising A Table Of At Least One Word Improperly Interpreted And A Number Of Times The At Least One Word Was Improperly Interpreted During The Speech-facilitated Transaction Reception Facilitating Module

434 Adaptation Result Data Comprising A List Of At Least One Question Asked By The Target Device At Least Twice Consecutively Reception Facilitating Module

436 Adaptation Result Data Comprising A List Of At Least One Question Asked By The Target Device At Least Twice Consecutively And One Or More Answers Given To The At Least One Question Reception Facilitating Module

438 Adaptation Result Data Comprising A Table Of At Least One Question Asked By The Target Device And At Least One Corresponding Answer Given By The Particular Party Reception Facilitating Module

FIG. 4D

| Fig. 4A | Fig. 4B | Fig. 4C | Fig. 4D | Fig. 4E |

Fig. 4

156 Adaptation Result Data Based On A Result Of At Least One Aspect Of A Speech-facilitated Transaction Reception Facilitating Module

440 Adaptation Result Data Comprising At Least One Phoneme Appearing In At Least One Word That Was Improperly Interpreted During The Speech-facilitated Transaction Reception Facilitating Module

442 Adaptation Result Data Comprising At Least One Phoneme Appearing In More Than One Word That Was Improperly Interpreted During The Speech-facilitated Transaction Reception Facilitating Module

444 Adaptation Result Data Comprising At Least One Phoneme Appearing In More Than One Unique Word That Was Improperly Interpreted During The Speech-facilitated Transaction Reception Facilitating Module

446 Adaptation Result Data Based On A Result Of At Least One Aspect Of A Speech-facilitated Transaction Reception Facilitating Upon Conclusion Of Speech-facilitated Transaction Module

448 Determining A Conclusion Of A Speech Facilitated Transaction Based On Facilitating Reception Of Adaptation Result Data Module

450 Adaptation Result Data Based On A Result Of At Least One Aspect Of A Speech-facilitated Transaction Reception Facilitating During Speech-facilitated Transaction Module

452 Adaptation Result Data Based On A Result Of At Least One Aspect Of A Speech-facilitated Transaction Reception Facilitating Prior To Completing The Speech-facilitated Transaction Module

158 Adaptation Data Modification Determining At Least Partly Based On Adaptation Result Data Module 512 Adaptation Data Modifying At Least Partly Based On Adaptation Result Data Module 514 Pronunciation Dictionary Modifying At Least One Word At Least Partly Based On Received Adaptation Result Data Comprising At Least One Word That Was Improperly Interpreted And A Pronunciation Of The At Least One Word By The Particular Party Module 516 Pronunciation Dictionary Replacing At Least One Word Received In Adaptation Result Data With Pronunciation Received As Adaptation Data Module

Fig. 5

| Fig. 5A | Fig. 5B |

FIG. 5B

160 At Least A Portion Of Modified Adaptation Data Transmission To Receiving Device Facilitating Module 616 At Least A Portion Of Modified Adaptation Data Transmission To A Device That Is A Replacement For The Target Device Facilitating Module 618 At Least A Portion Of Modified Adaptation Data Transmission To Receiving Device Connected To The Target Device Via A Network Facilitating Module 620 At Least A Portion Of Modified Adaptation Data Transmission To Receiving Device Communicating On A Same Network As The Target Device Facilitating Module 622 At Least A Portion Of Modified Adaptation Data Transmission To Receiving Device Configured To Perform A Same Function As The Target Device Facilitating Module 624 At Least A Portion Of Modified Adaptation Data Transmission To Receiving Device Of A Same Type As The Target Device Facilitating Module

Fig. 6

| Fig. 6A | Fig. 6B | Fig. 6C | Fig. 6D |

FIG. 6B

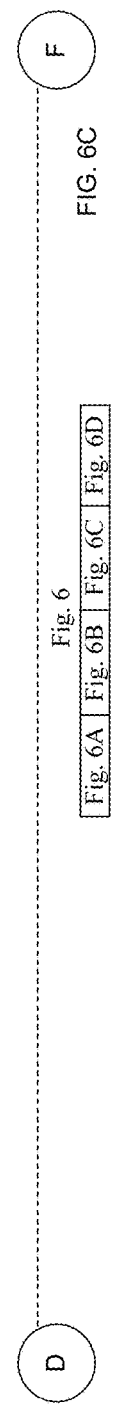

160 At Least A Portion Of Modified Adaptation Data Transmission To Receiving Device Facilitating Module 626 Modified Adaptation Data Transmitting From Particular Device To Receiving Device Module 628 Modified Adaptation Data Transmitting From Particular Device Configured To Communicate On A Same Network As The Receiving Device Module 630 Modified Adaptation Data Transmitting From Particular Device Configured To Communicate With Receiving Device And Target Device Module 632 Modified Adaptation Data Stored On Particular Device Transmitting From Particular Device To Receiving Device Module 634 Adaptation Data, Said Adaptation Data Modified By Incrementing A Counter, As At Least A Portion Of Modified Adaptation Data Transmission To Receiving Device Facilitating Module 636 At Least A Portion Of Modified Adaptation Data, Said Modified Adaptation Data Different Than The Adaptation Data, Transmission To Receiving Device Facilitating Module 638 At Least A Portion Of Modified Adaptation Data Based On The Adaptation Data Transmission To Receiving Device Facilitating Module

Fig. 6

| Fig. 6A | Fig. 6B | Fig. 6C | Fig. 6D |

FIG. 6C

160 At Least A Portion Of Modified Adaptation Data Transmission To Receiving Device Facilitating Module

| 640 At Least A Portion Of Modified Adaptation Data, Said Modified Adaptation Data Including At Least A Portion Of The Adaptation Result Data, Transmission To Receiving Device Facilitating Module | 642 At Least A Portion Of Modified Adaptation Data, Said Modified Adaptation Data At Least Partially Based On Applying The Adaptation Result Data, Transmission To Receiving Device Facilitating Module |

Fig. 6

| Fig. 6A | Fig. 6B | Fig. 6C | Fig. 6D |

FIG. 6D

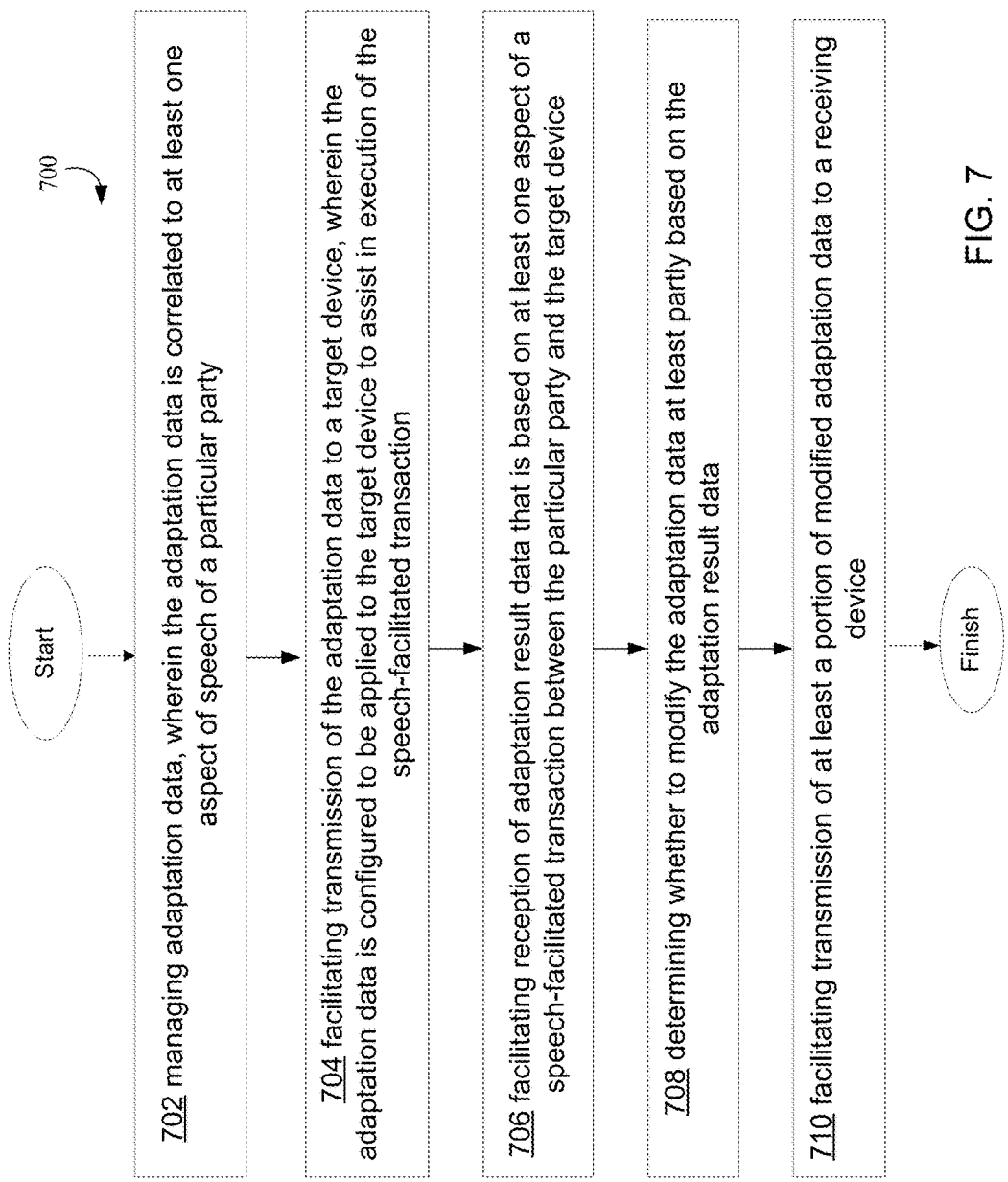

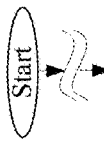

702 managing adaptation data, wherein the adaptation data is correlated to at least one aspect of speech of a particular party 802 managing data configured to assist in carrying out at least a portion of a speech transaction conducted by the particular party, wherein the adaptation data is correlated to at least one aspect of speech of the particular party 804 managing data comprising instructions for adapting a speech recognition component of a target device configured to carry out at least a portion of the speech transaction conducted by the particular party, wherein the adaptation data is correlated to at least one aspect of speech of the particular party 806 managing data comprising a pronunciation dictionary that is configured to supplement a speech recognition component of the target device configured to carry out at least a portion of the speech transaction conducted by the particular party, wherein the adaptation data is correlated to at least one aspect of speech of the particular party 808 managing data comprising a pronunciation dictionary that is configured to supplement a pronunciation dictionary of the speech recognition module of the target device configured to carry out at least a portion of the speech-facilitated transaction conducted by the particular party, wherein the adaptation data is correlated to at least one aspect of speech of the particular party 810 managing data comprising a pronunciation dictionary that is configured to replace at least one word of a speech recognition component pronunciation dictionary of the target device configured to carry out at least a portion of the speech-facilitated transaction conducted by the particular party, wherein the adaptation data is correlated to at least one aspect of speech of the particular party

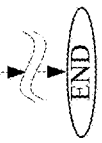

FIG. 8A

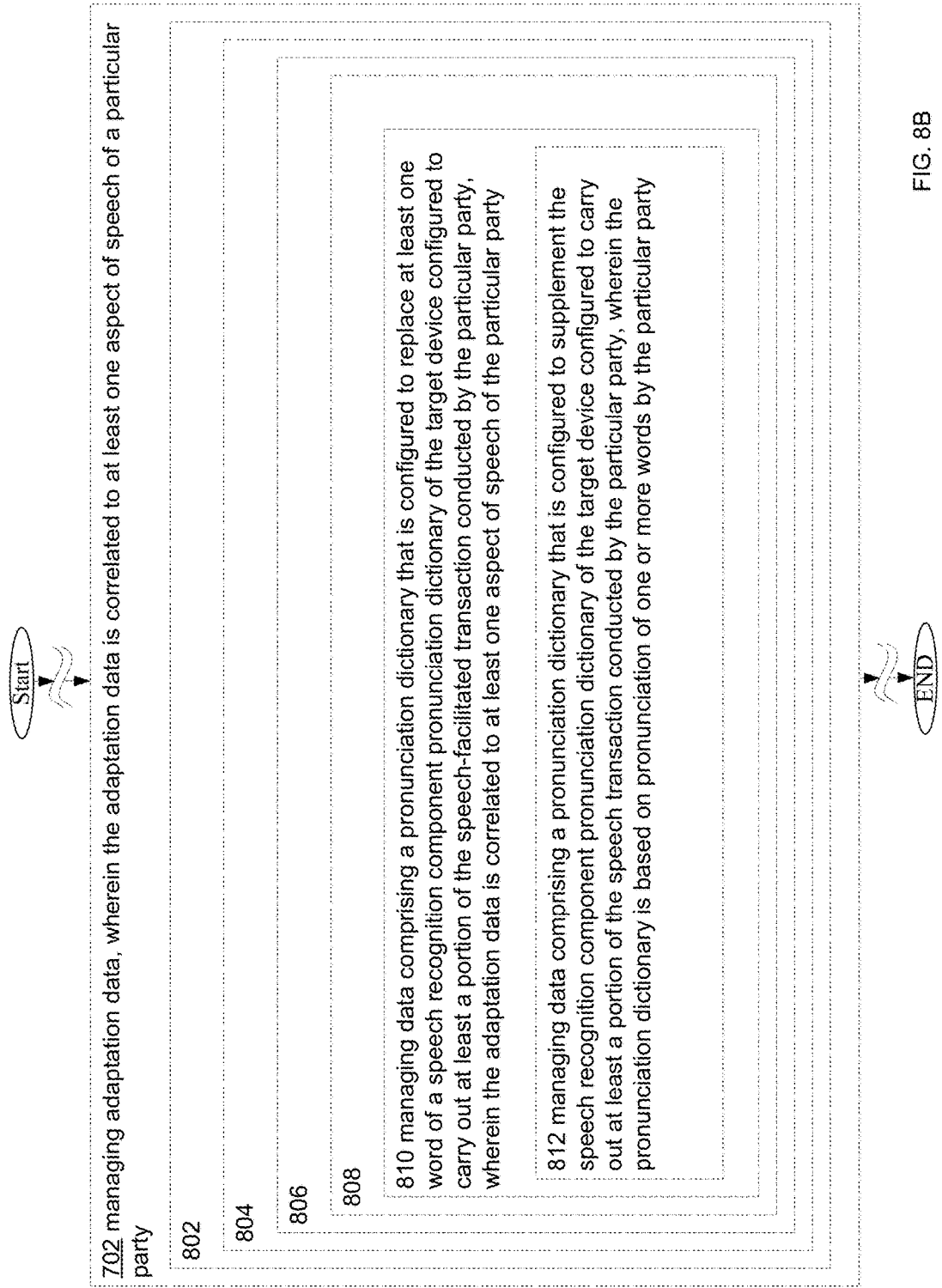

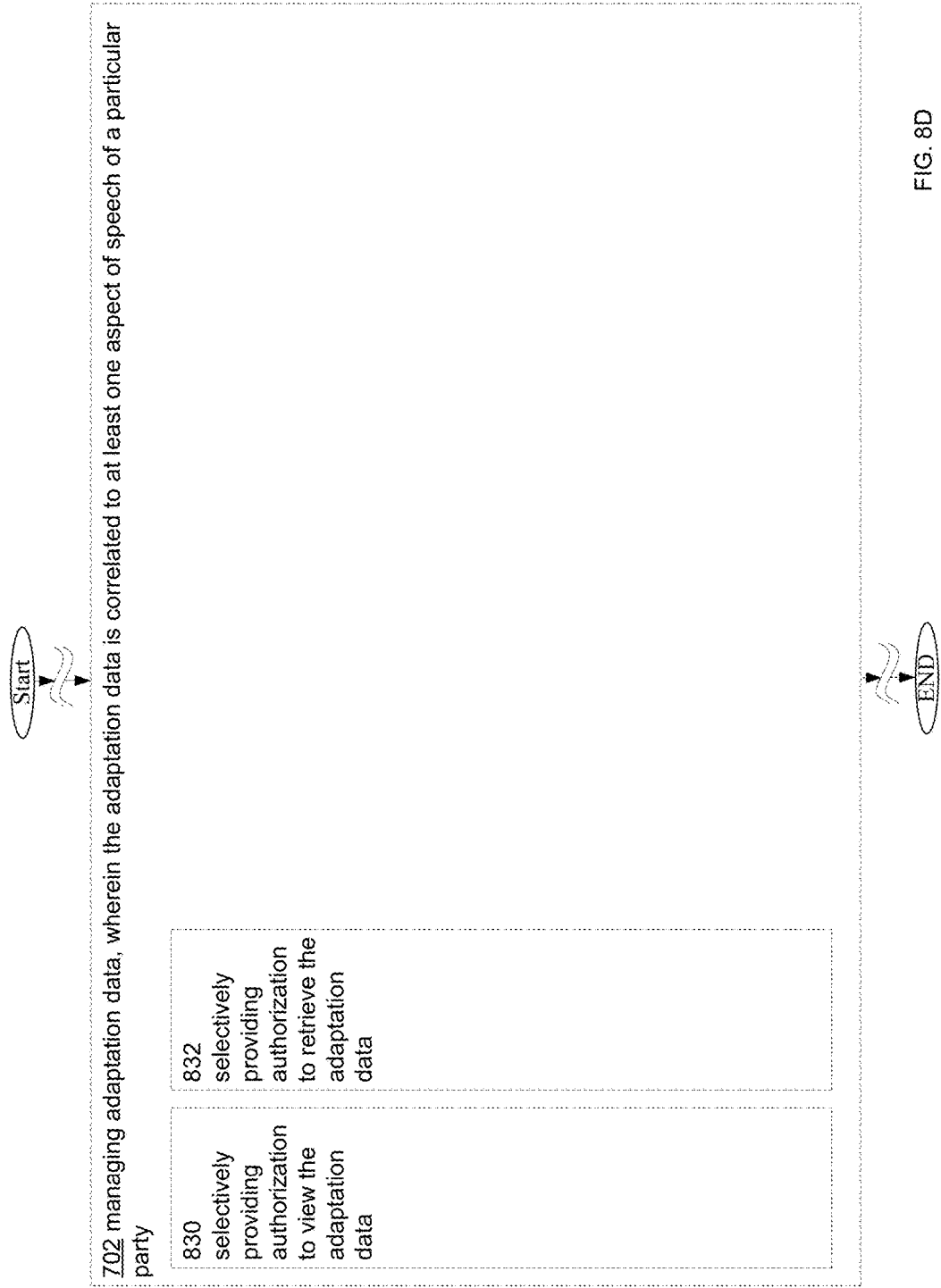

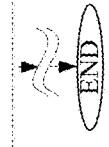

FIG. 9A

704 Facilitating Transmission Of The Adaptation Data To A Target Device, Wherein The Adaptation Data Is Configured To Be Applied To The Target Device To Assist In Execution Of The Speech-facilitated Transaction

| 902 transmitting the adaptation data to the target device, wherein the adaptation data is configured to be applied to the target device to assist in execution of the speech-facilitated transaction | 904 transmitting instructions for retrieving the adaptation data to the target device, wherein the adaptation data is configured to be applied to the target device to assist in execution of the speech-facilitated transaction | 906 transmitting a location at which the adaptation data is configured to be transmitted, said location transmitted to the target device, wherein the adaptation data is configured to be applied to the target device to assist in execution of the speech-facilitated transaction | 908 facilitating transmission of the adaptation data to a target device, wherein the adaptation data represents a pronunciation of one or more words in a particular language spoken by the particular party |
|---|---|---|---|
| | | | 910 facilitating transmission of the adaptation data to a target device, wherein the adaptation data represents a pronunciation of one or more words in a particular language spoken by the particular party that is different from a language for which the target device is designed to operate |

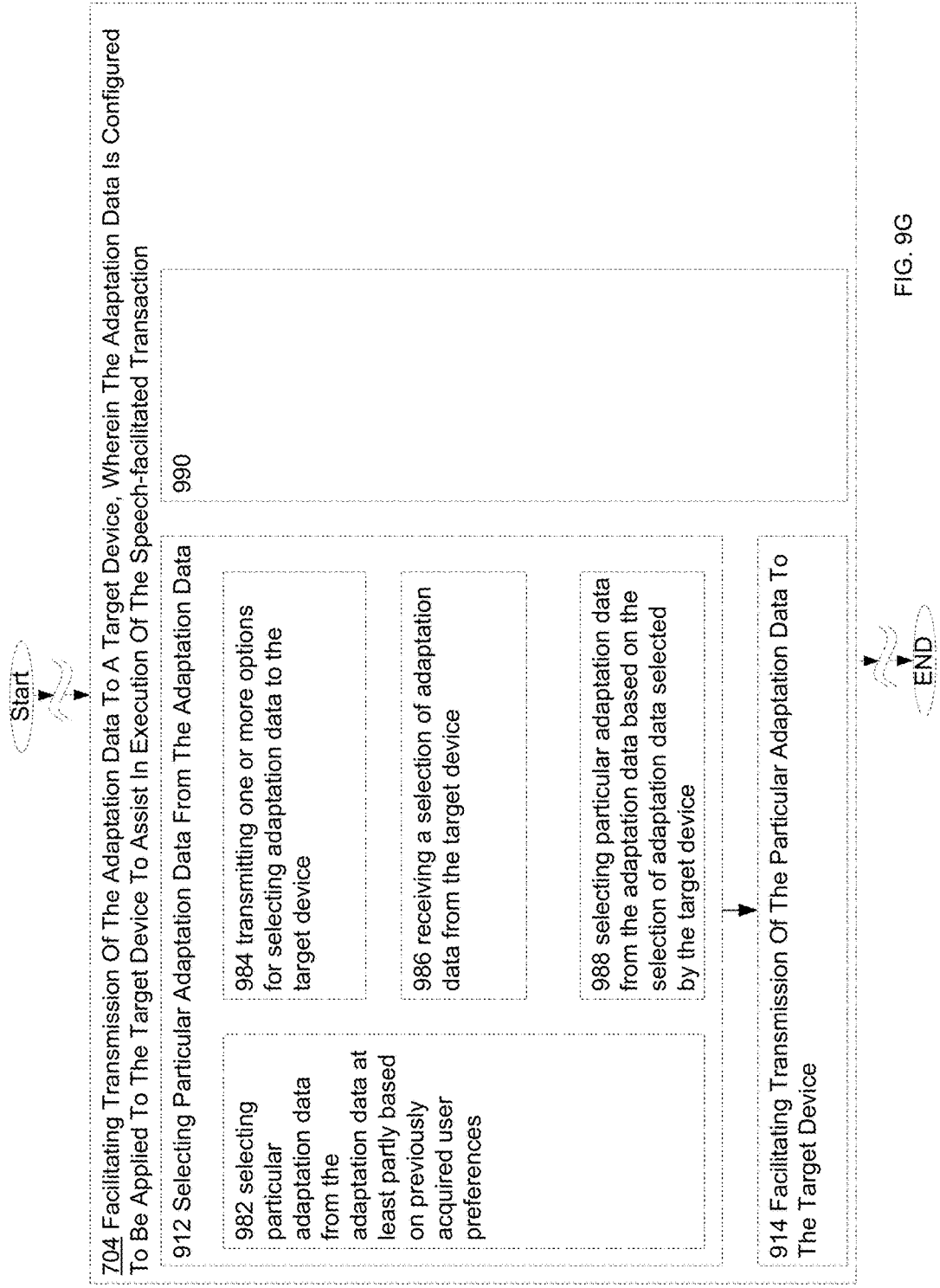

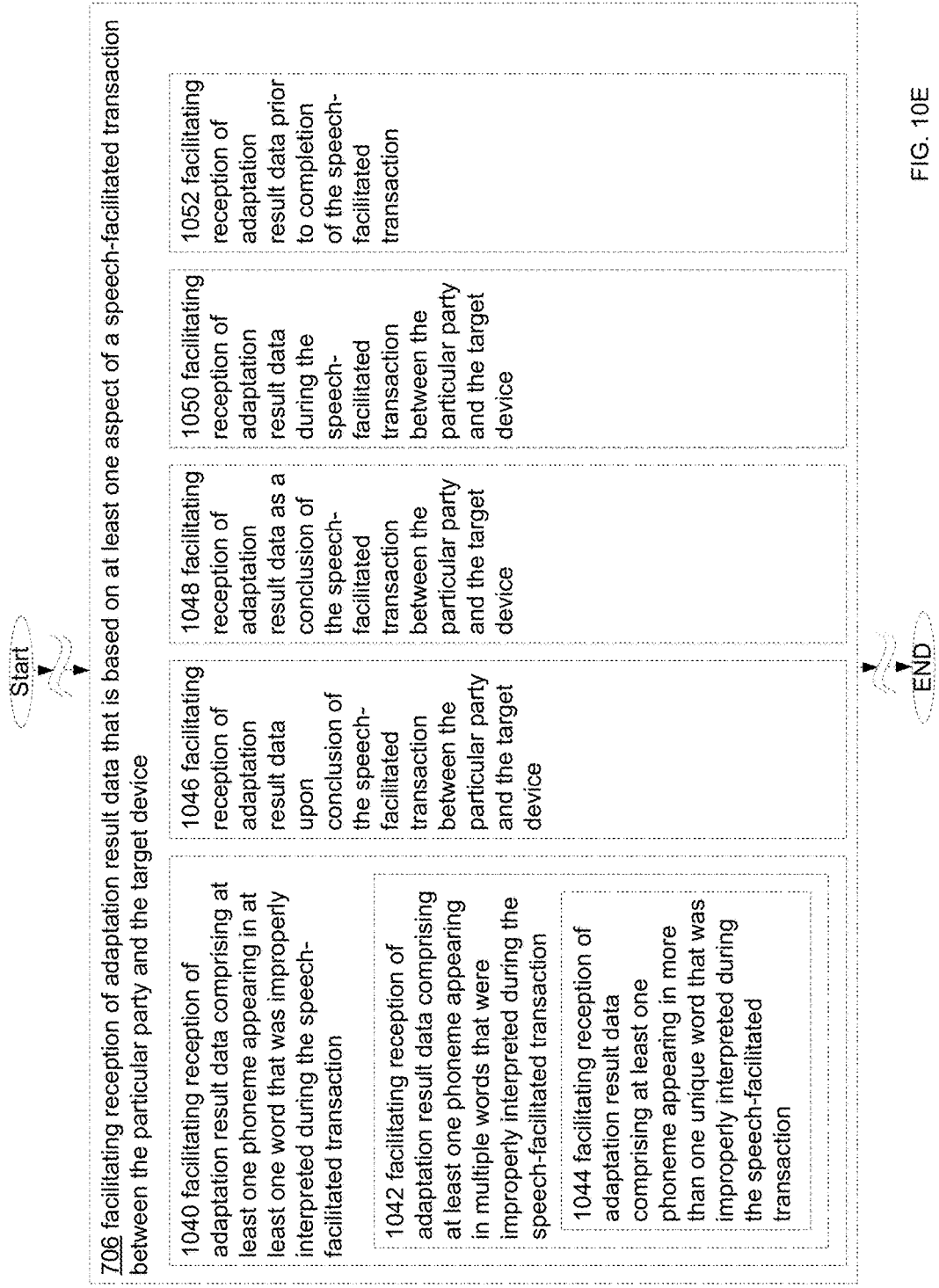

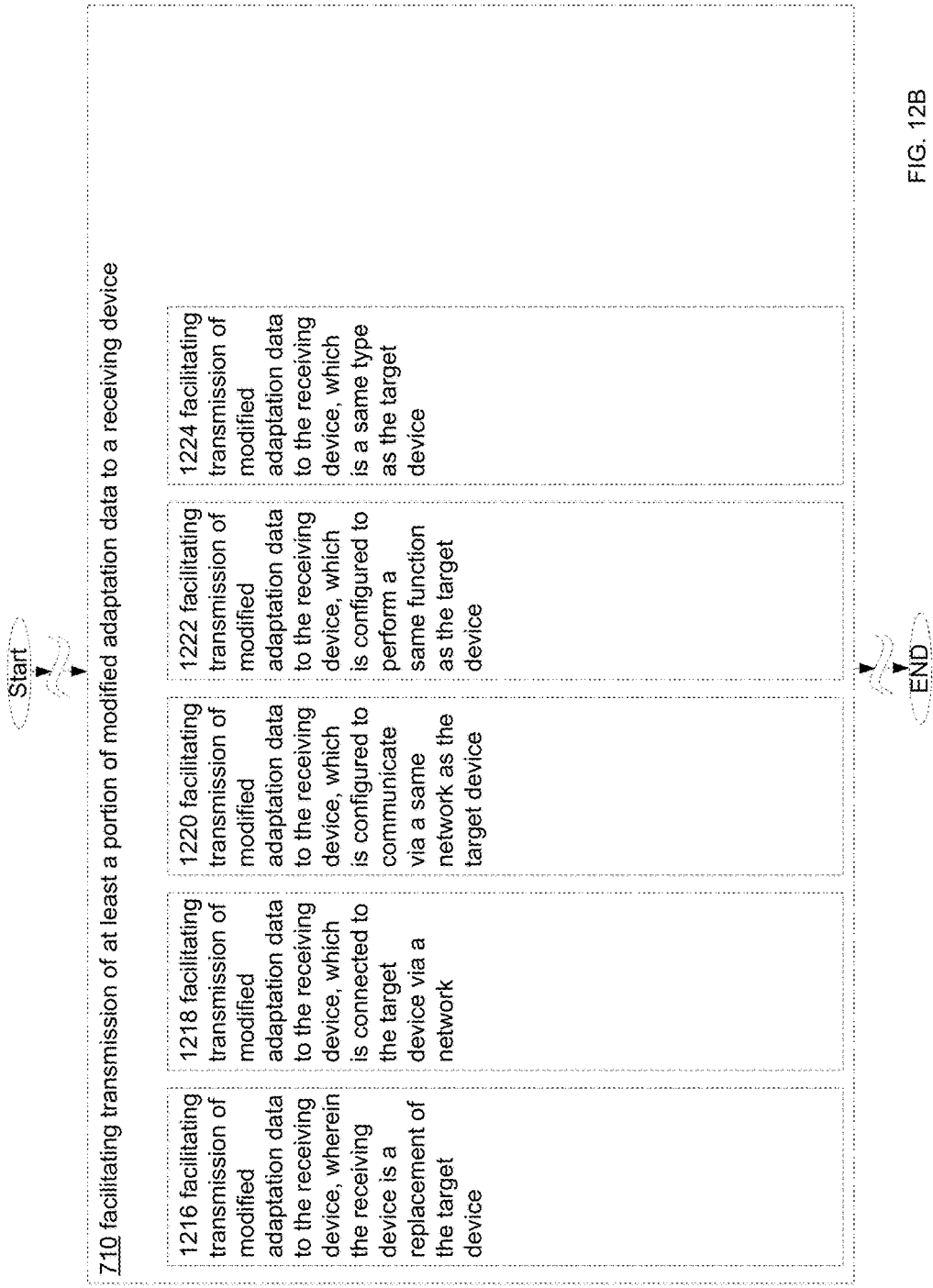

SPEECH RECOGNITION ADAPTATION SYSTEMS BASED ON ADAPTATION DATA

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

RELATED APPLICATIONS

For purposes of the USPTO extra-statutory requirements, the present application constitutes a continuation of U.S. patent application Ser. No. 13/564,650, now abandoned entitled SPEECH RECOGNITION ADAPTATION SYSTEMS BASED ON ADAPTATION DATA, naming Royce A. Levien, Richard T. Lord, Robert W. Lord, Mark A. Malamud as inventors, filed 1 Aug. 2012, which is currently or is an application of which a currently application is entitled to the benefit of the filing date.

For purposes of the USPTO extra-statutory requirements, the present application constitutes a continuation-in-part of U.S. patent application Ser. No. 13/485,733, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 31 May 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/485,738, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 31 May 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/538,855, now U.S. Pat. No. 9,495,966 entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 29 Jun. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/538,866, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 29 Jun. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/564,647, now U.S. Pat. No. 9,620,128 entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 1 Aug. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/564,649, now U.S. Pat. No. 8,843,371 entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 1 Aug. 2012, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

BACKGROUND

This application is related to portable speech adaptation data.

SUMMARY

A computationally implemented method includes, but is not limited to, managing adaptation data, wherein the adaptation data is correlated to at least one aspect of speech of a particular party, facilitating transmission of the adaptation data to a target device, wherein the adaptation data is configured to be applied to the target device to assist in execution of a speech-facilitated transaction, facilitating reception of adaptation result data that is based on at least one aspect of the speech-facilitated transaction between the particular party and the target device, determining whether to modify the adaptation data at least partly based on the adaptation result data, and facilitating transmission of at least a portion of modified adaptation data to a receiving device. In addition to the foregoing, other method aspects are described in the claims, drawings, and text forming a part of the present disclosure.

In one or more various aspects, related systems include but are not limited to circuitry and/or programming for effecting the herein referenced method aspects; the circuitry and/or programming can be virtually any combination of hardware, software, and/or firmware in one or more machines or article of manufacture configured to effect the herein-referenced method aspects depending upon the design choices of the system designer.

A computationally-implemented system includes, but is not limited to, means for managing adaptation data, wherein the adaptation data is correlated to at least one aspect of speech of a particular party, means for facilitating transmission of the adaptation data to a target device, wherein the adaptation data is configured to be applied to the target device to assist in execution of a speech-facilitated transaction, one or more instructions for facilitating reception of adaptation result data that is based on at least one aspect of the speech-facilitated transaction between the particular party and the target device, means for determining whether to modify the adaptation data at least partly based on the adaptation result data, and means for facilitating transmission of at least a portion of modified adaptation data to a receiving device. In addition to the foregoing, other system aspects are described in the claims, drawings, and text forming a part of the present disclosure.

A computationally-implemented system includes, but is not limited to circuitry for managing adaptation data, wherein the adaptation data is correlated to at least one aspect of speech of a particular party, circuitry for facilitating transmission of the adaptation data to a target device, wherein the adaptation data is configured to be applied to the target device to assist in execution of a speech-facilitated transaction, circuitry for facilitating reception of adaptation result data that is based on at least one aspect of the speech-facilitated transaction between the particular party and the target device, circuitry for determining whether to modify the adaptation data at least partly based on the adaptation result data, and circuitry for facilitating transmission of at least a portion of modified adaptation data to a receiving device. In addition to the foregoing, other system aspects are described in the claims, drawings, and text forming a part of the present disclosure.

A computer program product comprising an article of manufacture bears instructions including, but not limited to, one or more instructions for managing adaptation data, wherein the adaptation data is correlated to at least one aspect of speech of a particular party, one or more instructions for facilitating transmission of the adaptation data to a target device, wherein the adaptation data is configured to be applied to the target device to assist in execution of a speech-facilitated transaction, one or more instructions for facilitating reception of adaptation result data that is based on at least one aspect of the speech-facilitated transaction between the particular party and the target device, one or more instructions for determining whether to modify the adaptation data at least partly based on the adaptation result data, and one or more instructions for facilitating transmission of at least a portion of modified adaptation data to a receiving device. In addition to the foregoing, other computer program product aspects are described in the claims, drawings, and text forming a part of the present disclosure.

A device specified by computational language includes, but is not limited to, one or more interchained groups of ordered matter arranged to manage adaptation data, wherein the adaptation data is correlated to at least one aspect of speech of a particular party, one or more interchained groups of ordered matter arranged to facilitate transmission of the adaptation data to a target device, wherein the adaptation data is configured to be applied to the target device to assist in execution of a speech-facilitated transaction, one or more interchained groups of ordered matter arranged to facilitate reception of adaptation result data that is based on at least one aspect of the speech-facilitated transaction between the particular party and the target device, one or more interchained groups of ordered matter arranged to determine whether to modify the adaptation data at least partly based on the adaptation result data, and one or more interchained groups of ordered matter arranged to manage transmission of at least a portion of modified adaptation data to a receiving device. In addition to the foregoing, other hardware aspects are described in the claims, drawings, and text forming a part of the present disclosure.

A computer architecture comprising at least one level, includes, but is not limited to, architecture configured to be managing adaptation data, wherein the adaptation data is correlated to at least one aspect of speech of a particular party, architecture configured to be facilitating transmission of the adaptation data to a target device, wherein the adaptation data is configured to be applied to the target device to assist in execution of a speech-facilitated transaction, architecture configured to be facilitating reception of adaptation result data that is based on at least one aspect of the speech-facilitated transaction between the particular party and the target device, architecture configured to be determining whether to modify the adaptation data at least partly based on the adaptation result data, and architecture configured to be facilitating transmission of at least a portion of modified adaptation data to a receiving device. In addition to the foregoing, other architecture aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 1, including FIGS. 1A and 1B, shows a high-level block diagram of a personal device 120 operating in an exemplary environment 100, according to an embodiment.

FIG. 2, including FIGS. 2A-2C, shows a particular perspective of the adaptation data correlated to at least one particular party speech aspect managing module 152 of the personal device 120 of environment 100 of FIG. 1.

FIGS. 3A-3G, shows a particular perspective of the adaptation data transmission to target device facilitating module 154 of the personal device 120 of environment 100 of FIG. 1.

FIG. 4, including FIGS. 4A-4E, shows a particular perspective of the adaptation result data based on a result of at least one aspect of a speech-facilitated transaction reception facilitating module 156 of the personal device 120 of environment 100 of FIG. 1.

FIG. 5, including FIGS. 5A-5B, shows a particular perspective of the adaptation data modification determining at least partly based on adaptation result data module 158 of the personal device 120 of environment 100 of FIG. 1.

FIG. 6, including FIGS. 6A-6D, shows a particular perspective of the at least a portion of modified adaptation data transmission to receiving device facilitating module 160 of the personal device 120 of environment 100 of FIG. 1.

FIG. 7 is a high-level logic flowchart of a process, e.g., operational flow 700, according to an embodiment.

FIG. 8A is a high-level logic flowchart of a process depicting alternate implementations of a managing adaptation data operation 702 of FIG. 7.

FIG. 8B is a high-level logic flowchart of a process depicting alternate implementations of a managing adaptation data operation 702 of FIG. 7.

FIG. 8D is a high-level logic flowchart of a process depicting alternate implementations of a managing adaptation data operation 702 of FIG. 7.

FIG. 9A is a high-level logic flowchart of a process depicting alternate implementations of an adaptation data transmission facilitating operation 704 of FIG. 7.

FIG. 9G is a high-level logic flowchart of a process depicting alternate implementations of an adaptation data transmission facilitating operation 704 of FIG. 7.

FIG. 10E is a high-level logic flowchart of a process depicting alternate implementations of an adaptation result data reception facilitating operation 706 of FIG. 7.

FIG. 12B is a high-level logic flowchart of a process depicting alternate implementations of an adaptation data portion transmission facilitating operation 710 of FIG. 7.

DETAILED DESCRIPTION

Figure 1A:
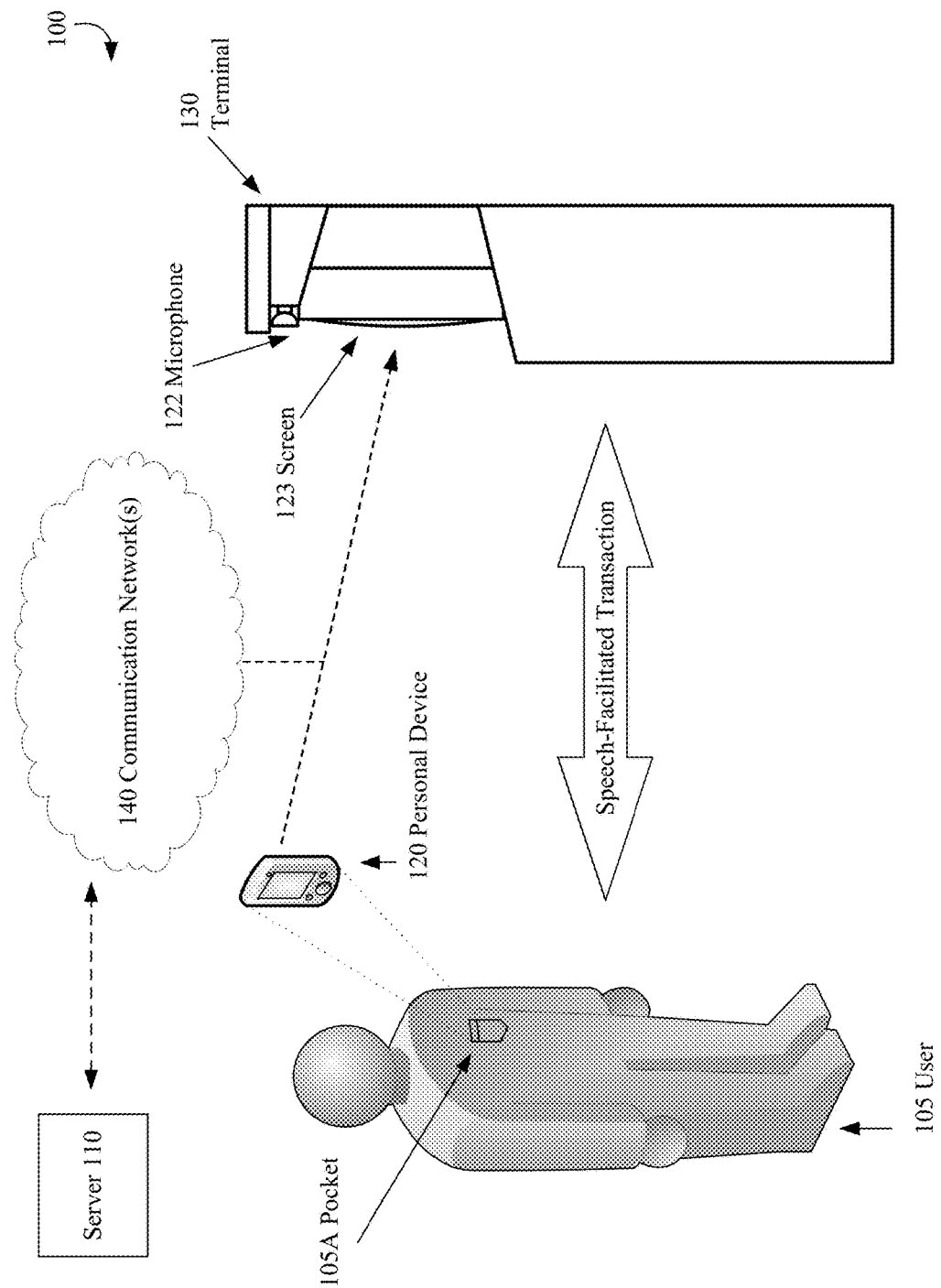

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

The proliferation of automation in many transactions is apparent. For example, Automated Teller Machines ("ATMs") dispense money and receive deposits. Airline ticket counter machines check passengers in, dispense tickets, and allow passengers to change or upgrade flights. Train and subway ticket counter machines allow passengers to purchase a ticket to a particular destination without invoking a human interaction at all. Many groceries and pharmacies have self-service checkout machines which allow a consumer to pay for goods purchased by interacting only with a machine. Large companies now staff telephone answering systems with machines that interact with customers, and invoke a human in the transaction only if there is a problem with the machine-facilitated transaction.

Nevertheless, as such automation increases, convenience and accessibility may decrease. Self-checkout machines at grocery stores may be difficult to operate. ATMs and ticket counter machines may be mostly inaccessible to disabled persons or persons requiring special access. Where before, the interaction with a human would allow disabled persons to complete transactions with relative ease, if a disabled person is unable to push the buttons on an ATM, there is little the machine can do to facilitate the transaction to completion. While some of these public terminals allow speech operations, they are configured to the most generic forms of speech, which may be less useful in recognizing particular speakers, thereby leading to frustration for users attempting to speak to the machine. This problem may be especially challenging for the disabled, who already may face significant challenges in completing transactions with automated machines.

In addition, smartphones and tablet devices also now are configured to receive speech commands. Speech and voice controlled automobile systems now appear regularly in motor vehicles, even in economical, mass-produced vehicles. Home entertainment devices, e.g., disc players, televisions, radios, stereos, and the like, may respond to speech commands. Additionally, home security systems may respond to speech commands. In an office setting, a worker's computer may respond to speech from that worker, allowing faster, more efficient work flows. Such systems and machines may be trained to operate with particular users, either through explicit training or through repeated interactions. Nevertheless, when that system is upgraded or replaced, e.g., a new TV is bought, that training may be lost with the device.

Thus, adaptation data for speech recognition systems may be separated from the device which recognizes the speech, and may be more closely associated with a user, e.g., through a device carried by the user, or through a network location associated with the user. In accordance with various embodiments, computationally implemented methods, systems, circuitry, articles of manufacture, and computer program products are designed to, among other things, provide an interface for managing adaptation data, wherein the adaptation data is correlated to at least one aspect of speech of a particular party, an interface for facilitating transmission of the adaptation data to a target device, wherein the adaptation data is configured to be applied to the target device to assist in execution of a speech-facilitated transaction, an interface for facilitating reception of adaptation result data that is based on at least one aspect of the speech-facilitated transaction between the particular party and the target device, an interface for determining whether to modify the adaptation data at least partly based on the adaptation result data, and an interface for facilitating transmission of at least a portion of modified adaptation data to a receiving device.

The foregoing summary is illustrative only and is not intended to be in any way limiting. In addition to the illustrative aspects, embodiments, and features described above, further aspects, embodiments, and features will become apparent by reference to the drawings and the following detailed description.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, *High-level programming language*, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, *Natural language*, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "1110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT).

Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Referring now to FIG. 1, FIG. 1 illustrates an example environment 100 in which the methods, systems, circuitry, articles of manufacture, and computer program products and architecture, in accordance with various embodiments, may be implemented by personal device 120. The personal device 120, in various embodiments, may be endowed with logic that is designed for managing adaptation data, wherein the adaptation data is correlated to at least one aspect of speech of a particular party, logic that is designed for facilitating transmission of the adaptation data to a target device, wherein the adaptation data is configured to be applied to the target device to assist in execution of a speech-facilitated transaction, logic that is designed for facilitating reception of adaptation result data that is based on at least one aspect of the speech-facilitated transaction between the particular party and the target device, logic that is designed for determining whether to modify the adaptation data at least partly based on the adaptation result data, and logic that is designed for facilitating transmission of at least a portion of modified adaptation data to a receiving device.

Referring again to the exemplary embodiment 100 of FIG. 1, a user 5 may engage in a speech-facilitated transaction with a terminal device 130. Terminal device 130 may include a microphone 122 and a screen 123. In some embodiments, screen 123 may be a touchscreen. Although FIG. 1A depicts terminal device 130 as a terminal for simplicity of illustration, terminal device 130 could be any device that is configured to receive speech. For example, terminal device 130 may be a terminal, a computer, a navigation system, a phone, a piece of home electronics (e.g., a DVD player, Blu-Ray player, media player, game system, television, receiver, alarm clock, and the like). Terminal device 130 may, in some embodiments, be a home security system, a safe lock, a door lock, a kitchen appliance configured to receive speech, and the like. In some embodiments, terminal device 130 may be a motorized vehicle, e.g., a car, boat, airplane, motorcycle, golf cart, wheelchair, and the like. In some embodiments, terminal device 30 may be a piece of portable electronics, e.g., a laptop computer, a netbook computer, a tablet device, a smartphone, a cellular phone, a radio, a portable navigation system, or any other piece of electronics capable of receiving speech. Terminal device 130 may be a part of an enterprise solution, e.g., a common workstation in an office, a copier, a scanner, a personal workstation in a cubicle, an office directory, an interactive screen, and a telephone. These examples and lists are not meant to be exhaustive, but merely to illustrate a few examples of the terminal device.

In an embodiment, personal device 120 may facilitate the transmission of adaptation data to the terminal 130. In FIG. 1A, personal device 120 is shown as a phone-type device that fits into pocket 15A of the user. Nevertheless, in other embodiments, personal device 120 may be any size and have any specification. Personal device 120 may be a custom device of any shape or size, configured to transmit, receive, and store data. Personal device 120 may include, but is not limited to, a smartphone device, a tablet device, a personal computer device, a laptop device, a keychain device, a key, a personal digital assistant device, a modified memory stick, a universal remote control, or any other piece of electronics. In addition, personal device 120 may be a modified object that is worn, e.g., eyeglasses, a wallet, a credit card, a watch, a chain, or an article of clothing. Anything that is configured to store, transmit, and receive data may be a personal device 120, and personal device 120 is not limited in size to devices that are capable of being carried by a user. Additionally, personal device 120 may not be in direct proximity to the user, e.g., personal device 120 may be a computer sitting on a desk in a user's home or office.

In some embodiments, terminal device 130 receives adaptation data from the personal device 120, in a process that will be described in more detail herein. In some embodiments, personal device 120 acts as a facilitator, e.g., one that carries out one or more steps in assisting the transmission, of transmitting adaptation data to the terminal device 130. For example, as will be described in more detail herein, personal device 120 may facilitate transmission of adaptation data from server 110 to terminal device 130. In some embodiments, personal device 120 may generate adaptation data, as will be described in more detail herein. Thus, in some embodiments, the adaptation data does not come directly from the personal device 120. In some embodiments, personal device 120 merely facilitates communication of the adaptation data, e.g., by providing one or more of an address, credentials, instructions, authorization, and recommendations. For example, in some embodiments, personal device 120 provides a location at server 110 from which adaptation data may be transmitted. In some embodiments, personal device 120 retrieves adaptation data from server 110 upon a request from the terminal device 130, and then relays or facilitates in the relaying of the adaptation data to terminal device 130.

In some embodiments, personal device 120 receives adaptation result data from terminal device 130. In some embodiments, personal device 120 acts as a facilitator of receiving adaptation result data at a location. For example, as will be described in more detail herein, personal device 120 may facilitate reception of adaptation result data at server 110. In some embodiments, the adaptation result data 130 may be created by the personal device 120, as will be described in more detail herein. Thus, in some embodiments, the adaptation result data is not received directly at the personal device 120. In some embodiments, personal device 120 merely facilitates reception of the adaptation result data, e.g., by providing one or more of an address, credentials, instructions, authorization, and recommendations. For example, in some embodiments, personal device 120 provides a location at server 110 at which adaptation result data may be received. In some embodiments, personal device 120 retrieves adaptation result data from server 110 after facilitating the reception of adaptation result data from terminal device 130 at server 110.

In some embodiments, one or more of the adaptation data and the adaptation result data are transmitted over one or more communication network(s) 140. In various embodiments, the communication network 140 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 140 may be wired, wireless, or a combination of wired and wireless networks. It is noted that "communication network" here refers to one or more communication networks, which may or may not interact with each other.

In some embodiments, personal device 120 broadcasts the adaptation data regardless of whether a terminal device 130 is listening, e.g., at predetermined, regular, or otherwise-defined intervals. In other embodiments, personal device 120 listens for a request from a terminal device 130, and transmits or broadcasts adaptation data in response to that request. In some embodiments, user 105 determines when personal device 120 broadcasts adaptation data. In still other embodiments, a third party (not shown) triggers the transmission of adaptation data to the terminal device 130, in which the transmission is facilitated by the personal device 120.

Referring again to the exemplary environment 100 depicted in FIG. 1, in various embodiments, the personal device 120 may comprise, among other elements, a processor 132, a memory 134, and a user interface 135. Processor 132 may include one or more microprocessors, Central Processing Units ("CPU"), a Graphics Processing Units ("GPU"), Physics Processing Units, Digital Signal Processors, Network Processors, Floating Point Processors, and the like. In some embodiments, processor 132 may be a server. In some embodiments, processor 132 may be a distributed-core processor. Although processor 132 is depicted as a single processor that is part of a single computing device 130, in some embodiments, processor 132 may be multiple processors distributed over one or many personal devices 120, which may or may not be configured to work together. Processor 132 is illustrated as being configured to execute computer readable instructions in order to execute one or more operations described above, and as illustrated in FIGS. 5, 6A-6H, 7A-7K, and 8A-8J. In some embodiments, processor 132 is designed to be configured to operate as processing module 150, which may include adaptation data correlated to at least one particular party speech aspect managing module 152, adaptation data configured to be applied to the target device for assistance in execution of speech-facilitated transaction transmission to target device when there is an indication of a speech-facilitated transaction between the target device and the particular party facilitating module 154, and acquisition of adaptation result data based on at least one aspect of the speech-facilitated transmission and configured to be used in determining whether to modify adaptation data facilitating module 156.

Referring again to the exemplary environment 100 of FIG. 1, personal device 120 may comprise a memory 134. In some embodiments, memory 134 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 134 may be located at a single network site. In other embodiments, memory 134 may be located at multiple network sites, including sites that are distant from each other.

As described above, and with reference to FIG. 1, personal device 120 may include a user interface 135. The user interface may be implemented in hardware or software, or both, and may include various input and output devices to allow an operator of personal device 120 to interact with personal device 120. For example, user interface 135 may include, but is not limited to, an audio display, a video display, a microphone, a camera, a keyboard, a mouse, a joystick, a game controller, a touchpad, a handset, or any other device that allows interaction between a computing device and a user. The user interface 135 also may include a speech interface 136, which is configured to receive and/or process speech as input, or to observe and/or record speech of a speech-facilitated transaction.

Referring again to FIG. 1, in some embodiments, personal device 120 may have one or more sensors 182. These sensors include, but are not limited to, a Global Positioning System (GPS) sensor, a still camera, a video camera, an altimeter, an air quality sensor, a barometer, an accelerometer, a charge-coupled device, a radio, a thermometer, a pedometer, a heart monitor, a moisture sensor, a humidity sensor, a microphone, a seismometer, and a magnetic field sensor. Sensors 182 may interface with sensor interface 180. Although FIG. 1B illustrates sensors 182 as part of personal device 120, in some embodiments, sensors 182 may be separated from personal device 120, and communicate via one or more communication networks, e.g., communication networks 140.

Referring now to FIG. 2, FIG. 2 illustrates an exemplary implementation of the adaptation data correlated to at least one particular party speech aspect managing module 152. As illustrated in FIG. 2, the adaptation data correlated to at least one particular party speech aspect managing module 152 may include one or more sub-logic modules in various alternative implementations and embodiments. For example, as shown in FIG. 2 (e.g., FIG. 2A), in some embodiments, module 152 may include adaptation data configured to assist in carrying out at least a portion of a speech-facilitated transaction and correlated to at least one particular party speech aspect managing module 202. In some embodiments, module 202 may include adaptation data configured to adapt a speech recognition component of a target device configured to carry out a speech-facilitated transaction and correlated to at least one particular party speech aspect managing module 204. In some embodiments, module 204 may include adaptation data comprising a pronunciation dictionary configured to supplement a speech recognition component of the target device configured to carry out a speech-facilitated transaction and correlated to at least one particular party speech aspect managing module 206. In some embodiments, module 206 may include adaptation data comprising a pronunciation dictionary configured to supplement a pronunciation dictionary of the speech recognition component of the target device configured to carry out a speech-facilitated transaction and correlated to at least one particular party speech aspect managing module 208. In some embodiments, module 208 may include adaptation data comprising a pronunciation dictionary configured to replace at least one word of a pronunciation dictionary of the speech recognition component of the target device configured to carry out a speech-facilitated transaction and correlated to at least one particular party speech aspect managing module 210. In some embodiments, module 210 may include adaptation data comprising a pronunciation dictionary configured to replace at least one word of a pronunciation dictionary of the speech recognition component of the target device configured to carry out a speech-facilitated transaction and based on at least one pronunciation of a word by the particular party managing module 212.

Referring again to FIG. 2, e.g., FIG. 2B, in some embodiments, module 152 may include one or more of adaptation data correlated to at least one particular party speech aspect storing module 214, adaptation data correlated to at least one particular party speech aspect validating at a particular time module 222, and adaptation data correlated to at least one particular party speech aspect location information requesting module 224. In some embodiments, module 214 may include one or more of adaptation data correlated to at least one particular party speech aspect storing at remote location module 216 (e.g., which, in some embodiments, may include adaptation data correlated to at least one particular party speech aspect storing at remote location that also stores further adaptation data correlated to a further party module 218) and address at which adaptation data correlated to at least one particular party speech aspect is located storing module 220. In some embodiments, module 224 may include adaptation data correlated to at least one particular party speech aspect location information requesting module 224. In some embodiments, module 224 may include location of adaptation data from list particular party selecting module 226. In some embodiments, module 226 may include remote data service center location of adaptation data from list of one or more remote data service centers particular party selecting module 228.

Referring again to FIG. 2, e.g., FIG. 2C, in some embodiments, module 152 may include one or more of adaptation data correlated to at least one particular party speech aspect selectively providing viewing authorization module 230 and adaptation data correlated to at least one particular party speech aspect selectively providing retrieval authorization module 232.

Figure 3B:
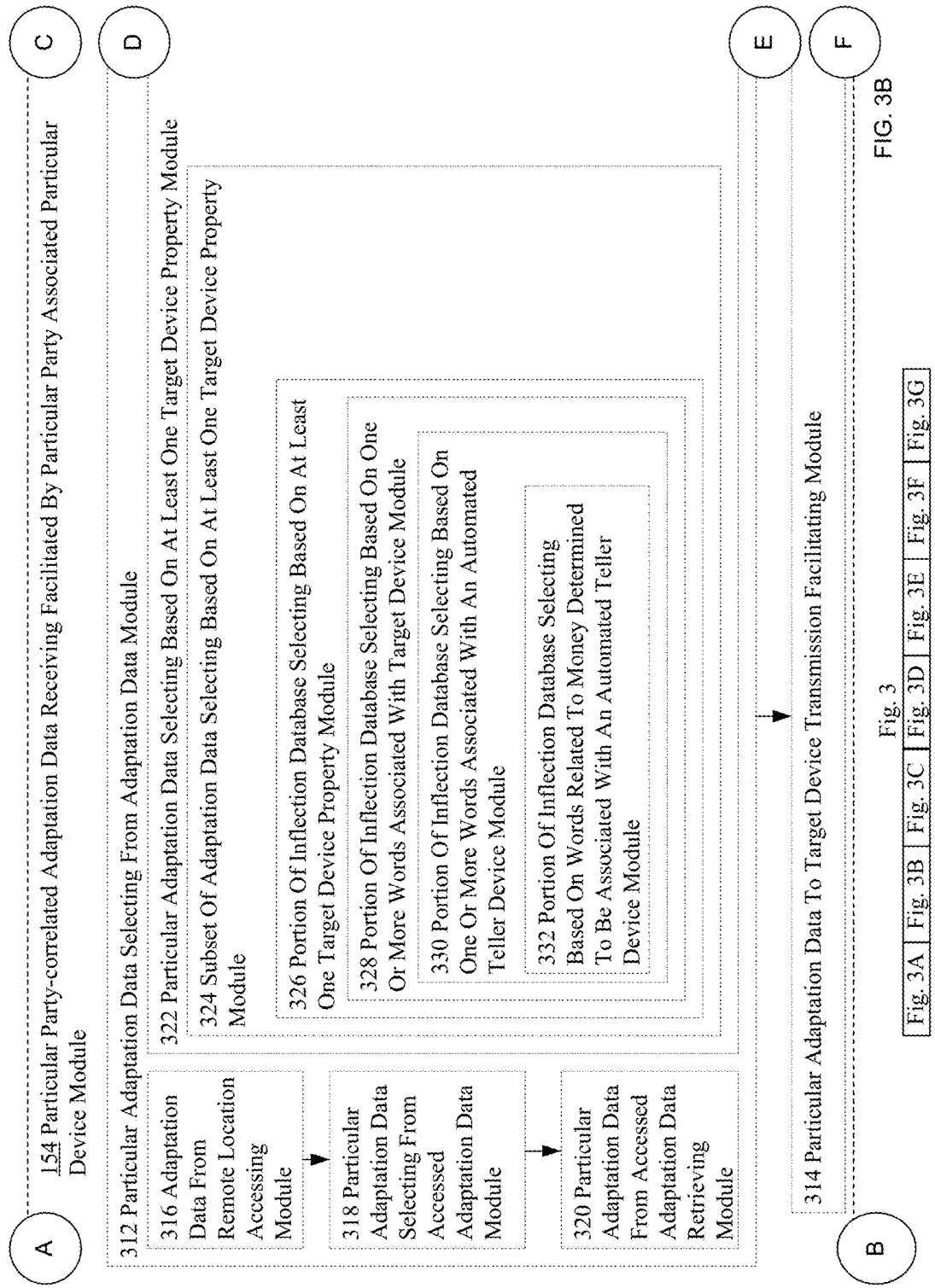
Figure 3:
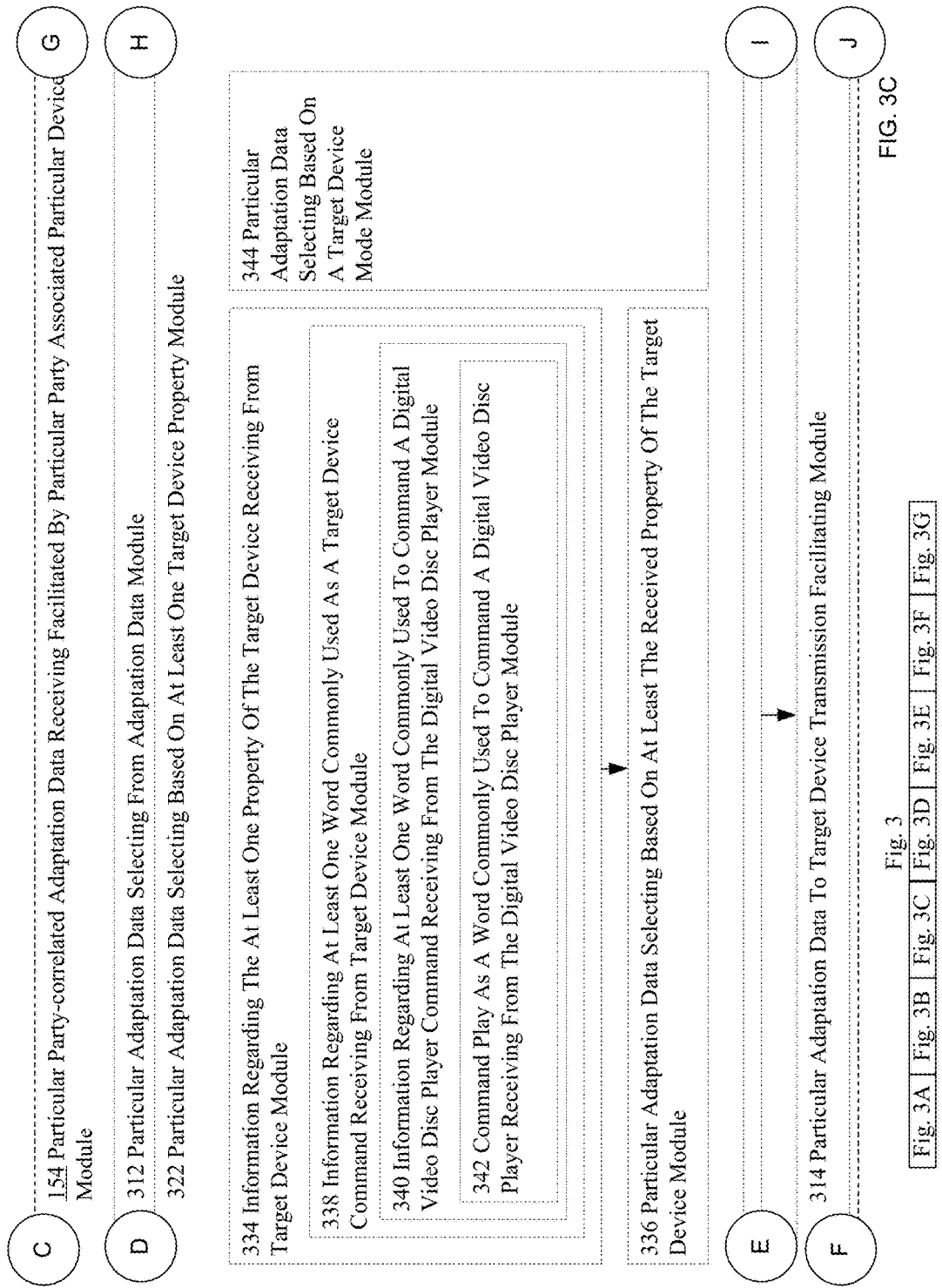
FIG. 3, including

Referring now to FIG. 3, FIG. 3 illustrates an exemplary implementation of the adaptation data transmission to target device facilitating module 154. As illustrated in FIG. 3, the adaptation data transmission to target device facilitating module 154 may include one or more sub-logic modules in various alternative implementations and embodiments. For example, as shown in FIG. 3 (e.g., FIG. 3A), in some embodiments, module 154 may include one or more of adaptation data transmitting to target device module 302, adaptation data retrieval instructions transmission to target device facilitating module 304, adaptation data retrieval location transmission to target device facilitating module 306, and adaptation data representing pronunciation of one or more words in a particular language spoken by the particular party transmission to target device facilitating module 308 (e.g., which, in some embodiments, may include adaptation data representing pronunciation of one or more words in a particular language spoken by the particular party that is different from a target-device operation configured language transmission to target device facilitating module 310).

Referring again to FIG. 3, e.g., FIG. 3B, in some embodiments, module 154 may include one or more of particular adaptation data selecting from adaptation data module 312 and particular adaptation data to target device transmission facilitating module 314. In some embodiments, module 312 may include one or more of adaptation data from remote location accessing module 316, particular adaptation data selecting from accessed adaptation data module 318, and particular adaptation data from accessed adaptation data retrieving module 320. In some embodiments, module 312 may further include particular adaptation data selecting based on at least one target device property module 322. In some embodiments, module 322 may include subset of adaptation data selecting based on at least one target device property module 324. In some embodiments, module 324 may include portion of inflection database selecting based on at least one target device property module 326. In some embodiments, module 326 may include portion of inflection database selecting based on one or more words associated with target device module 328. In some embodiments, module 328 may include portion of inflection database selecting based on one or more words associated with an automated teller device module 330. In some embodiments, module 330 may include portion of inflection database selecting based on words related to money determined to be associated with an automated teller device module 332.

Referring again to FIG. 3, e.g., FIG. 3C, in some embodiments, module 154 may include module 312, and module 312 may include module 322, as previously described above. In some embodiments, module 322 may further include one or more of information regarding the at least one property of the target device receiving from target device module 334, particular adaptation data selecting based on at least the received property of the target device module 336, and particular adaptation data selecting based on a target device mode module 344. In some embodiments, module 334 may include information regarding at least one word commonly used as a target device command receiving from target device module 338. In some embodiments, module 338 may include information regarding at least one word commonly used to command a digital video disc player command receiving from the digital video disc player module 340. In some embodiments, module 340 may include command play as a word commonly used to command a digital video disc player receiving from the digital video disc player module 342.

Referring again to FIG. 3, e.g., FIG. 3D, in some embodiments, module 154 may include module 312, and module 312 may include module 322, as previously described above. In some embodiments, module 322 may still further include particular adaptation data selecting based on a type of target device module 346. In some embodiments, module 346 may include subset of adaptation data derived at least in part from one or more devices of a same type as the target device selecting module 348. In some embodiments, module 348 may include subset of adaptation data derived at least in part from one or more speech interactions with one or more devices of a same type as the target device selecting module 350. In some embodiments, module 350 may include one or more of subset of adaptation data derived at least in part from one or more speech interactions with home entertainment devices when the target device is a voice input accepting television selecting module 352 and subset of adaptation data derived at least in part from one or more speech interactions with one or more televisions when the target device is a voice input accepting television selecting module 354.

Figure 3E:
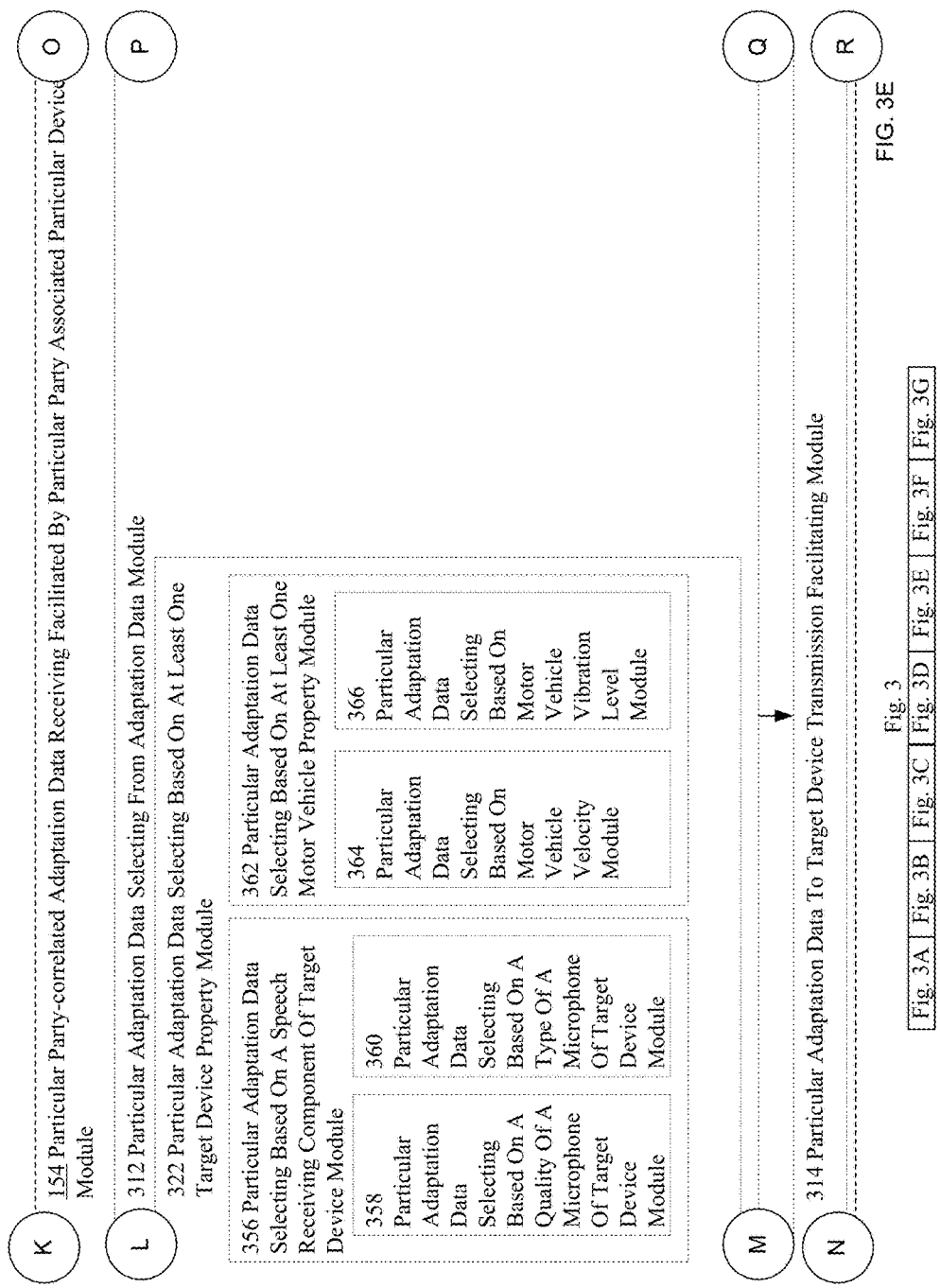

Referring again to FIG. 3, e.g., FIG. 3E, in some embodiments, module 154 may include module 312, and module 312 may include module 322, as previously described above. In some embodiments, module 322 may still further include one or more of particular adaptation data selecting based on a speech receiving component of target device module 356 and particular adaptation data selecting based on at least one motor vehicle property module 362. In some embodiments, module 356 may include one or more of particular adaptation data selecting based on a quality of a microphone of target device module 358 and particular adaptation data selecting based on a type of a microphone of target device module 360. In some embodiments, module 362 may include one or more of particular adaptation data selecting based on motor vehicle velocity module 364 and particular adaptation data selecting based on motor vehicle vibration level module 366.

Referring again to FIG. 3, e.g., FIG. 3F, in some embodiments, module 154 may include module 312, as previously described above. In some embodiments, module 312 may further include one or more of particular adaptation data selecting based on an environment condition of an environment of the speech-facilitated transaction module 368 (e.g., which, in some embodiments, may include one or more of particular adaptation data selecting based on an ambient noise level of an environment of the speech-facilitated transaction module 370, particular adaptation data selecting based on a distance between the particular party and the target device during the speech-facilitated transaction module 372, and particular adaptation data selecting based on an amount of interference present in an environment of the speech-facilitated transaction module 374), selection of particular adaptation data from particular party receiving module 376, adaptation data presenting to particular party for selection of particular adaptation data module 378, and selection of particular adaptation data from the particular party receiving module 380.

Referring again to FIG. 3, e.g., FIG. 3G, in some embodiments, module 154 may include module 312, as previously described above. In some embodiments, module 312 may still further include one or more of selection of particular adaptation data based on previously acquired user preferences module 382, transmitting options for selecting adaptation data to target device module 384, target device selection of adaptation data receiving module 386, and particular adaptation data selection based on received adaptation data selected by target device module 388. In some embodiments, module 154 may include particular party-correlated adaptation data receiving facilitated by particular party associated particular device upon indication from target device of initiation of speech-facilitated transaction between target device and particular party module 390.

Figures 4, 4A:
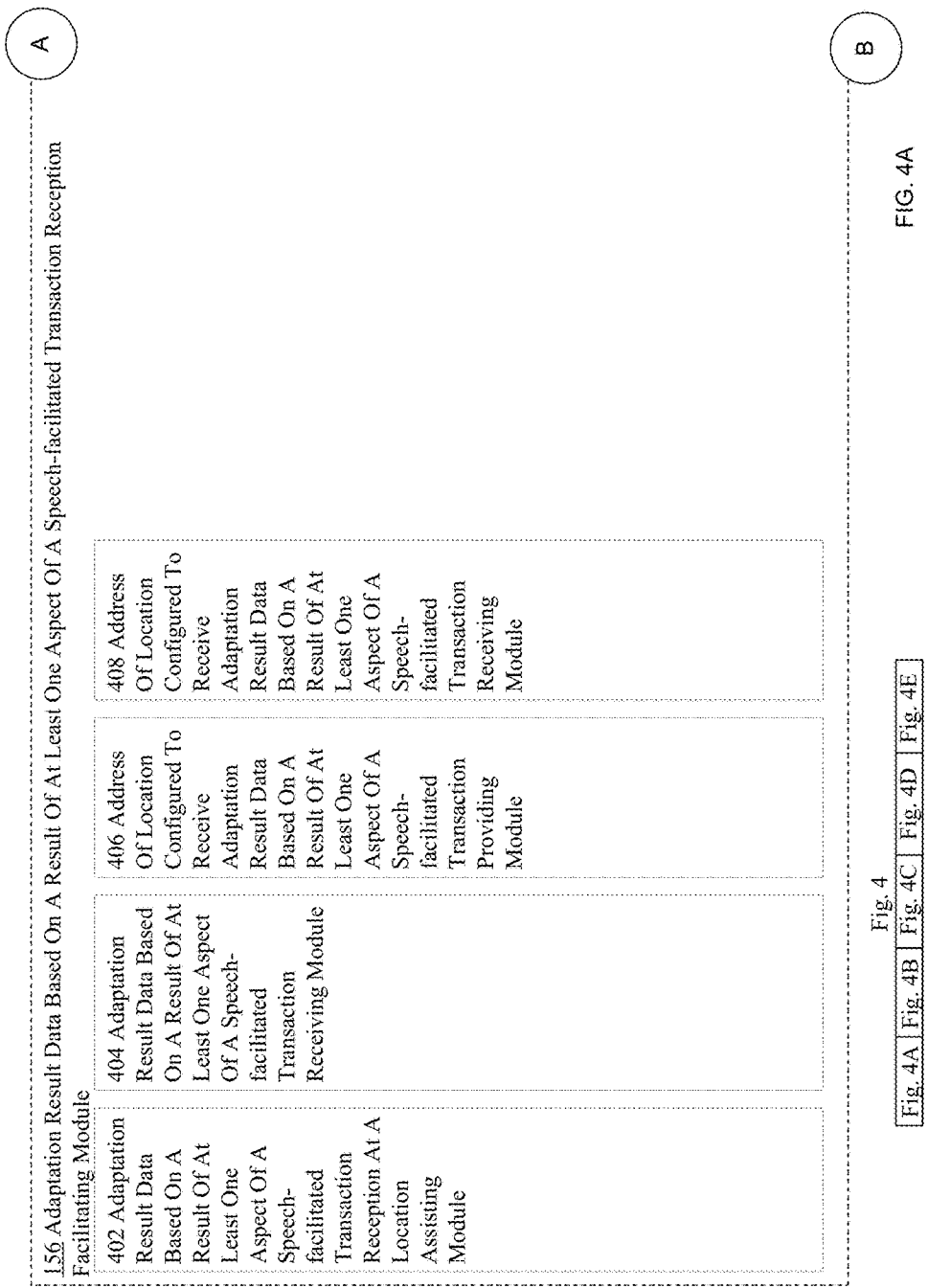

Referring now to FIG. 4, FIG. 4 illustrates an exemplary implementation of the adaptation result data based on a result of at least one aspect of a speech-facilitated transaction reception facilitating module 156. As illustrated in FIG. 4, the adaptation result data based on a result of at least one aspect of a speech-facilitated transaction reception facilitating module 156 may include one or more sub-logic modules in various alternative implementations and embodiments. For example, as shown in FIG. 4 (e.g., FIG. 4A), in some embodiments, module 156 may include one or more of adaptation result data based on a result of at least one aspect of a speech-facilitated transaction reception at a location assisting module 402, adaptation result data based on a result of at least one aspect of a speech-facilitated transaction receiving module 404, address of location configured to receive adaptation result data based on a result of at least one aspect of a speech-facilitated transaction providing module 406, and address of location configured to receive adaptation result data based on a result of at least one aspect of a speech-facilitated transaction receiving module 408.

Figures 4, 4B:
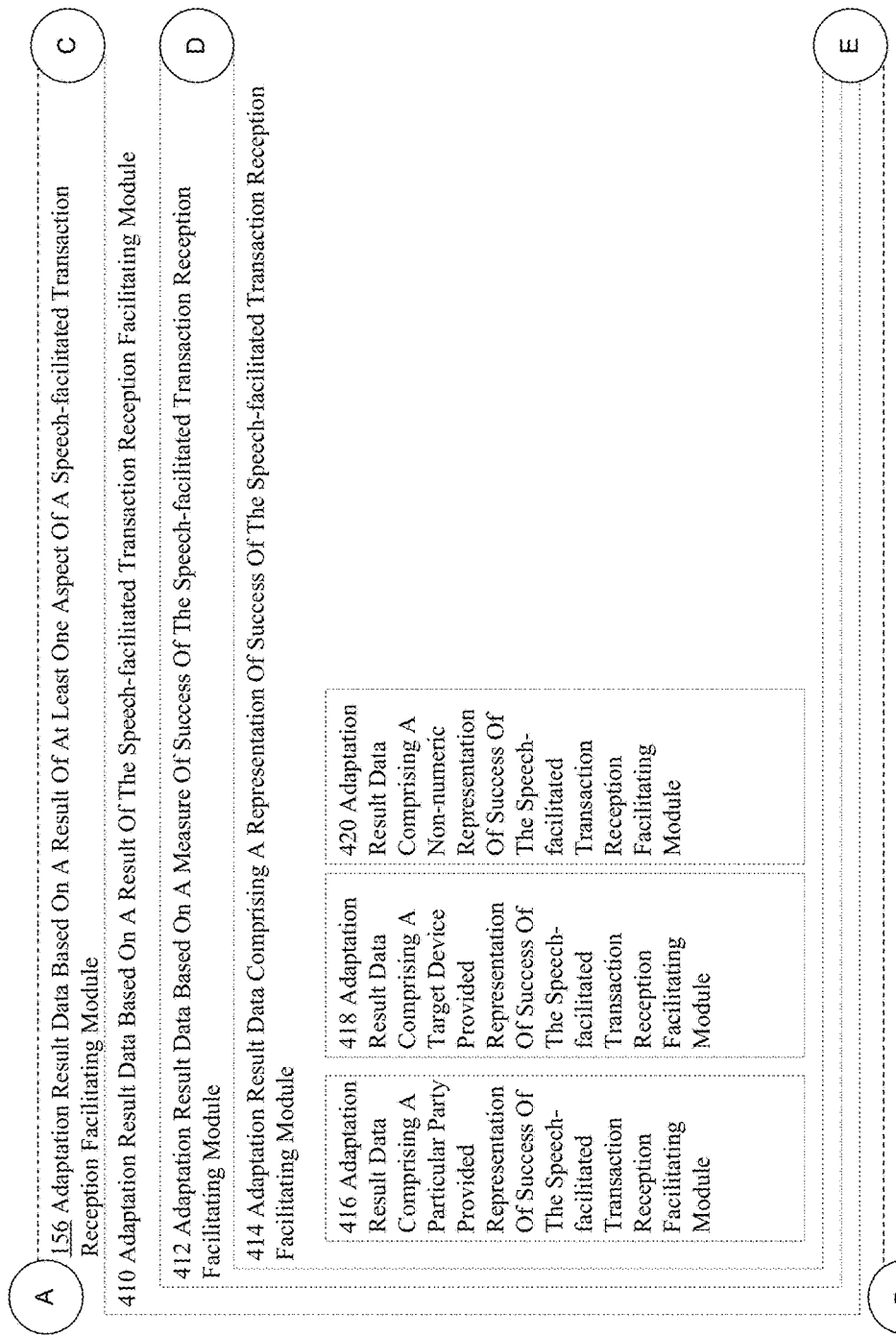

Referring again to FIG. 4, e.g., FIG. 4B, in some embodiments, module 156 may include adaptation result data based on a result of the speech-facilitated transaction reception facilitating module 410. In some embodiments, module 410 may include adaptation result data based on a measure of success of the speech-facilitated transaction reception facilitating module 412. In some embodiments, module 412 may include adaptation result data comprising a representation of success of the speech-facilitated transaction reception facilitating module 414. In some embodiments, module 414 may include one or more of adaptation result data comprising a particular party provided representation of success of the speech-facilitated transaction reception facilitating module 416, adaptation result data comprising a target device provided representation of success of the speech-facilitated transaction reception facilitating module 418, and adaptation result data comprising a non-numeric representation of success of the speech-facilitated transaction reception facilitating module 420.

Referring again to FIG. 4, e.g., FIG. 4C, in some embodiments, module 156 may include module 410, module 410 may include module 412, and module 412 may include module 414, as previously described above. In some embodiments, module 414 may further include one or more of adaptation result data comprising a numeric representation of success of the speech-facilitated transaction reception facilitating module 422 (e.g., which, in some embodiments, may include one or more of adaptation result data comprising a confidence rate of correct interpretation of at least a portion of the speech-facilitated transaction reception facilitating module 424 and adaptation result data comprising an interpretation error rate of at least a portion of the speech-facilitated transaction reception facilitating module 426) and adaptation result data comprising a list of at least one word improperly interpreted during speech-facilitated transaction reception facilitating module 428.

Referring again to FIG. 4, e.g., FIG. 4D, in some embodiments, module 156 may include one or more of adaptation result data comprising a list of at least one word improperly interpreted more than once during the speech-facilitated transaction reception facilitating module 430, adaptation result data comprising a table of at least one word improperly interpreted and a number of times the at least one word was improperly interpreted during the speech-facilitated transaction reception facilitating module 432, adaptation result data comprising a list of at least one question asked by the target device at least twice consecutively reception facilitating module 434, adaptation result data comprising a list of at least one question asked by the target device at least twice consecutively and one or more answers given to the at least one question reception facilitating module 436, and adaptation result data comprising a table of at least one question asked by the target device and at least one corresponding answer given by the particular party reception facilitating module 438.

Referring again to FIG. 4, e.g., FIG. 4E, in some embodiments, module 156 may include one or more of adaptation result data comprising at least one phoneme appearing in at least one word that was improperly interpreted during the speech-facilitated transaction reception facilitating module 440 (e.g., which, in some embodiments, may include adaptation result data comprising at least one phoneme appearing in more than one word that was improperly interpreted during the speech-facilitated transaction reception facilitating module 442 (e.g., which, in some embodiments, may include adaptation result data comprising at least one phoneme appearing in more than one unique word that was improperly interpreted during the speech-facilitated transaction reception facilitating module 444)), adaptation result data based on a result of at least one aspect of a speech-facilitated transaction reception facilitating upon conclusion of speech-facilitated transaction module 446, determining a conclusion of a speech facilitated transaction based on facilitating reception of adaptation result data module 448, adaptation result data based on a result of at least one aspect of a speech-facilitated transaction reception facilitating during speech-facilitated transaction module 450, and adaptation result data based on a result of at least one aspect of a speech-facilitated transaction reception facilitating prior to completing the speech-facilitated transaction module 452.

Figures 5, 5A:
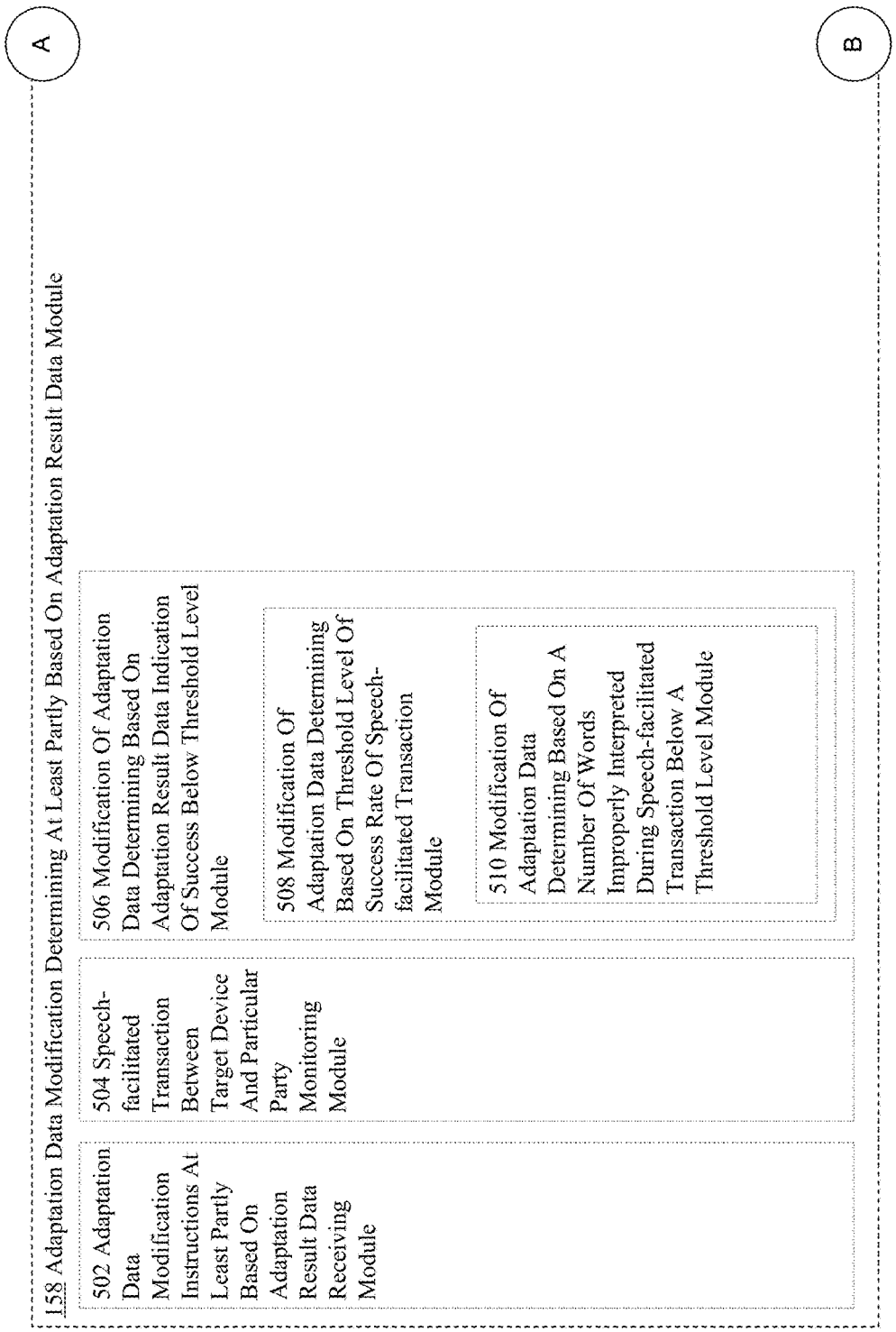

Referring now to FIG. 5, FIG. 5 illustrates an exemplary implementation of the adaptation data modification determining at least partly based on adaptation result data module 158. As illustrated in FIG. 5, the adaptation data modification determining at least partly based on adaptation result data module 158 may include one or more sub-logic modules in various alternative implementations and embodiments. For example, as shown in FIG. 5 (e.g., FIG. 5A), in some embodiments, module 158 may include one or more of adaptation data modification instructions at least partly based on adaptation result data receiving module 502, speech-facilitated transaction between target device and particular party monitoring module 504, and modification of adaptation data determining based on adaptation result data indication of success below threshold level module 506. In some embodiments, module 506 may include, e.g., modification of adaptation data determining based on threshold level of success rate of speech-facilitated transaction module 508. In some embodiments, module 508 may include modification of adaptation data determining based on a number of words improperly interpreted during speech-facilitated transaction below a threshold level module 510.

Referring again to FIG. 5, e.g., FIG. 5B, module 158 may include adaptation data modifying at least partly based on adaptation result data module 512. In some embodiments, module 512 may include pronunciation dictionary modifying at least one word at least partly based on received adaptation result data comprising at least one word that was improperly interpreted and a pronunciation of the at least one word by the particular party module 514. In some embodiments, module 514 may include pronunciation dictionary replacing at least one word received in adaptation result data with pronunciation received as adaptation data module 516.

Figures 6, 6A:
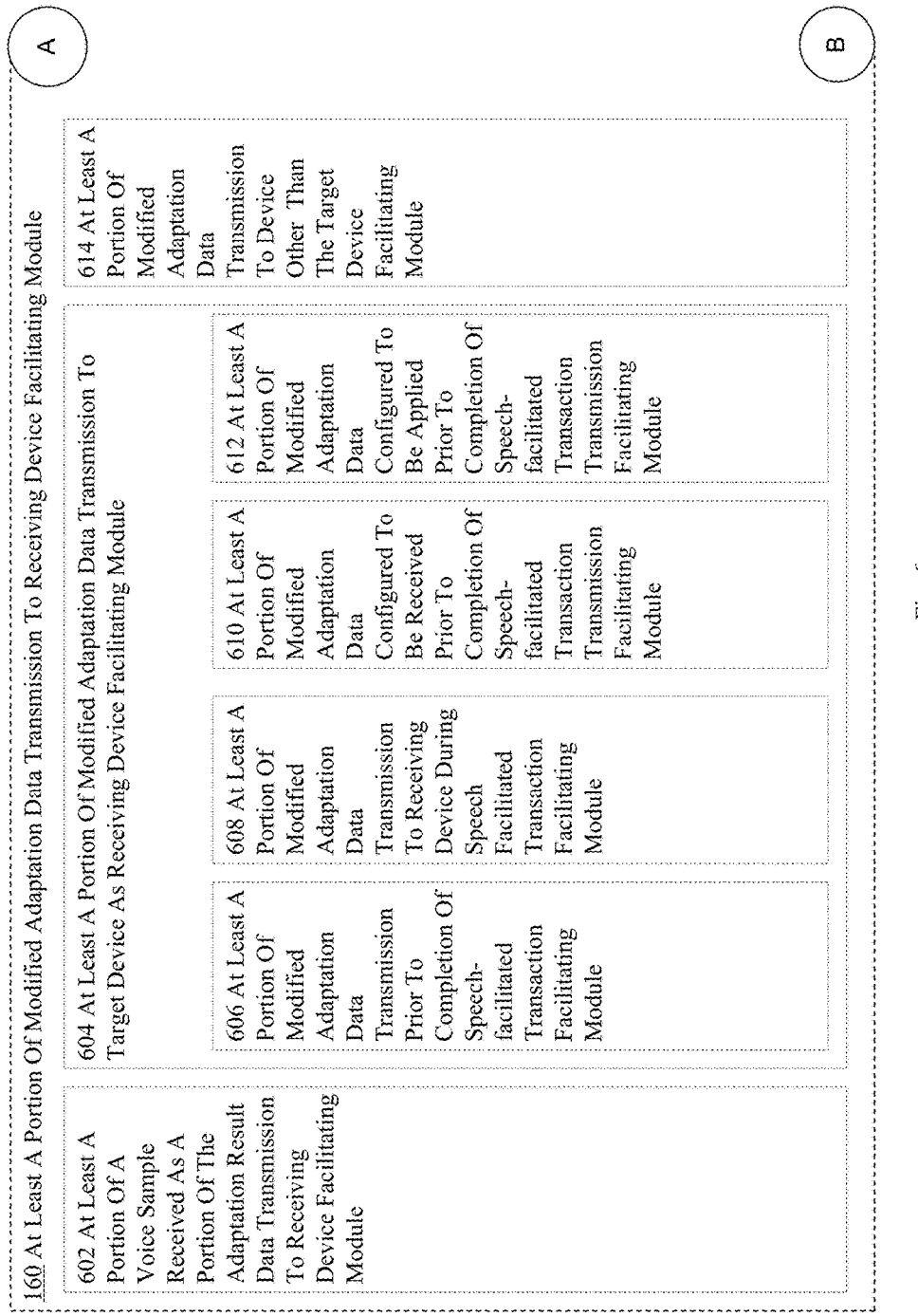

Referring now to FIG. 6, FIG. 6 illustrates an exemplary implementation of the at least a portion of modified adaptation data transmission to receiving device facilitating module 160. As illustrated in FIG. 6, the at least a portion of modified adaptation data transmission to receiving device facilitating module 160 may include one or more sub-logic modules in various alternative implementations and embodiments. For example, as shown in FIG. 6 (e.g., FIG. 6A), in some embodiments, module 160 may include one or more of at least a portion of a voice sample received as a portion of the adaptation result data transmission to receiving device facilitating module 602, at least a portion of modified adaptation data transmission to target device as receiving device facilitating module 604 (e.g., which, in some embodiments, may include one or more of at least a portion of modified adaptation data transmission prior to completion of speech-facilitated transaction facilitating module 606, at least a portion of modified adaptation data transmission to receiving device during speech facilitated transaction facilitating module 608, at least a portion of modified adaptation data configured to be received prior to completion of speech-facilitated transaction transmission facilitating module 610, and at least a portion of modified adaptation data configured to be applied prior to completion of speech-facilitated transaction transmission facilitating module 612), and at least a portion of modified adaptation data transmission to device other than the target device facilitating module 614.

Referring again to FIG. 6, e.g., FIG. 6B, module 160 may include one or more of at least a portion of modified adaptation data transmission to a device that is a replacement for the target device facilitating module 616, at least a portion of modified adaptation data transmission to receiving device connected to the target device via a network facilitating module 618, at least a portion of modified adaptation data transmission to receiving device communicating on a same network as the target device facilitating module 620, at least a portion of modified adaptation data transmission to receiving device configured to perform a same function as the target device facilitating module 622, and at least a portion of modified adaptation data transmission to receiving device of a same type as the target device facilitating module 624.

Referring again to FIG. 6, e.g., FIG. 6C, module 160 may include one or more of modified adaptation data transmitting from particular device to receiving device module 626 (e.g., which, in some embodiments, may include modified adaptation data transmitting from particular device configured to communicate on a same network as the receiving device module 628, modified adaptation data transmitting from particular device configured to communicate with receiving device and target device module 630, and modified adaptation data stored on particular device transmitting from particular device to receiving device module 632), adaptation data, said adaptation data modified by incrementing a counter, as at least a portion of modified adaptation data transmission to receiving device facilitating module 634, at least a portion of modified adaptation data, said modified adaptation data different than the adaptation data, transmission to receiving device facilitating module 636, and at least a portion of modified adaptation data based on the adaptation data transmission to receiving device facilitating module 638.

Referring again to FIG. 6, e.g., FIG. 6D, module 160 may include one or more of at least a portion of modified adaptation data, said modified adaptation data including at least a portion of the adaptation result data, transmission to receiving device facilitating module 640 and at least a portion of modified adaptation data, said modified adaptation data at least partially based on applying the adaptation result data, transmission to receiving device facilitating module 642.

A more detailed discussion related to terminal device 30 of FIG. 1 now will be provided with respect to the processes and operations to be described herein. Referring now to FIG. 6, FIG. 7 illustrates an operational flow 700 representing example operations for, among other methods, managing adaptation data, wherein the adaptation data is correlated to at least one aspect of speech of a particular party, facilitating transmission of the adaptation data to a target device, wherein the adaptation data is configured to be applied to the target device to assist in execution of a speech-facilitated transaction, facilitating reception of adaptation result data that is based on at least one aspect of the speech-facilitated transaction between the particular party and the target device, determining whether to modify the adaptation data at least partly based on the adaptation result data, and facilitating transmission of at least a portion of modified adaptation data to a receiving device.

In FIG. 7 and in the following FIGS. 8-12 that include various examples of operational flows, discussions and explanations will be provided with respect to the exemplary environment 100 as described above and as illustrated in FIG. 1, and with respect to other examples (e.g., as provided in FIGS. 2-6) and contexts. It should be understood that the operational flows may be executed in a number of other environments and contexts, and/or in modified versions of the systems shown in FIGS. 2-6. Although the various operational flows are presented in the sequence(s) illustrated, it should be understood that the various operations may be performed in other orders other than those which are illustrated, or may be performed concurrently.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

Portions of this application may reference trademarked companies and products merely for exemplary purposes. All trademarks remain the sole property of the trademark owner, and in each case where a trademarked product or company is used, a similar product or company may be replaced.

The following examples are meant to be non-exhaustive illustrations of a few of the many embodiments disclosed in the invention. Descriptive statements or other statements that define, limit, or further elaborate upon the function, operation, execution, or implementation of the following examples are intended to apply in the context of the described exemplary embodiment, and are intended to show that said examples could be applied to any other embodiment when not inconsistent with other explicit descriptions, but should not be interpreted as limiting any other embodiment, whether explicitly listed or implicitly encompassed by the scope of the invention set forth in the foregoing claims.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Further, in FIG. 7 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 7 as well as the other operations to be described herein may be performed by at least one of a machine, an article of manufacture, or a composition of matter.

Referring again to FIG. 7, FIG. 7 shows operation 700 that includes operation 702 depicting managing adaptation data, wherein the adaptation data is correlated to at least one aspect of speech of a particular party. For example, FIG. 1 (e.g., FIG. 1B) shows adaptation data correlated to at least one particular party speech aspect managing module 152 managing (e.g., storing, tracking, monitoring, authorizing, changing the permissions of, providing access, allocating storage for, retrieving, receiving, processing, altering, comparing, or otherwise performing one or more operations on) adaptation data (e.g., instructions for replacing a word frequency table with a modified word frequency table that reflects the particular party's word usage), wherein the adaptation data (e.g., the instructions for replacing a word frequency table with a modified word frequency table that reflects the particular party's word usage) is correlated to at least one aspect of speech (e.g., how often one or more particular words are used) of a particular party (e.g., a user of an automated teller machine device terminal).

Referring again to FIG. 7, operation 700 may include operation 704 depicting facilitating transmission of the adaptation data to a target device, wherein the adaptation data is configured to be applied to the target device to assist in execution of a speech-facilitated transaction. For example, FIG. 1 (e.g., FIG. 1B) shows adaptation data transmission to target device facilitating module 154 facilitating transmission (e.g., transmitting, or taking one or more steps that will assist in the transmission of, regardless of the starting or ending point) of the adaptation data (e.g., the instructions for replacing a word frequency table with a modified word frequency table that reflects the particular party's word usage) to a target device (e.g., a device the particular party, e.g., the user is interacting with, e.g., the user of an automated teller machine device terminal), wherein the adaptation data (e.g., the instructions for replacing a word frequency table with a modified word frequency table that reflects the particular party's word usage) is configured to be applied (e.g., the adaptation data can be applied, with various levels of processing ranging from "none at all," to "substantial amounts of processing") to the target device (e.g., the automated teller machine device terminal) to assist in execution (e.g., to be used in at least one operation that will or could be carried out) of a speech-facilitated transaction (e.g., withdrawing two hundred dollars from the automated teller machine device terminal by commanding the automated teller machine device using speech commands for at least part of the transaction).

Referring again to FIG. 7, operation 700 may include operation 706 depicting facilitating reception of adaptation result data that is based on at least one aspect of the speech-facilitated transaction between the particular party and the target device. For example, FIG. 1 shows adaptation result data based on a result of at least one aspect of a speech-facilitated transaction reception facilitating module 156 facilitating reception (e.g., receiving, or taking one or more steps that will assist in the reception of) adaptation result data (e.g., a periodically-updated interpretation error rate that represents a rate at which words spoken by the user are not interpreted correctly by the automated teller machine device terminal) that is based on at least one aspect (e.g., correct interpretation of one or more words of) the speech-facilitated transaction (e.g., the withdrawing two hundred dollars from the automated teller machine device terminal) between the particular party (e.g., the user withdrawing the money) and the target device (e.g., the automated teller machine device terminal).

Referring again to FIG. 7, operation 700 may include operation 708 depicting determining whether to modify the adaptation data at least partly based on the adaptation result data. For example, FIG. 1 shows adaptation data modification determining at least partly based on adaptation result data module 158 determining whether to modify the adaptation data (e.g., the instructions for replacing a word frequency table with a modified word frequency table that reflects the particular party's word usage) at least partly based on the adaptation result data (e.g., a periodically-updated interpretation error rate that represents a rate at which words spoken by the user are not interpreted correctly by the automated teller machine device terminal, and when that rate goes above a certain percent, then the values in the word frequency table may be adjusted based on other data, whether collected from the particular party or not, in order to more accurately predict the words that were spoken, particularly within context, with the goal of decreasing the interpretation error rate by shifting the percentages when a speech recognition component of the automated teller machine device terminal is trying to interpret one or more words that the user is speaking).

Referring again to FIG. 7, operation 700 may include operation 710 depicting facilitating transmission of at least a portion of modified adaptation data to a receiving device. For example, FIG. 1 shows at least a portion of modified adaptation data transmission to receiving device facilitating module 160 facilitating transmission (e.g., transmitting, or taking one or more steps that will assist in the transmission of, regardless of the starting or ending point) of at least a portion of modified adaptation data (e.g., part or all of the modified word frequency table that reflects the particular party's word usage and that has been modified) to a receiving device (e.g., in an embodiment, the modification takes place prior to conclusion of the speech-facilitated transaction, and the modified adaptation data is sent back to the same automated teller machine device terminal). In some embodiments, the receiving device is different than the target device, as will be described in more detail herein.

FIGS. 8A-8P depict various implementations of operation 702, according to embodiments. Referring now to FIG. 8A, operation 702 may include operation 802 depicting managing data configured to assist in carrying out at least a portion of a speech transaction conducted by the particular party, wherein the adaptation data is correlated to at least one aspect of speech of the particular party. For example, FIG. 2 shows adaptation data configured to assist in carrying out at least a portion of a speech-facilitated transaction and correlated to at least one particular party speech aspect managing module 202 managing data (e.g., a list of the way that the particular party pronounces ten words, e.g., the numbers zero through nine) configured to assist in carrying out (e.g., the data will be used to improve accuracy of the component processing the user's speech, specifically when processing spoken numbers, e.g., "three cheeseburgers") at least a portion of a speech transaction (e.g., ordering a cheeseburger from an automated drive-thru window) conducted by the particular party (e.g., the customer ordering from his car), wherein the adaptation data (e.g. the list of the way that the particular party pronounces the ten words) is correlated to at least one aspect of speech (e.g., pronunciation) of the particular party (e.g., the customer ordering from his car).

Referring again to FIG. 8A, operation 802 may include operation 804 depicting managing data comprising instructions for adapting a speech recognition component of a target device configured to carry out at least a portion of the speech transaction conducted by the particular party, wherein the adaptation data is correlated to at least one aspect of speech of the particular party. For example, FIG. 2 shows adaptation data configured to adapt a speech recognition component of a target device configured to carry out a speech-facilitated transaction and correlated to at least one particular party speech aspect managing module 204 managing data comprising instructions for adapting a speech recognition component (e.g., the hardware or software inside an automated airline ticket dispenser that processes speech) of a target device (e.g., the automated airline ticket dispenser) configured to carry out at least a portion of the speech transaction (e.g., printing the airline ticket) conducted by the particular party (e.g., the prospective passenger), wherein the adaptation data (e.g., instructions for replacing a word frequency table with a modified word frequency table that reflects the particular party's word usage, e.g., the particular party may be from Washington, D.C., and thus the words "D.C." might have a higher usage than the standard for the automated airline ticket dispenser), is correlated to at least one aspect of speech (e.g., frequency of word usage) of the particular party.

Referring again to FIG. 8A, operation 804 may include operation 806 depicting managing data comprising a pronunciation dictionary that is configured to supplement a speech recognition component of the target device configured to carry out at least a portion of the speech transaction conducted by the particular party, wherein the adaptation data is correlated to at least one aspect of speech of the particular party. For example, FIG. 2 shows adaptation data comprising a pronunciation dictionary configured to supplement a speech recognition component of the target device configured to carry out a speech-facilitated transaction and correlated to at least one particular party speech aspect managing module 206 managing data comprising a pronunciation dictionary that is configured to supplement a speech recognition component (e.g., the speech recognition and processing module) of the target device (e.g., a speech-enabled Blu-ray player) configured to carry out at least a portion of the speech transaction (e.g., ordering the device to play a particular episode of "The Wire Season 4" disc) conducted by the particular party (e.g., the user and/or owner of the Blu-ray device), wherein the adaptation data is correlated to at least one aspect of speech (e.g., pronunciation) of the particular party.

Referring again to FIG. 8A, operation 806 may include operation 808 depicting managing data comprising a pronunciation dictionary that is configured to supplement a pronunciation dictionary of the speech recognition module of the target device configured to carry out at least a portion of the speech-facilitated transaction conducted by the particular party, wherein the adaptation data is correlated to at least one aspect of speech of the particular party. For example, FIG. 2 shows adaptation data comprising a pronunciation dictionary configured to supplement a pronunciation dictionary of the speech recognition component of the target device configured to carry out a speech-facilitated transaction and correlated to at least one particular party speech aspect managing module 208 managing data comprising a pronunciation dictionary that is configured to supplement a pronunciation dictionary of the speech recognition module of the target device (e.g., a portable, car-mountable navigation system, e.g., Garmin Nuvi, that can receive speech commands) configured to carry out at least a portion of the speech-facilitated transaction (e.g., asking for directions to the nearest Five Guys burgers) conducted by the particular party (e.g., the user of the device), wherein the adaptation data is correlated to at least one aspect of speech (e.g., pronunciation) of the particular party.

Referring again to FIG. 8A, operation 808 may include operation 810 depicting managing data comprising a pronunciation dictionary that is configured to replace at least one word of a speech recognition component pronunciation dictionary of the target device configured to carry out at least a portion of the speech-facilitated transaction conducted by the particular party, wherein the adaptation data is correlated to at least one aspect of speech of the particular party. For example, FIG. 2 shows adaptation data comprising a pronunciation dictionary configured to replace at least one word of a pronunciation dictionary of the speech recognition component of the target device configured to carry out a speech-facilitated transaction and correlated to at least one particular party speech aspect managing module 210 managing data comprising a pronunciation dictionary that is configured to replace at least one word (e.g., "run faster") of a speech recognition component pronunciation dictionary of the target device (e.g., a video game system) configured to carry out at least a portion of the speech-facilitated transaction (e.g., issuing a command to the game) conducted by the particular party (e.g., the video game player), wherein the adaptation data (e.g., the pronunciation dictionary) is correlated to at least one aspect of speech (e.g., pronunciation) of the particular party (e.g., the video game player).

Referring now to FIG. 8B, operation 810 may include operation 812 depicting managing data comprising a pronunciation dictionary that is configured to supplement the speech recognition component pronunciation dictionary of the target device configured to carry out at least a portion of the speech transaction conducted by the particular party, wherein the pronunciation dictionary is based on pronunciation of one or more words by the particular party. For example, FIG. 2 shows adaptation data comprising a pronunciation dictionary configured to replace at least one word of a pronunciation dictionary of the speech recognition component of the target device configured to carry out a speech-facilitated transaction and based on at least one pronunciation of a word by the particular party managing module 212 managing data comprising a pronunciation dictionary that is configured to supplement the speech recognition component pronunciation dictionary of the target device (e.g., a smartphone configured to receive voice commands) configured to carry out at least a portion of the speech transaction (e.g., ordering the smartphone to make a call) conducted by the particular party (e.g., the user), wherein the pronunciation dictionary is based on pronunciation of one or more words by the particular party (e.g., "call," "home," "pizza parlor").

Figure 8C:
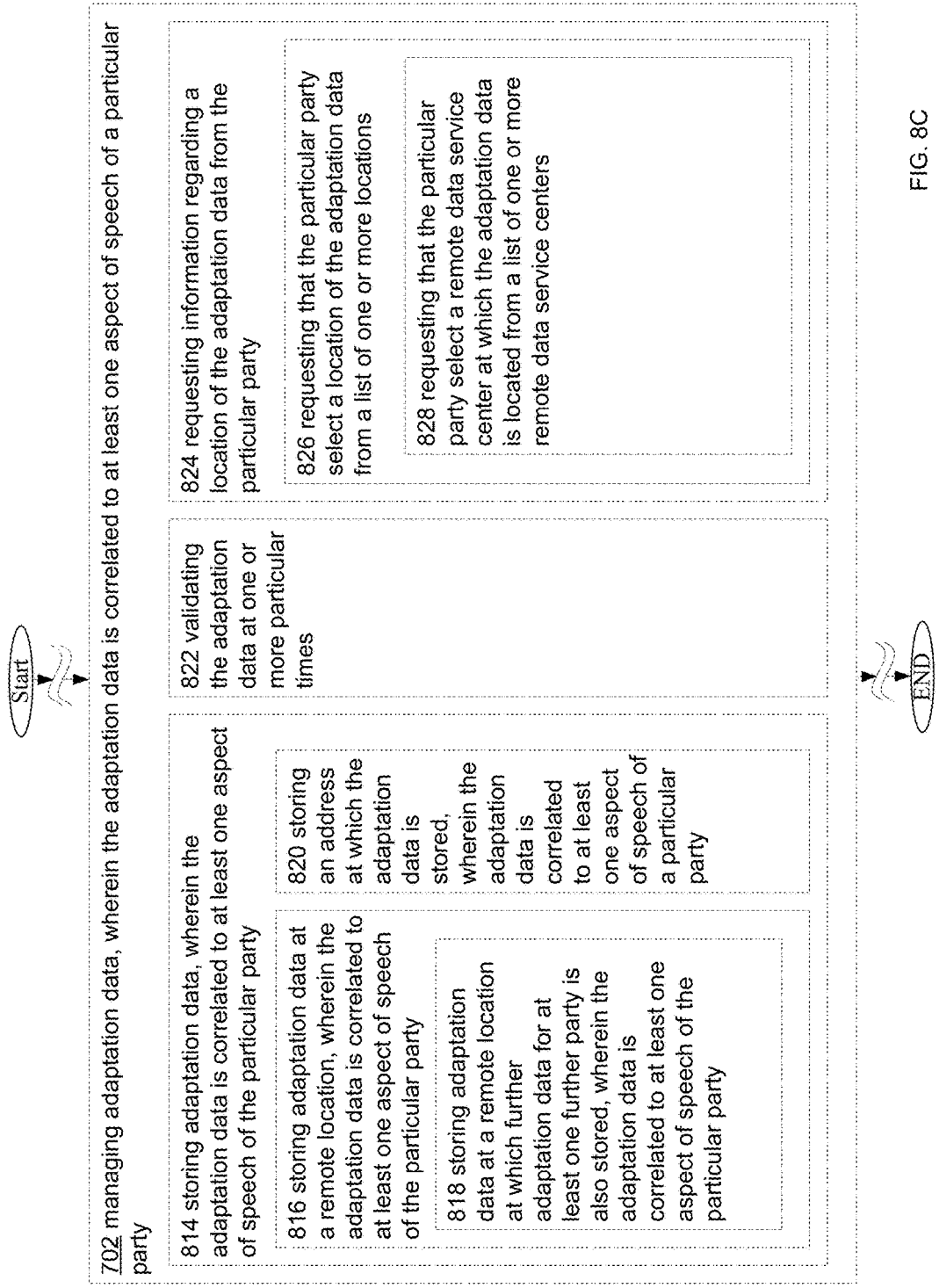
FIG. 8C is a high-level logic flowchart of a process depicting alternate implementations of a managing adaptation data operation 702 of FIG. 7.

Referring now to FIG. 8C, operation 702 may include operation 814 depicting storing adaptation data, wherein the adaptation data is correlated to at least one aspect of speech of the particular party. For example, FIG. 2 shows adaptation data correlated to at least one particular party speech aspect storing module 214 storing (e.g., placing, writing, moving, or accepting into memory) adaptation data (e.g., a phoneme pronunciation database), wherein the adaptation data (e.g., the phoneme pronunciation database) is correlated to at least one aspect of speech of the particular party (e.g., the phoneme pronunciation database is keyed to the particular party's pronunciation of phonemes).

Referring again to FIG. 8C, operation 814 may include operation 816 depicting storing adaptation data at a remote location, wherein the adaptation data is correlated to at least one aspect of speech of the particular party. For example, FIG. 2 shows adaptation data correlated to at least one particular party speech aspect storing at remote location module 216 storing adaptation data (e.g., a phrase completion algorithm) at a remote location (e.g., a computer, server, or other device that is discrete from the particular device carrying out one or more of the steps), wherein the adaptation data is correlated to at least one aspect of speech of the particular party (e.g., the phrase completion algorithm is at least partly based on the previous speech of the user).

Referring again to FIG. 8C, operation 816 may include operation 818 depicting storing adaptation data at a remote location at which further adaptation data for at least one further party is also stored, wherein the adaptation data is correlated to at least one aspect of speech of the particular party. For example, FIG. 2, e.g., FIG. 2B, shows adaptation data correlated to at least one particular party speech aspect storing at remote location that also stores further adaptation data correlated to a further party module 218 storing adaptation data (e.g., a basic pronunciation adjustment algorithm) at a remote location (e.g., a remote server) at which further adaptation data (e.g., one or more other basic pronunciation adjustment algorithms at least partly based on previous speech of one or more parties other than the particular party) for at least one further party (e.g., someone other than the user) is also stored, wherein the adaptation data is correlated to at least one aspect of speech of the particular party (e.g., the basic pronunciation adjustment algorithm is based on the user's speech).

Referring again to FIG. 8C, operation 814 may include operation 820 depicting storing an address at which the adaptation data is stored, wherein the adaptation data is correlated to at least one aspect of speech of a particular party. For example, FIG. 2, e.g., FIG. 2B, shows address at which adaptation data correlated to at least one particular party speech aspect is located storing module 220 storing an address (e.g., a location, e.g., a web address, or an address in memory) at which the adaptation data (e.g., a French language substitution algorithm) is stored, wherein the adaptation data is correlated to at least one aspect of speech of a particular party (e.g., the particular party is a French speaker, and the adaptation data replaces the English pronunciations of words with their French counterparts).

Referring again to FIG. 8C, operation 702 may include operation 822 depicting validating the adaptation data at one or more particular times. For example, FIG. 2, e.g., FIG. 2B, shows adaptation data correlated to at least one particular party speech aspect validating at a particular time module 222 validating (e.g., determining that the adaptation data is valid, e.g., by measuring the size, or by generating a hash based on the data for comparison) the adaptation data (e.g., an utterance ignoring algorithm) at one or more particular times (e.g., once a day).

Referring again to FIG. 8C, operation 702 may include operation 824 depicting requesting information regarding a location of the adaptation data from the particular party. For example, FIG. 2, e.g., FIG. 2B, shows adaptation data correlated to at least one particular party speech aspect location information requesting module 224 requesting information regarding a location of the adaptation data (e.g., requesting to know an IP or World Wide Web address of the location of the adaptation data, e.g., through prompting, either with speech or through some other interface) from the particular party (e.g., the user).

Referring again to FIG. 8C, operation 824 may include operation 826 depicting requesting that the particular party select a location of the adaptation data from a list of one or more locations. For example, FIG. 2, e.g., FIG. 2B, shows location of adaptation data from list particular party selecting module 226 requesting that the particular party (e.g., the user) select a location of the adaptation data (e.g., a country where the user is located, which is also the location of the closest server where the adaptation data may be found, even though the adaptation data may also be in other locations) from a list of one or more locations (e.g., countries that house servers that store adaptation data).

Referring again to FIG. 8C, operation 826 may include operation 828 depicting requesting that the particular party select a remote data service center at which the adaptation data is located from a list of one or more remote data service centers. For example, FIG. 2, e.g., FIG. 2B, shows remote data service center location of adaptation data from list of one or more remote data service centers particular party selecting module 228 requesting that the particular party (e.g., the user) select a remote data service center (e.g., a cloud service provided by, e.g., Google, or Amazon, or Microsoft, or another remote data center provider) at which the adaptation data is located, from a list of one or more remote data service centers (e.g., the various remote data service centers are listed for selection by the user through any of a variety of interfaces).

Referring now to FIG. 8D, operation 702 may include operation 830 depicting selectively providing authorization to view the adaptation data. For example, FIG. 2, e.g., FIG. 2C, shows adaptation data correlated to at least one particular party speech aspect selectively providing viewing authorization module 230 selectively providing authorization (e.g., providing a limited-use password, a time-based password, or other type of password) to view (e.g., use, and to transmit data for use with the adaptation data, but without retrieving a local copy of the adaptation data) the adaptation data (e.g., a noise level dependent filtration algorithm).

Referring again to FIG. 8D, operation 702 may include operation 832 depicting selectively providing authorization to retrieve the adaptation data. For example, FIG. 2, e.g., FIG. 2C, shows adaptation data correlated to at least one particular party speech aspect selectively providing retrieval authorization module 232 selectively providing authorization (e.g., a one-time retrieval code) to retrieve (e.g. copy from a different location) the adaptation data (e.g., an emotion-based pronunciation adjustment algorithm for use when the particular party is speaking under duress, e.g., after a car accident, and the particular party is speaking to the car's automated systems).

Figure 9B:
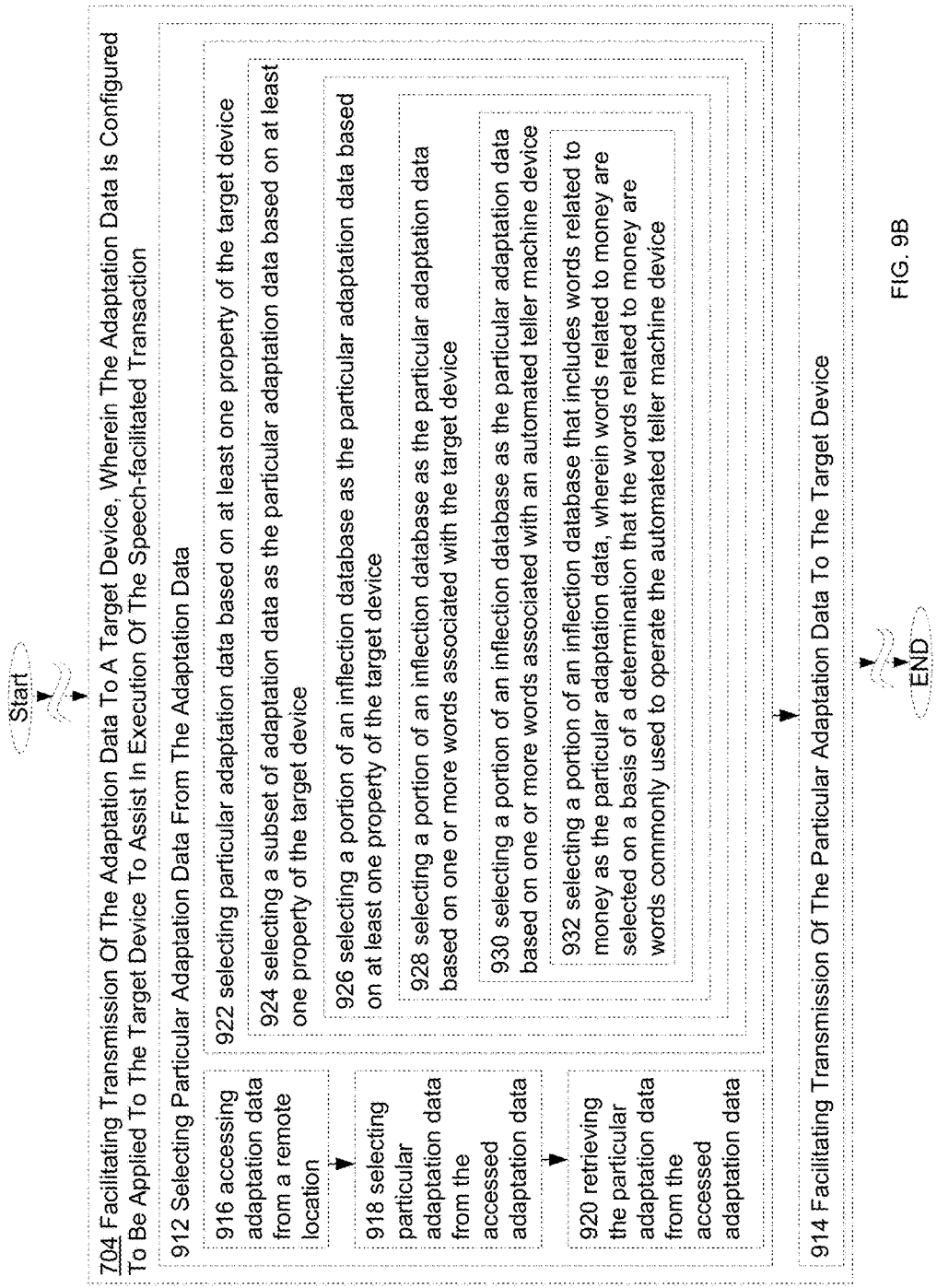
FIG. 9B is a high-level logic flowchart of a process depicting alternate implementations of an adaptation data transmission facilitating operation 704 of FIG. 7.

FIGS. 9A-9G depict various implementations of operation 704, according to embodiments. Referring now to FIG. 9A, operation 704 may include operation 902 depicting transmitting the adaptation data to the target device, wherein the adaptation data is configured to be applied to the target device to assist in execution of the speech-facilitated transaction. For example, FIG. 3, e.g., FIG. 3A, shows adaptation data transmitting to target device module 302 transmitting the adaptation data (e.g., a syllable pronunciation database) to the target device (e.g., the in-vehicle entertainment system), wherein the adaptation data (e.g., the syllable pronunciation database) is configured to be applied to the target device (e.g., the in-vehicle entertainment system) to assist in execution of the speech-facilitated transaction (e.g., raising the volume).

Referring again to FIG. 9A, operation 704 may include operation 904 depicting transmitting instructions for retrieving the adaptation data to the target device, wherein the adaptation data is configured to be applied to the target device to assist in execution of the speech-facilitated transaction. For example, FIG. 3, e.g., FIG. 3A, shows adaptation data retrieval instructions transmission to target device facilitating module 304 transmitting instructions (e.g., a list of passwords needed, or an address where the information can be accessed) for retrieving the adaptation data (e.g., an accent-based pronunciation modification algorithm) to the target device (e.g., a speech-controlled television), wherein the adaptation data is configured to be applied to the target device (e.g., the algorithm is designed to be run at least once as part of the speech processing done by the target device) to assist in execution of the speech-facilitated transaction (e.g., changing the channel on the speech-controlled television).

Referring again to FIG. 9A, operation 704 may include operation 906 depicting transmitting a location at which the adaptation data is configured to be transmitted, said location transmitted to the target device, wherein the adaptation data is configured to be applied to the target device to assist in execution of the speech-facilitated transaction. For example, FIG. 3, e.g., FIG. 3A, shows adaptation data retrieval location transmission to target device facilitating module 306 transmitting a location (e.g., an intranet address) at which the adaptation data (e.g., a sentence diagramming path selection algorithm) is configured to be transmitted (e.g., the location stores adaptation data that is ready for transmission to various target devices, e.g., a specific location on a company network) to the target device (e.g., a company computer that is part of a business enterprise solution), wherein the adaptation data is configured to be applied to the target device (e.g., the sentence diagramming path selection algorithm is used by the company computer to determine the best sentence diagramming paths for use with the user that is currently logged on to the company computer) to assist in execution of the speech-facilitated transaction (e.g., typing a memo into a word processor).

Referring again to FIG. 9A, operation 704 may include operation 840 depicting facilitating transmission of the adaptation data to a target device, wherein the adaptation data represents a pronunciation of one or more words in a particular language spoken by the particular party. For example, FIG. 3, e.g., FIG. 3A, shows adaptation data representing pronunciation of one or more words in a particular language spoken by the particular party transmission to target device facilitating module 308 facilitating transmission (e.g., taking one or more steps that assist in the transmission of) of the adaptation data (e.g., an uncommon word pronunciation guide) to a target device (e.g., an airline ticket dispensing machine), wherein the adaptation data represents a pronunciation of one or more words in a particular language (e.g., Spanish) spoken by the particular party (e.g., the user, who, since they are in an airport, may not be a native speaker of the language).

Referring again to FIG. 9A, operation 908 may include operation 910 depicting facilitating transmission of the adaptation data to a target device, wherein the adaptation data represents a pronunciation of one or more words in a particular language spoken by the particular party that is different from a language for which the target device is designed to operate. For example, FIG. 3, e.g., FIG. 3A, shows adaptation data representing pronunciation of one or more words in a particular language spoken by the particular party that is different from a target-device operation configured language transmission to target device facilitating module 310 facilitating transmission of the adaptation data (e.g., a pronunciation guide keyed to a language seen as "foreign" from the target device perspective) to a target device (e.g., an airline ticket dispensing machine), wherein the adaptation data represents a pronunciation of one or more words in a particular language (e.g., French) spoken by the particular party that is different from a language for which the target device is designed to operate (e.g., English).

Referring now to FIG. 9B, operation 704 may include operation 912 depicting selecting particular adaptation data from the adaptation data. For example, FIG. 3, e.g., FIG. 3B, shows particular adaptation data selecting from adaptation data module 312 selecting particular adaptation data (e.g., a set of proper noun pronunciations, e.g., city names) from the adaptation data (e.g., word pronunciations).

Referring again to FIG. 9B, operation 704 may include operation 914 depicting facilitating transmission of the particular adaptation data to the target device. For example, FIG. 3, e.g., FIG. 3B, shows particular adaptation data to target device transmission facilitating module 314 facilitating transmission (e.g., specifying a protocol for transmission) of the particular adaptation data (e.g., the set of proper noun pronunciations) to the target device (e.g., the automated drive-thru order taking machine).

Referring again to FIG. 9B, operation 912 may include operation 916 depicting accessing adaptation data from a remote location. For example, FIG. 3, e.g., FIG. 3B, shows adaptation data from remote location accessing module 316 accessing (e.g. reading) adaptation data (e.g., a proper noun pronunciation database) from a remote location (e.g., a remote sever).

Referring again to FIG. 9B, operation 912 may include operation 918 depicting selecting particular adaptation data from the accessed adaptation data. For example, FIG. 3, e.g., FIG. 3B, shows particular adaptation data selecting from accessed adaptation data module 318 selecting particular adaptation data (e.g., a particular set of proper noun pronunciations, e.g., names of neighborhoods in a city in which the particular party is located) from the accessed adaptation data (e.g., the accessed adaptation data is a list of more proper noun pronunciations).

Referring again to FIG. 9B, operation 912 may include operation 920 depicting retrieving the particular adaptation data from the accessed adaptation data. For example, FIG. 3, e.g., FIG. 3B, shows particular adaptation data from accessed adaptation data retrieving module 320 retrieving the particular adaptation data (e.g., the names of neighborhoods of the city, e.g., for Washington, D.C., retrieving the names "Alexandria," "Adams Morgan," "Foggy Bottom," "Chinatown," and "DuPont Circle") from the accessed adaptation data (e.g., a list of more proper noun pronunciations, not all of which may be retrieved).

Referring again to FIG. 9B, operation 912 may include operation 922 depicting selecting particular adaptation data based on at least one property of the target device. For example, FIG. 3, e.g., FIG. 3B, shows particular adaptation data selecting based on at least one target device property module 322 selecting particular adaptation data (e.g., a list of the way that the particular party pronounces ten words, e.g., the numbers zero through nine) based on at least one property of the target device (e.g., the target device is an automated teller machine that processes a lot of speech containing numbers).

Referring again to FIG. 9B, operation 922 may include operation 924 depicting selecting a subset of adaptation data as the particular adaptation data based on at least one property of the target device. For example, FIG. 3, e.g., FIG. 3B, shows subset of adaptation data selecting based on at least one target device property module 324 selecting a subset of adaptation data (e.g., a phrase completion algorithm tailored to ordering food) as the particular adaptation data (e.g., the phrase completion algorithm tailored to ordering food) based on at least one property of the target device (e.g., that the target device is an automated drive-thru system)

Referring again to FIG. 9B, operation 924 may include operation 926 depicting selecting a portion of an inflection database as the particular adaptation data based on at least one property of the target device. For example, FIG. 3, e.g., FIG. 3B, shows portion of inflection database selecting based on at least one target device property module 326 selecting a portion of an inflection database (e.g., selecting the inflections dealing with words likely to be used in the speech-facilitated transaction) as the particular adaptation data (e.g., the adaptation data has an inflection database with many words, and the particular adaptation data selects some of those words) based on at least one property of the target device (e.g., the target device is a video game system playing a warfare game, e.g., "Call of Duty," so words are selected from the inflection database that are related to commands given in a war game, e.g., "take cover," "concentrate fire on the eastern ridge," etc.).

Referring again to FIG. 9B, operation 926 may include operation 928 depicting selecting a portion of an inflection database as the particular adaptation data based on one or more words associated with the target device. For example, FIG. 3, e.g., FIG. 3B, shows portion of inflection database selecting based on one or more words associated with target device module 328 selecting a portion of an inflection database (e.g., one or more words from a larger inflection database containing more words than are selected) as the particular adaptation data (e.g., words from the inflection database including "defrost," "power level," and the numbers "one" to "sixty," based on one or more words associated with the target device (e.g., a speech-commanded microwave, which is commanded by words like "defrost," and "power level," and uses the numbers one to sixty to understand time (e.g., forty-five seconds")).

Referring again to FIG. 9B, operation 928 may include operation 930 depicting selecting a portion of an inflection database as the particular adaptation data based on one or more words associated with an automated teller machine device. For example, FIG. 3, e.g., FIG. 3B shows portion of inflection database selecting based on one or more words associated with an automated teller device module 330 selecting a portion of an inflection database (e.g., a portion of the inflection database that includes words such as "deposit," "withdraw," "checking account," and numbers) as the particular adaptation data (e.g., an inflection database of one or more words) based on one or more words associated with an automated teller machine (e.g., words such as "deposit," "withdraw," "checking account," and numbers).

Referring again to FIG. 9B, operation 930 may include operation 932 depicting selecting a portion of an inflection database that includes words related to money as the particular adaptation data, wherein words related to money are selected on a basis of a determination that the words related to money are words commonly used to operate the automated teller machine device. For example, FIG. 3, e.g., FIG. 3B, shows portion of inflection database selecting based on words related to money determined to be associated with an automated teller device module 332 selecting a portion of an inflection database that includes words related to money (e.g., "cash," "checking," "deposit," "withdraw") as the particular adaptation data, wherein words related to money are selected on a basis of a determination that the words related to money are words commonly used to operate the automated teller machine device (e.g., this determination may happen at the time of transaction, or may happen when the machine is first installed, or may happen at periodic or nonperiodic intervals).

Figure 9C:
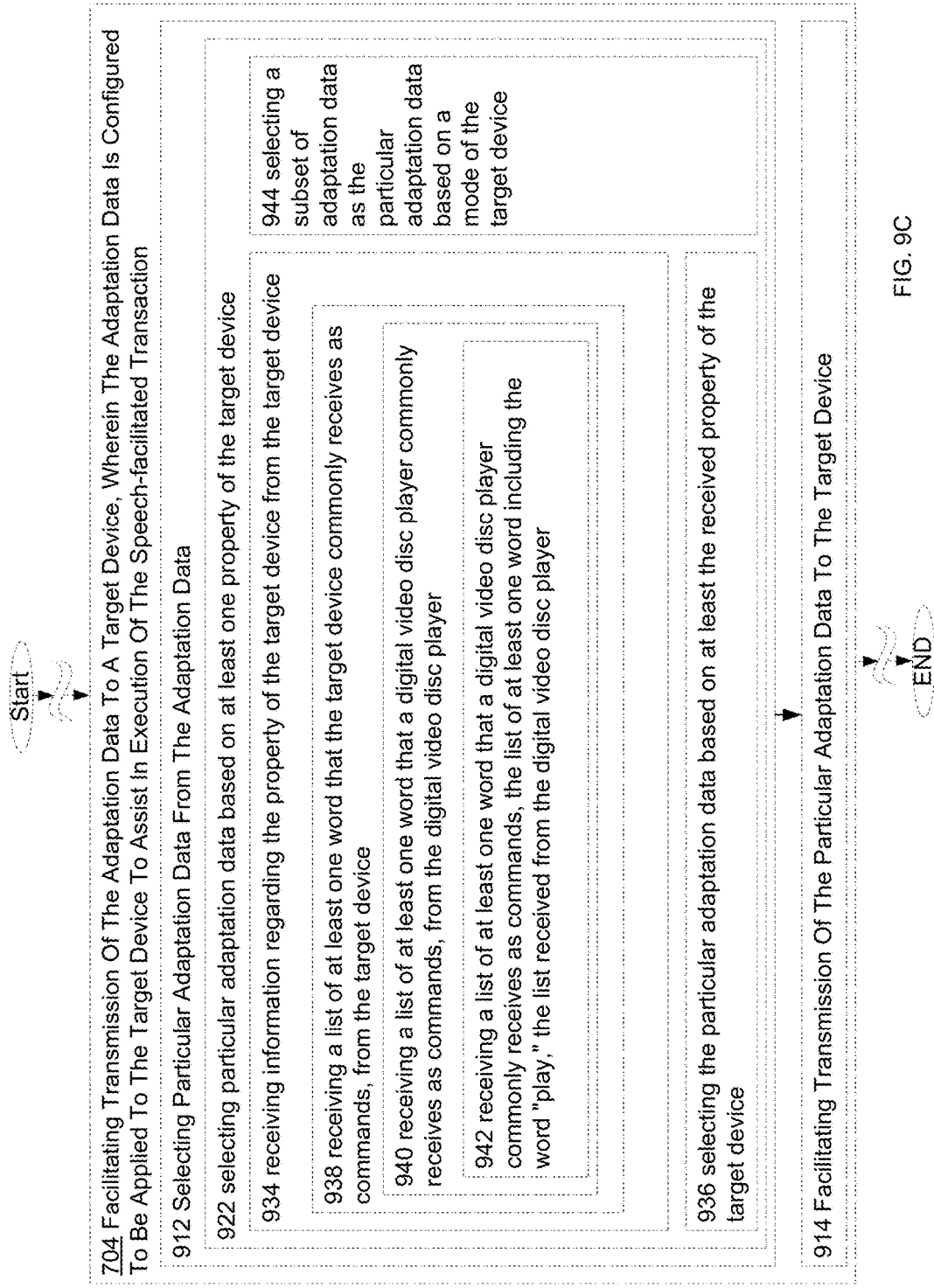
FIG. 9C is a high-level logic flowchart of a process depicting alternate implementations of an adaptation data transmission facilitating operation 704 of FIG. 7.

Referring now to FIG. 9C, operation 922 may include operation 934 depicting receiving information regarding the property of the target device from the target device. For example, FIG. 3, e.g., FIG. 3C, shows information regarding the at least one property of the target device receiving from target device module 334 receiving information regarding the property of the target device (e.g., receiving information identifying the target device as an audio/visual receiver) from the target device (e.g., the audio/visual receiver).

Referring again to FIG. 9C, operation 922 may include operation 936 depicting selecting the particular adaptation data based on at least the received property of the target device. For example, FIG. 3, e.g., FIG. 3C, shows particular adaptation data selecting based on at least the received property of the target device module 336 selecting the particular adaptation data (e.g., selecting a portion of a pronunciation dictionary that deals with words related to the menu for the drive thru-terminal at which the user is ordering) based on at least the received property (e.g., that the drive-thru terminal is a McDonald's drive thru terminal, and uses words like "Big Mac" and "quarter-pounder") of the target device (e.g., an automated McDonald's drive thru menu).

Referring again to FIG. 9C, operation 934 may include operation 938 depicting receiving a list of at least one word that the target device commonly receives as a command, from the target device. For example, FIG. 3, e.g., FIG. 3C, shows information regarding at least one word commonly used as a target device command receiving from target device module 338 receiving a list of at least one word (e.g., "lock door," "activate alarm," "call police") that the target device (a voice controlled home security system) commonly receives as a command, from the target device (e.g., the home security system transmits at least one word that is used to command it, the command word may be a word that the device has been programmed to accept, either by the user or by the manufacturer, or it may be based on common words that home security systems receive").

Referring again to FIG. 9C, operation 938 may include operation 940 depicting receiving a list of at least one word that a digital video disc player commonly receives as a command, from the digital video disc player. For example, FIG. 3, e.g., FIG. 3C, shows information regarding at least one word commonly used to command a digital video disc player command receiving from the digital video disc player module 340 receiving a list of at least one word (e.g., "play," "stop," and "fast-forward") that a digital video disc player (e.g., a Samsung Blu-ray player) commonly receives as a command, from the digital video disc player (e.g., the Samsung Blu-ray player).

Referring again to FIG. 9C, operation 940 may include operation 942 depicting receiving a list of at least one word that a digital video disc player commonly receives as a command, the list of at least one word including the word "play," the list received from the digital video disc player. For example, FIG. 3, e.g., FIG. 3C, shows command play as a word commonly used to command a digital video disc player receiving from the digital video disc player module 342 receiving a list of at least one word that a digital video disc player (e.g., a Sony DVD player) commonly receives as a command, the list of at least one word including the word play (e.g., "play" being a word commonly used by the Sony DVD player to play a disc that has been inserted into the device), the list received from the digital video disc player (e.g., the Sony DVD player).

Referring again to FIG. 9C, operation 922 may include operation 944 depicting selecting a subset of adaptation data as the particular adaptation data based on a mode of the target device. For example, FIG. 3, e.g., FIG. 3C, shows particular adaptation data selecting based on a target device mode module 344 selecting a subset of adaptation data (e.g., pronunciation data for the word "broil") as the particular adaptation data based on a mode (e.g., a kitchen device that can operate as a convection oven or as a microwave, and in an example, is operating as a convection oven, thus using words such as "broil" in convection oven mode) of the target device (e.g., the device that can operate as a convection oven or as a microwave).

Figure 9D:
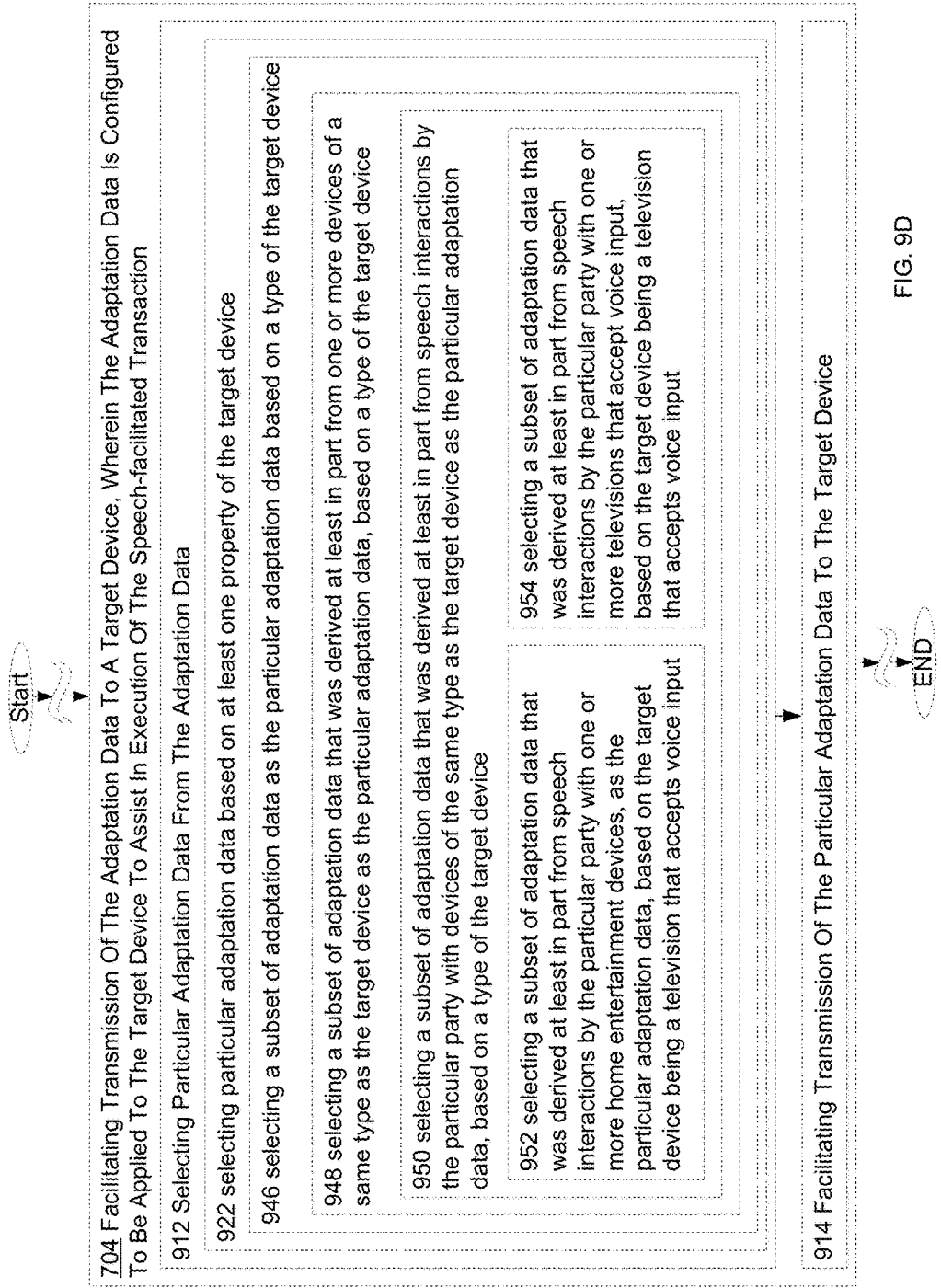
FIG. 9D is a high-level logic flowchart of a process depicting alternate implementations of an adaptation data transmission facilitating operation 704 of FIG. 7.

Referring now to FIG. 9D, operation 922 may include operation 946 depicting selecting a subset of adaptation data as the particular adaptation data based on a type of the target device. For example, FIG. 3, e.g., FIG. 3D, shows particular adaptation data selecting based on a type of target device module 346 selecting a subset of adaptation data (e.g., pronunciations of words related to the type of the device) as the particular adaptation data based on a type (e.g., is a piece of audio visual equipment, or is a piece of kitchen equipment, or home security equipment) of the target device (a piece of audio visual equipment, e.g., a voice-controlled Panasonic television).

Referring again to FIG. 9D, operation 946 may include operation 948 depicting selecting a subset of adaptation data that was derived at least in part from one or more devices of a same type as the target device as the particular adaptation data, based on a type of the target device. For example, FIG. 3, e.g., FIG. 3D, shows subset of adaptation data derived at least in part from one or more devices of a same type as the target device selecting module 348 selecting a subset of adaptation data (e.g., selecting a phrase completion algorithm from one or more phrase completion algorithms) that was derived at least in part from one or more devices (e.g., the phrase completion algorithm is selected by selecting a phrase completion algorithm having the best success rate when previously used with the type of device, e.g., navigation system) of a same type (e.g., navigation systems, whether or not from the same brand) as the target device (e.g., a Garmin Nuvi navigation device) as the particular adaptation data (e.g., the selected phrase completion algorithm), based on a type of the target device (e.g., the Garmin Nuvi is a navigation device).

Referring again to FIG. 9D, operation 948 may include operation 950 depicting selecting a subset of adaptation data that was derived at least in part from one or more speech interactions by the particular party with one or more devices of the same type as the target device as the particular adaptation data, based on a type of the target device. For example, FIG. 3, e.g., FIG. 3D, shows subset of adaptation data derived at least in part from one or more speech interactions with one or more devices of a same type as the target device selecting module 350 selecting a subset of adaptation data (e.g., pronunciations of common video game terms, e.g., "jump," "shoot," "duck," and "fire") that was derived at least in part from one or more speech interactions by the particular party (e.g., the particular party playing other speech-controlled games) with one or more devices of the same type (e.g., video game systems, which may or may not be the same type of system (e.g., Xbox, computer games, Sony PlayStation), and may or may not be the same type of game (e.g., war game, shooting game, sports game) as the target device (e.g., a voice-controlled video game system) as the particular adaptation data (e.g., pronunciations of video game words), based on a type (e.g., video game system) of the target device (e.g., voice controlled video game system from Microsoft).

Referring again to FIG. 9D, operation 950 may include operation 952 depicting selecting a subset of adaptation data that was derived at least in part from one or more speech interactions by the particular party with one or more home entertainment devices, as the particular adaptation data, based on the target device being a television that accepts voice input. For example, FIG. 3, e.g., FIG. 3D, shows subset of adaptation data derived at least in part from one or more speech interactions with home entertainment devices when the target device is a voice input accepting television selecting module 352 selecting a subset of adaptation data (e.g., pronunciations of movies, e.g., "Spider-Man" and "The Social Network" that was derived at least in part from speech interactions by the particular party (e.g., the user ordering different movies) with one or more home entertainment devices (e.g., a speech-enabled streaming video delivery device), as the particular adaptation data, based on the target device being a television (e.g., a device of a same type, e.g., "audio visual device" or "home entertainment device") that accepts voice input (e.g., a voice-controlled Sony television with an Internet connection for a streaming video service like Netflix).

Referring again to FIG. 9D, operation 950 may include operation 954 depicting selecting a subset of adaptation data that was derived at least in part from one or more speech interactions by the particular party with one or more televisions that accept voice input, based on the target device being a television that accepts voice input. For example, FIG. 3, e.g., FIG. 3D, shows subset of adaptation data derived at least in part from one or more speech interactions with one or more televisions when the target device is a voice input accepting television selecting module 354 selecting a subset of adaptation data (e.g., a phrase completion algorithm useful for voice-controlled televisions selected from one or more phrase completion algorithms available as adaptation data) that was derived in part from one or more speech interactions by the particular party (e.g., the watcher of the television) with one or more televisions that accept voice input, based on the target device being a television that accepts voice input.

Figure 9E:
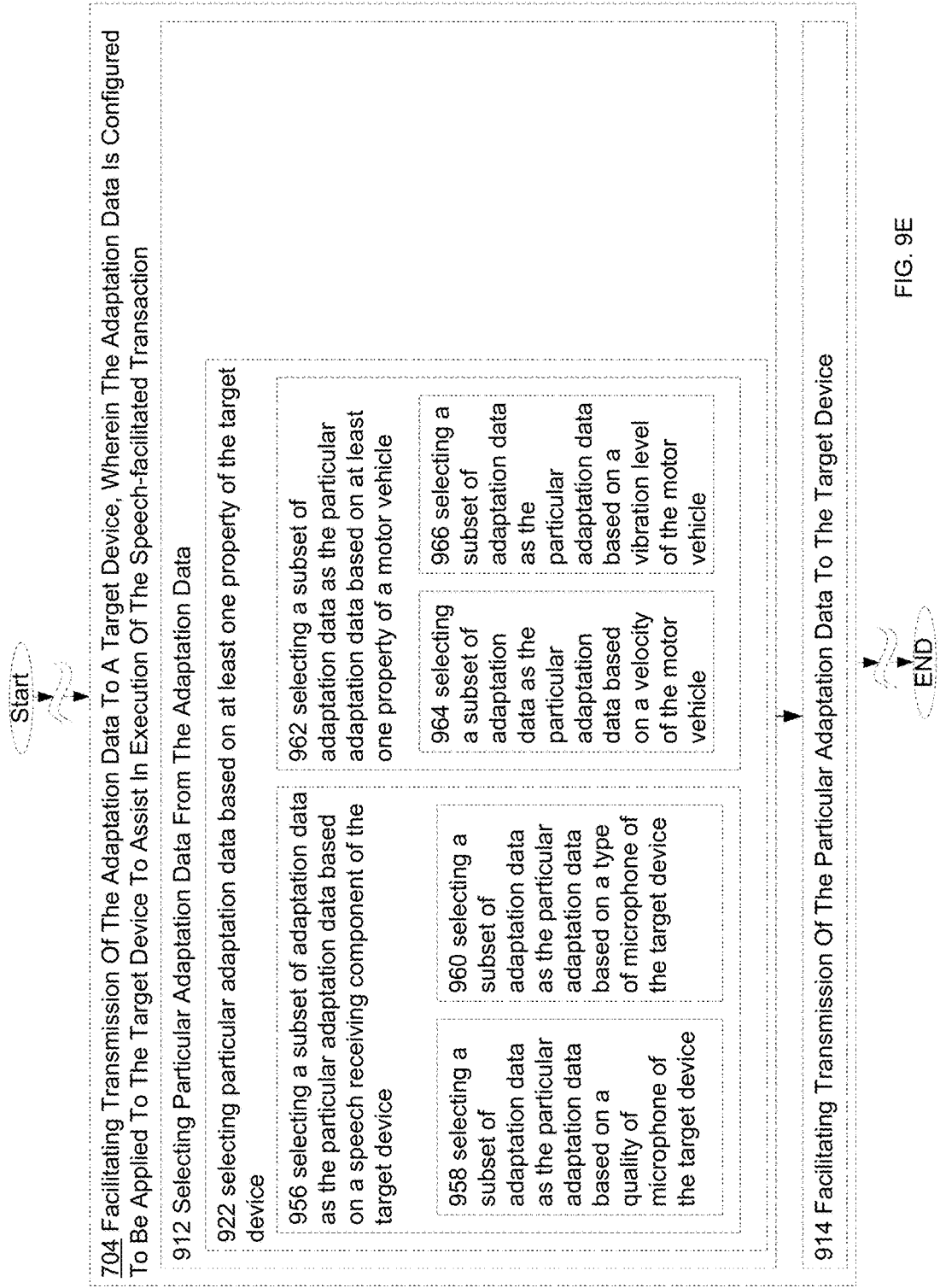
FIG. 9E is a high-level logic flowchart of a process depicting alternate implementations of an adaptation data transmission facilitating operation 704 of FIG. 7.

Referring now to FIG. 9E, operation 922 may include operation 956 depicting selecting a subset of adaptation data as the particular adaptation data based on a speech receiving component of the target device. For example, FIG. 3, e.g., FIG. 3E, shows particular adaptation data selecting based on a speech receiving component of target device module 356 selecting a subset of adaptation data (e.g., selecting a minimal-processing language processing algorithm from a list of available algorithms) as the particular adaptation data based on a speech receiving component (e.g., a particular speech receiving component that has low processing power and needs to be able to process the speech quickly) of the target device (e.g., an automated train ticket dispensing terminal disposed in New York City's Penn Station, e.g., which terminal has low processing power but needs to process lots of speech quickly).

Referring again to FIG. 9E, operation 356 may include operation 958 depicting selecting a subset of adaptation data as the particular adaptation data based on a quality of microphone of the target device. For example, FIG. 3, e.g., FIG. 3E, shows particular adaptation data selecting based on a quality of a microphone of target device module 358 selecting a subset of adaptation data (e.g., a match-closeness algorithm that requires high quality voice samples from a list of one or more algorithms) as the particular adaptation data based on a quality of microphone (e.g., a high-quality microphone attached to a company computer used to dictate memorandums) of the target device (e.g., a high quality microphone used on a company computer in an enterprise environment to command the computer using speech).

Referring again to FIG. 9E, operation 356 may include operation 960 depicting selecting a subset of adaptation data as the particular adaptation data based on a type of microphone of the target device. For example, FIG. 3, e.g., FIG. 3E, shows particular adaptation data selecting based on a type of a microphone of target device module 360 selecting a subset of adaptation data (e.g., selecting an echo-reducing pronunciation algorithm) as the particular adaptation data based on a type of microphone (e.g., unidirectional, omnidirectional, etc.) of the target device (e.g., a speech-enabled automated teller machine device).

Referring again to FIG. 9E, operation 922 may include operation 962 depicting selecting a subset of adaptation data as the particular adaptation data based on at least one property of a motor vehicle. For example, FIG. 3, e.g., FIG. 3E, shows particular adaptation data selecting based on at least one motor vehicle property module 362 selecting a subset of adaptation data (e.g., selecting pronunciations of particular vocabulary words that a particular motor vehicle is designed to use, e.g., "move left mirror," in a vehicle whose mirror systems are speech-enabled, would be selected in this example, but perhaps not selected in a motor vehicle whose mirror systems are not speech enabled) as the particular adaptation data based on at least one property (e.g., speech-enabled mirror control systems) of a motor vehicle.

Referring again to FIG. 9E, operation 962 may include operation 964 depicting selecting a subset of adaptation data as the particular adaptation data based on a velocity of the motor vehicle. For example, FIG. 3, e.g., FIG. 3E, shows particular adaptation data selecting based on motor vehicle velocity module 364 selecting a subset of adaptation data (e.g., a high-ambient noise level filtration algorithm, from one or more available algorithms, each designed to operate most efficiently at various amounts of ambient noise) as particular adaptation data based on a velocity (e.g., the higher the velocity, the more likely there is high ambient noise from engine, wind, road vibrations, and the like) of the motor vehicle Referring again to FIG. 9E, operation 962 may include operation 966 depicting selecting a subset of adaptation data as the particular adaptation data based on a vibration level of the motor vehicle. For example, FIG. 3, e.g., FIG. 3E, shows particular adaptation data selecting based on motor vehicle vibration level module 366 selecting a subset of adaptation data (e.g., a low ambient noise level dependent filtration algorithm, from one or more algorithms for processing received speech data) as the particular adaptation data based on a vibration level (e.g., the ambient noise is assumed to go up as measured vibration levels of the vehicle go up) of the motor vehicle.

Figure 9F:
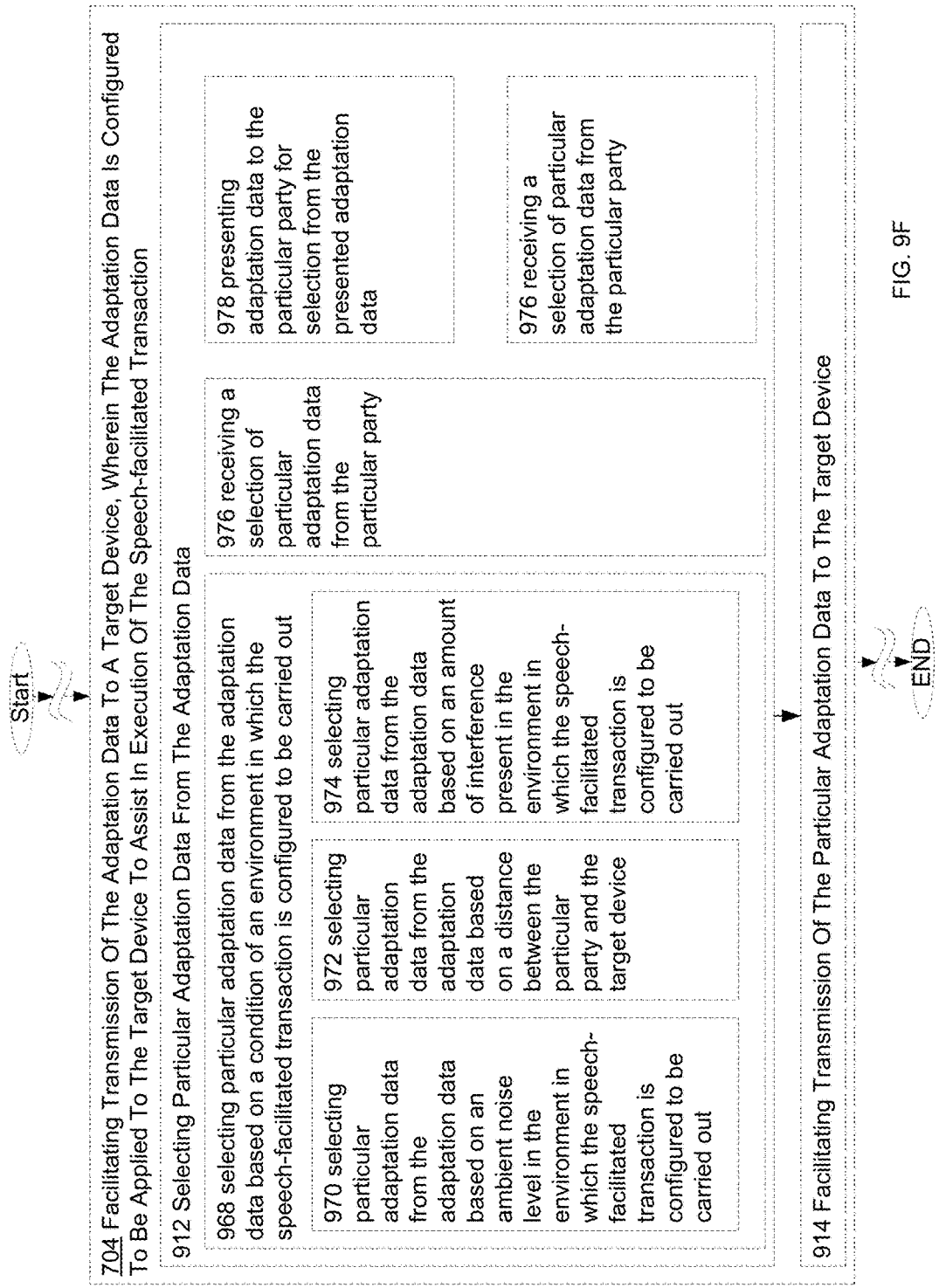
FIG. 9F is a high-level logic flowchart of a process depicting alternate implementations of an adaptation data transmission facilitating operation 704 of FIG. 7.

Referring now to FIG. 9F, operation 912 may include operation 968 depicting selecting particular adaptation data from the adaptation data based on a condition of an environment in which the speech-facilitated transaction is configured to be carried out. For example, FIG. 3, e.g., FIG. 3F, shows particular adaptation data selecting based on an environment condition of an environment of the speech-facilitated transaction module 368 selecting particular adaptation data (e.g., an algorithm for use in speech processing in high noise environments) from the adaptation data (e.g., a list of one or more algorithms configured to be used in different scenarios) based on a condition of an environment (e.g., a noisy environment, e.g., an automated teller machine at a baseball stadium) in which the speech-facilitated transaction (e.g., withdrawing money) is configured to be carried out.

Referring again to FIG. 9F, operation 968 may include operation 970 depicting selecting particular adaptation data from the adaptation data based on an ambient noise level in the environment in which the speech-facilitated transaction is configured to be carried out. For example, FIG. 3, e.g., FIG. 3F, shows particular adaptation data selecting based on an ambient noise level of an environment of the speech-facilitated transaction module 370 selecting particular adaptation data (e.g., selecting a best-guess algorithm that requires less accuracy for interpretation, from one or more algorithms) from the adaptation data (e.g., one or more algorithms) based on an ambient noise level in the environment (e.g., a loud subway station where the speech-enabled ticket terminal is located) in which the speech-facilitated transaction (e.g., buying a subway ticket) is configured to be carried out.

Referring again to FIG. 9F, operation 968 may include operation 972 depicting selecting particular adaptation data from the adaptation data based on a distance between the particular party and the target device. For example, FIG. 3, e.g., FIG. 3F, shows particular adaptation data selecting based on a distance between the particular party and the target device during the speech-facilitated transaction module 372 selecting particular adaptation data (e.g., a signal boosting algorithm, and a particular sentence diagramming path selection algorithm) from the adaptation data (e.g., many algorithms for processing speech, of which multiple algorithms may be selected and used) based on a distance (e.g., greater than 1 m, to the point where signal boosting could be useful) between the particular party and the target device (e.g., a drive-thru ordering menu where the user is in a giant truck and is far from the microphone).

Referring again to FIG. 9F, operation 968 may include operation 974 depicting selecting particular adaptation data from the adaptation data based on an amount of interference present in an environment in which the speech-facilitated transaction is configured to be carried out. For example, FIG. 3, e.g., FIG. 3F, shows particular adaptation data selecting based on an amount of interference present in an environment of the speech-facilitated transaction module 374 selecting particular adaptation data (e.g., a particular pronunciation adjustment algorithm) from the adaptation data (e.g., from a list of available speech processing algorithms, from which one or more may be applied or presented for application) based on an amount of interference (e.g., noise, static on a line, etc.) present in an environment (e.g., the surroundings, e.g., 7th and F street next to Verizon Center) in which the speech-facilitated transaction (e.g., the use of an automated teller machine) is configured to be carried out).

Referring again to FIG. 3F, operation 912 may include operation 976 depicting receiving a selection of particular adaptation data from the particular party. For example, FIG. 3, e.g., FIG. 3F, shows selection of particular adaptation data from particular party receiving module 376 receiving a selection of particular adaptation data (e.g., the user selects a set of one or more pronunciations of vocabulary words, based on what types of words that user is intending to use, e.g., a video game system might load a video game, and then the user might be prompted to select a set of vocabulary words, e.g., "words for a football game," or "words from a World War II shooting game) from the particular party (e.g., the game player).

Referring again to FIG. 3F, operation 976 may include operation 978 depicting presenting adaptation data to the particular party for selection from the presented adaptation data. For example, FIG. 3, e.g., FIG. 3F, shows adaptation data presenting to particular party for selection of particular adaptation data module 378 presenting adaptation data (e.g., displaying various sets of adaptation data for the user to select on a screen, or reading out lout selectable sets of adaptation data through a speaker or headphone) to the particular party for selection (e.g., the user makes a selection of one or more sets of adaptation data from the one or more sets presented) from the presented adaptation data (e.g., one or more sets of pronunciations of words, or one or more algorithms).

Referring again to FIG. 3F, operation 976 may include operation 980 depicting receiving a selection of adaptation data from the particular party as particular adaptation data. For example, FIG. 3, e.g., FIG. 3F, shows selection of particular adaptation data from the particular party receiving module 380 receiving a selection of adaptation data (e.g., the user selects a set of adaptation data from the presented adaptation data by pushing a button on a touchscreen) as particular adaptation data.

Referring now to FIG. 9G, operation 912 may include operation 982 depicting selecting particular adaptation data from the adaptation data at least partly based on previously acquired user preferences. For example, FIG. 3, e.g., FIG. 3G, shows selection of particular adaptation data based on previously acquired user preferences module 382 selecting particular adaptation data (e.g., selecting a set of vocabulary words) from the adaptation data at least partly based on previously acquired user preferences (e.g., if a user previously has set an option for "fast food menus," or if a user merely likes cheeseburgers and orders a lot of them, then these are previously acquired user preferences that can be used to select adaptation data (e.g., pronunciation sets that include fast-food or cheeseburger-related words, e.g., "mayonnaise," and "sesame seed buns").

Referring again to FIG. 9G, operation 912 may include operation 984 depicting transmitting one or more options for selecting adaptation data to the target device. For example, FIG. 3, e.g., FIG. 3G, shows transmitting options for selecting adaptation data to target device module 384 transmitting one or more options for selecting adaptation data (e.g., transmitting a "noise level dependent filtration algorithm," option a "basic pronunciation adjustment algorithm" option, and an "utterance ignoring algorithm" option, of which one or more of these options may be selected by the target device based on its processing, e.g., which modules it determines will be the most useful, or by random or other selection) to the target device (e.g., an onboard vehicle command system).

Referring again to FIG. 9G, operation 912 may include operation 986 depicting receiving a selection of adaptation data from the target device. For example, FIG. 3, e.g., FIG. 3G, shows target device selection of adaptation data receiving module 386 receiving a selection of adaptation data (e.g., the target device selected the "utterance ignoring algorithm") from the target device (e.g., the onboard vehicle command system).

Referring again to FIG. 9G, operation 912 may include operation 988 depicting selecting particular adaptation data from the adaptation data based on the selection of adaptation data selected by the target device. For example, FIG. 3, e.g., FIG. 3G, shows particular adaptation data selection based on received adaptation data selected by target device module 388 selecting particular adaptation data (e.g., selecting the "utterance ignoring algorithm) from the adaptation data (e.g., which may include the algorithms presented for selection, and also, in some embodiments, additional algorithms or other data) based on the selection of adaptation data selected by the target device (e.g., the onboard vehicle command system).

Referring again to FIG. 9G, operation 902 may include operation 990 depicting facilitating transmission of the adaptation data to a target device when there is an indication from the target device of initiation of a speech-facilitated transaction between the target device and the particular party, wherein the adaptation data is configured to be applied to the target device to assist in execution of the speech-facilitated transaction. For example, FIG. 3, e.g., FIG. 3G, shows particular party-correlated adaptation data receiving facilitated by particular party associated particular device upon indication from target device of initiation of speech-facilitated transaction between target device and particular party module 390 facilitating transmission of the adaptation data (e.g., a regional dialect application algorithm) to a target device (e.g., a speech recognition-enabled ticket dispensing terminal) when there is an indication from the target device (e.g., a user presses the "start" button on the ticket dispensing terminal) of initiation of a speech facilitated transaction (e.g., the transaction of printing a previously-purchased ticket has been initiated) between the target device (e.g., the ticket dispensing terminal) and the particular party (e.g., the user), wherein the adaptation data (e.g., the regional dialect application algorithm) is configured to be applied to the target device (e.g., the target device applies the regional dialect application algorithm to the received speech in order to assist in processing the received speech) to assist in execution of the speech-facilitated transaction (e.g., printing out a previously-purchased ticket).

Figure 10A:
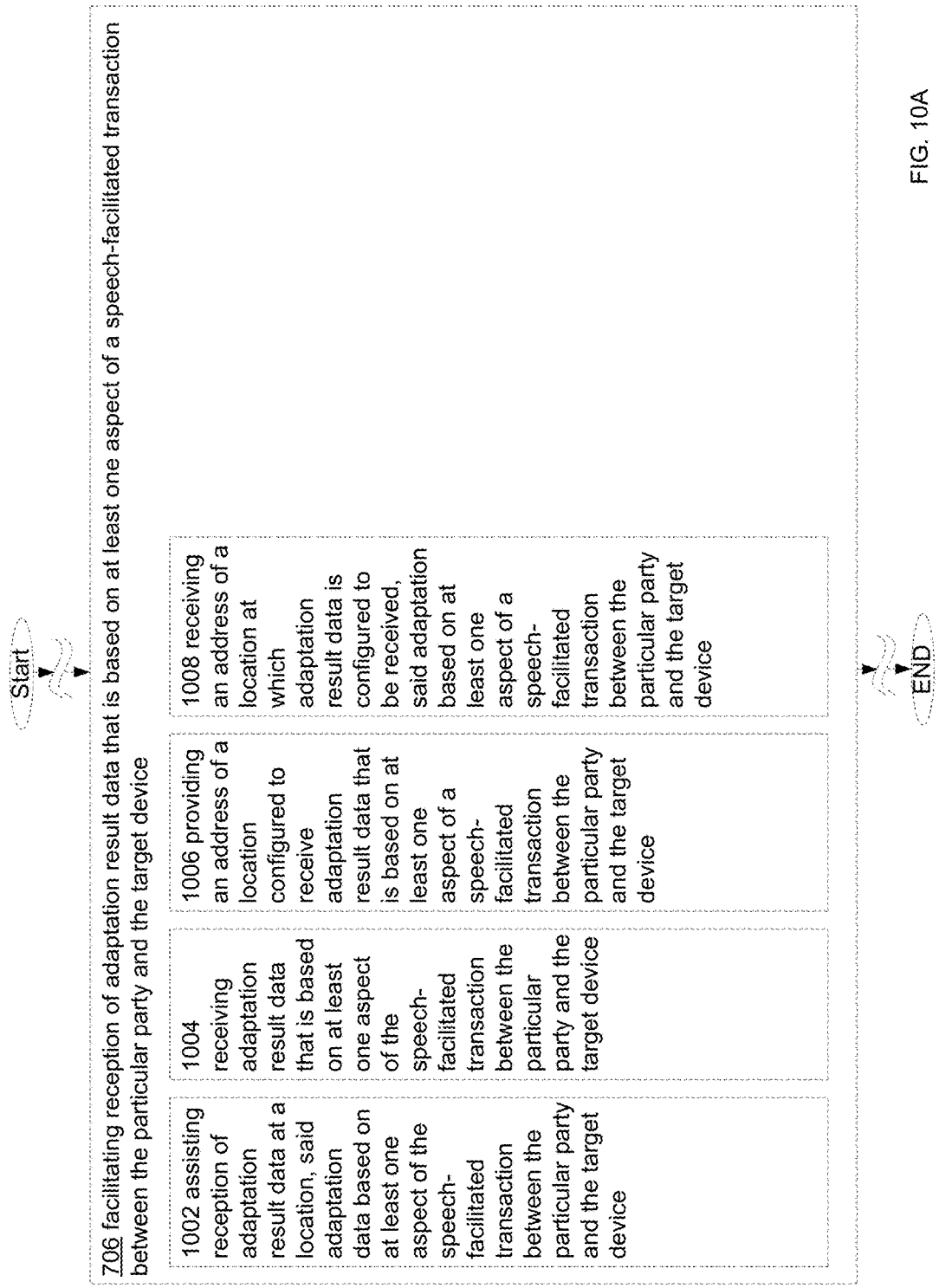
FIG. 10A is a high-level logic flowchart of a process depicting alternate implementations of an adaptation result data reception facilitating operation 706 of FIG. 7.

FIGS. 10A-10G depict various implementations of operation 706, according to embodiments. Referring to FIG. 10A, operation 706 may include operation 1002 depicting assisting reception of adaptation result data at a location, said adaptation result data based on at least one aspect of the speech-facilitated transaction between the particular party and the target device. For example, FIG. 4, e.g., FIG. 4A, shows adaptation result data based on a result of at least one aspect of a speech-facilitated transaction reception at a location assisting module 402 assisting reception (e.g., performing at least one operation or task related to receiving) of adaptation result data (e.g., an indication, e.g., a numeric representation, of the success of the speech-facilitated transaction) at a location (e.g., a server that collects the adaptation result data), said adaptation result data based on at least one aspect (e.g., a success of) the speech-facilitated transaction between the particular party (e.g., the user) and the target device (e.g., the company computer with speech-enabled commands).

Referring again to FIG. 10A, operation 706 may include operation 1004 depicting receiving adaptation result data that is based on at least one aspect of the speech-facilitated transaction between the particular party and the target device. For example, FIG. 4, e.g., FIG. 4A, shows adaptation result data based on a result of at least one aspect of a speech-facilitated transaction receiving module 404 receiving adaptation result data (e.g., a list of one or more questions asked by the automated teller machine device and the user's response to the one or more questions) that is based on at least one aspect (e.g., the user's responses) of the speech-facilitated transaction between the particular party (e.g., the user) and the target device (e.g., the automated teller machine device).

Referring again to FIG. 10A, operation 706 may include operation 1006 depicting providing an address of a location configured to receive adaptation result data that is based on at least one aspect of a speech-facilitated transaction between the particular party and the target device. For example, FIG. 4, e.g., FIG. 4A, shows address of location configured to receive adaptation result data based on a result of at least one aspect of a speech-facilitated transaction providing module 406 providing an address (e.g., a secure web address) of a location configured to receive (e.g., is capable of receiving data) adaptation result data (e.g., a user's survey ranking of the usefulness of the speech portion of the speech-facilitated transaction) between the particular party (e.g., the user) and the target device (e.g., the home computer on a home network).

Referring again to FIG. 10A, operation 706 may include operation 1008 depicting receiving an address of a location at which adaptation result data is configured to be received, said adaptation result data based on at least one aspect of a speech-facilitated transaction between the particular party and the target device. For example, FIG. 4, e.g., FIG. 4A, shows address of location configured to receive adaptation result data based on a result of at least one aspect of a speech-facilitated transaction receiving module 408 receiving an address of a location (e.g., a networked computer sends a location that is capable of receiving the adaptation result data) at which adaptation result data (e.g., an automatically-generated representation of a user's perceived state of mind at the end of the speech-facilitated transaction) is configured to be received, said adaptation result data based on at least one aspect of a speech-facilitated transaction (e.g., interacting with an automated telephony system) between the particular party (e.g., the user) and the target device (e.g., a networked IP phone, e.g., a Cisco IP phone 7945).

Figure 10B:
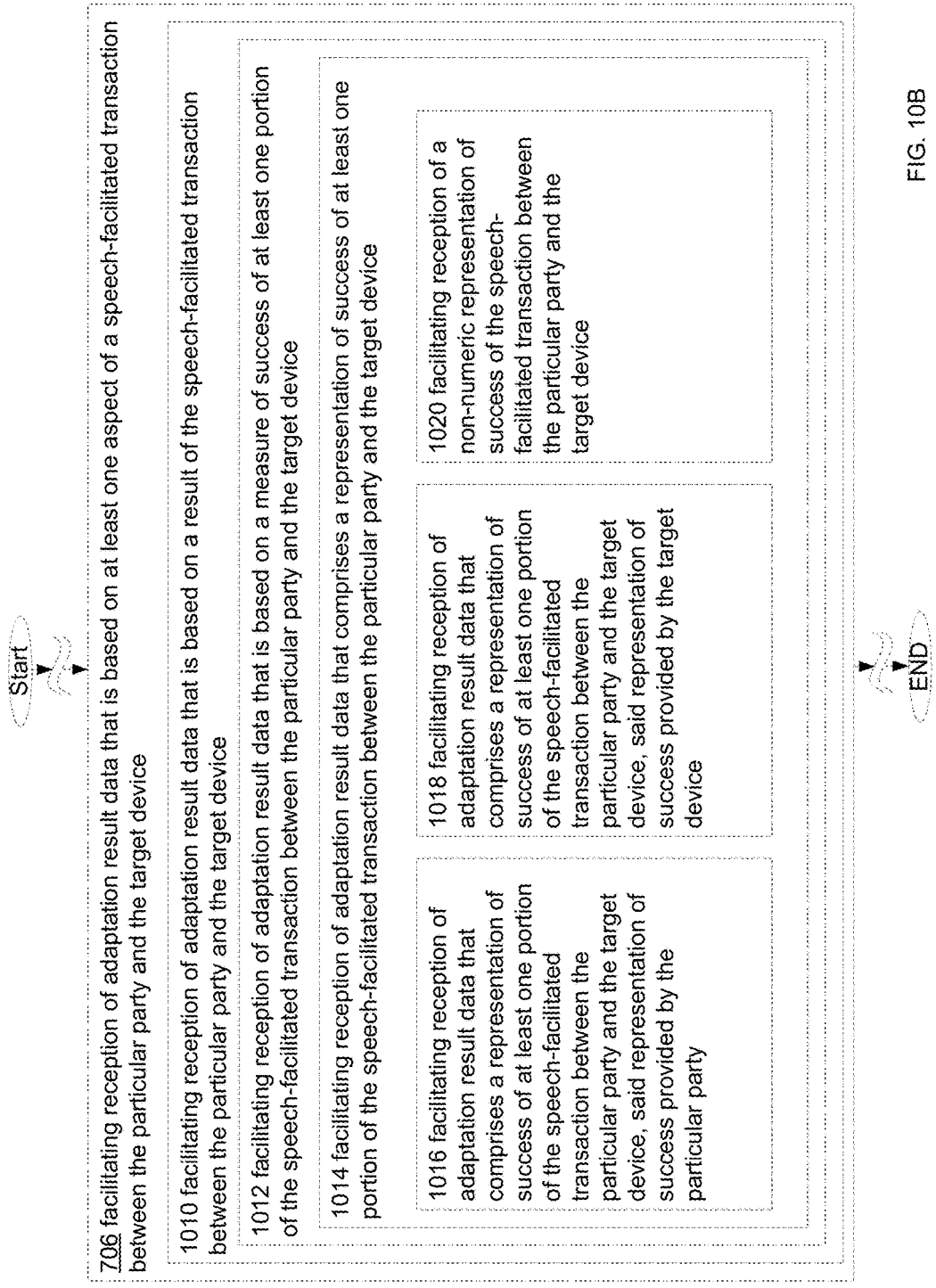
FIG. 10B is a high-level logic flowchart of a process depicting alternate implementations of an adaptation result data reception facilitating operation 706 of FIG. 7.

Referring now to FIG. 10B, operation 706 may include operation 1010 depicting facilitating reception of adaptation result data that is based on a result of the speech-facilitated transaction between the particular party and the target device. For example, FIG. 4, e.g., FIG. 4B, shows adaptation result data based on a result of the speech-facilitated transaction reception facilitating module 410 facilitating reception of adaptation result data (e.g., a user-provided feedback) that is based on a result of the speech facilitated transaction between the particular party (e.g., the user) and the target device (e.g., an automated ticket dispensing machine).

Referring again to FIG. 10B, operation 1010 may include operation 1012 depicting facilitating reception of adaptation result data that is based on a measure of success of at least one portion of the speech-facilitated transaction between the particular party and the target device. For example, FIG. 4, e.g., FIG. 4B, shows adaptation result data based on a measure of success of the speech-facilitated transaction reception facilitating module 412 facilitating reception (e.g., providing at least one step for, e.g., generating a signal that a survey should be sent out requesting feedback) of adaptation result data (e.g., a user's written response to a survey question regarding her experience in conducting a speech-facilitated transaction, filled out at a later time) that is based on a measure of success (e.g., the user's perception of the success of the transaction) of at least one portion of the speech-facilitated transaction (e.g., using an in-vehicle automated emergency response system (e.g., to contact police, unlock doors, etc.) between the particular party (e.g., the user) and the target device (e.g., an in-vehicle automated emergency response voice-responding system)

Referring again to FIG. 10B, operation 1012 may include operation 1014 depicting facilitating reception of adaptation result data that comprises a representation of success of at least one portion of the speech-facilitated transaction between the particular party and the target device. For example, FIG. 4, e.g., FIG. 4B, shows adaptation result data based on a numeric representation of success of the speech-facilitated transaction reception facilitating module 414 facilitating reception (e.g., storing the address of the server that will receive the adaptation data) of adaptation result data (e.g., a letter grade assigned to the transaction by a piece of software running on a network that evaluates, separately from the processing of the speech, a success of the speech portion of the transaction, e.g., composing an email) that comprises a representation of success (e.g. a letter grade) of at least one portion (e.g., the speech portion) of the speech-facilitated transaction (e.g., composing an email using a voice system with the headset as the particular device) between the particular party (e.g., the user) and the target device (e.g., the computer configured to receive speech data).

Referring again to FIG. 10B, operation 1014 may include operation 1016 depicting facilitating reception of adaptation result data that comprises a representation of success of at least one portion of the speech-facilitated transaction between the particular party and the target device, said representation of success provided by the particular party. For example, FIG. 4, e.g., FIG. 4B, shows adaptation result data comprising a particular party provided representation of success of the speech-facilitated transaction reception facilitating module 416 facilitating reception (e.g., receiving) of adaptation result data (e.g., a response to a survey question of "How would you rate this transaction from "very efficient" to "very inefficient") that comprises a representation of success of at least one portion of the speech-facilitated transaction (e.g., printing an airline ticket) between the particular party (e.g., the user) and the target device (e.g., an automated airline ticket dispenser), said representation of success (e.g., the survey answer) provided by the particular party (e.g., the user verbally responds to the survey question)

Referring again to FIG. 10B, operation 1014 may include operation 1018 depicting facilitating reception of adaptation result data that comprises a representation of success of at least one portion of the speech-facilitated transaction between the particular party and the target device, said representation of success provided by the target device. For example, FIG. 4, e.g., FIG. 4B, shows adaptation result data comprising a target device provided representation of success of the speech-facilitated transaction reception facilitating module 418 facilitating reception of adaptation result data (e.g., a numeric representation of the target device's analysis of the transaction, based on objective factors, e.g., how many times the same question had to be repeated, etc.) that comprises a representation of success (e.g., the numeric representation calculated by the target device) of at least one portion of the speech-facilitated transaction (e.g., ordering a hamburger and fries from an automated drive-thru window) between the particular party (e.g., the user) and the target device (e.g., the automated drive-thru window), said representation of success provided by the target device (e.g., the target device collects the objective factors and generates a numeric representation of success of the speech-facilitated transaction).

Referring again to FIG. 10B, operation 1014 may include operation 1020 depicting facilitating reception of a non-numeric representation of success of the speech-facilitated transaction between the particular party and the target device. For example, FIG. 4, e.g., FIG. 4B, shows Adaptation result data comprising a non-numeric representation of success of the speech-facilitated transaction reception facilitating module 420 facilitating reception of a non-numeric representation of success (e.g., an open-ended survey question response) of the speech-facilitated transaction (e.g., withdrawing money from a speech-enabled automated teller machine device) between the particular party (e.g., the user) and the target device (e.g., the automated teller machine device).

Figure 10C:
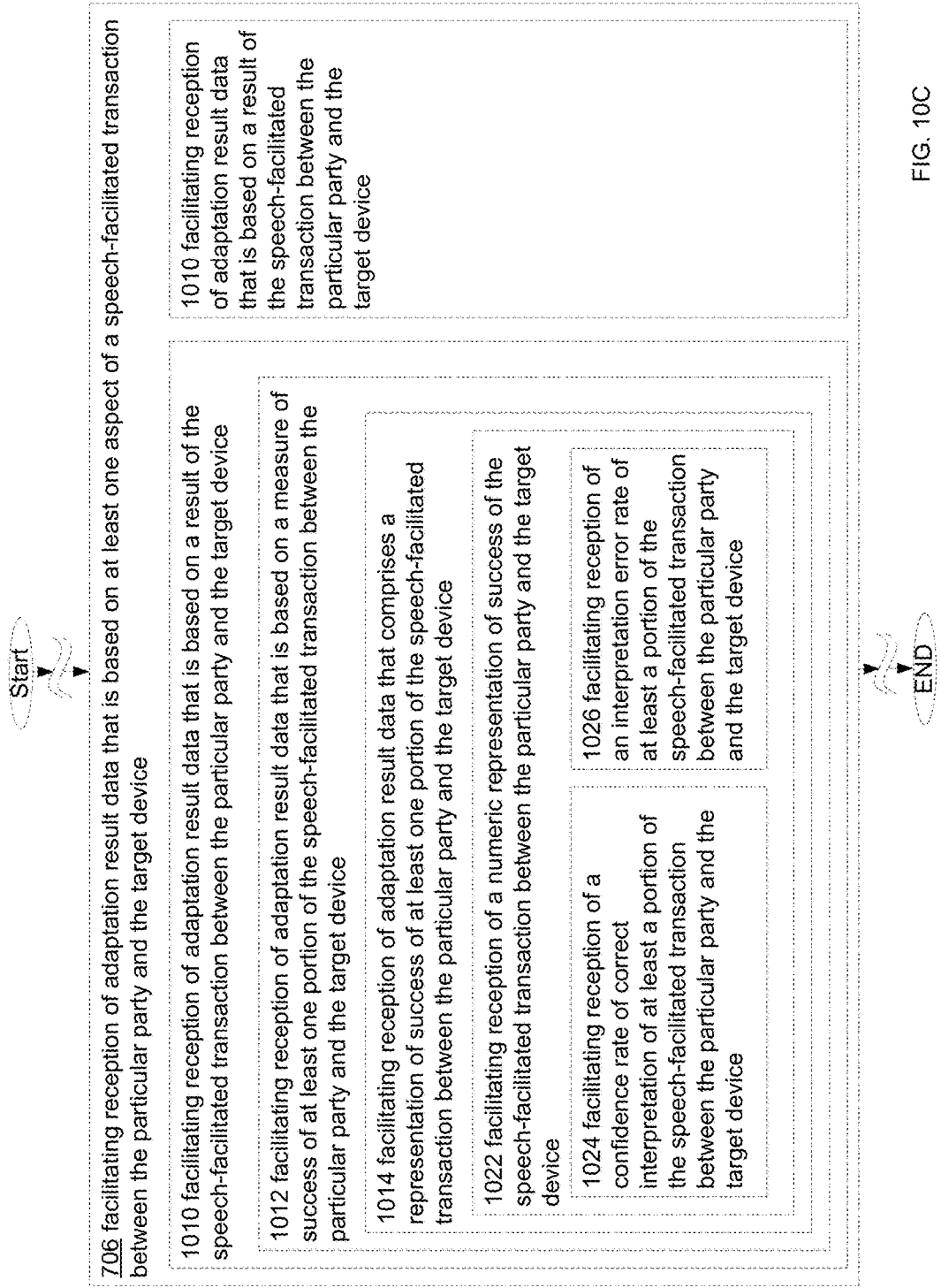
FIG. 10C is a high-level logic flowchart of a process depicting alternate implementations of an adaptation result data reception facilitating operation 706 of FIG. 7.

Referring now to FIG. 10C, operation 1014 may include operation 1022 depicting facilitating reception of adaptation result data that comprises a numeric representation of success of at least one portion of the speech-facilitated transaction between the particular party and the target device. For example, FIG. 4, e.g., FIG. 4C, shows adaptation result data comprising a numeric representation of success of the speech-facilitated transaction reception facilitating module 422 facilitating reception of adaptation result data (e.g., a feedback score entered by the user, e.g., 57 out of 100) that comprises a numeric representation of success (e.g., 57/100) of at least one portion (e.g., the first half of a financial transaction, e.g., accessing the checking account) of the speech-facilitated transaction (e.g., transferring money from a checking account to a savings account) between the particular party (e.g., the user) and the target device (e.g., an automated banking terminal).

Referring again to FIG. 10C, operation 1022 may include operation 1024 depicting facilitating reception of a confidence rate of correct interpretation of at least a portion of the speech-facilitated transaction between the particular party and the target device. For example, FIG. 4, e.g., FIG. 4C, shows adaptation result data comprising a confidence rate of correct interpretation of at least a portion of the speech-facilitated transaction reception facilitating module 424 facilitating reception of a confidence rate of correct interpretation (e.g., 75% likely that the words "twenty dollars" of the speech transaction were correctly interpreted) of at least a portion (e.g., the portion in which the user says how much money she wants to withdraw) of the speech-facilitated transaction (e.g., withdrawing twenty dollars from a checking account) between the particular party (e.g., the user) and the target device (e.g., the speech-enabled automated teller machine device).

Referring again to FIG. 10C, operation 1022 may include operation 1026 depicting facilitating reception of an interpretation error rate of at least a portion of the speech-facilitated transaction between the particular party and the target device. For example, FIG. 4, e.g., FIG. 4C, shows adaptation result data comprising an interpretation error rate of at least a portion of the speech-facilitated transaction reception facilitating module 426 facilitating reception of an interpretation error rate (e.g., a rate at which it is determined that an interpretation of the user's speech was incorrect) of at least a portion of the speech-facilitated transaction (e.g., all the speech commands given during one level of a game played by the user on a speech-enabled game console) between the particular party (e.g., the user playing the game) and the target device (e.g., the video game system).

Referring again to FIG. 10C, operation 706 may include operation 1028 depicting facilitating reception of adaptation result data comprising a list of at least one word that was improperly interpreted during the speech-facilitated transaction. For example, FIG. 4, e.g., FIG. 4C, shows adaptation result data comprising a list of at least one word improperly interpreted during speech-facilitated transaction reception facilitating module 428 facilitating reception of adaptation result data (e.g., a list of phrases such as "Play Saving Private Ryan," "Eject DVD," and "Fast-Forward 8X") comprising a list of at least one word that was improperly interpreted (e.g., the phrases "Play Saving Private Ryan," "Eject DVD," and "Fast-Forward 8X" all were improperly interpreted (e.g., interpreted into a command that was not the user's desired command) during the speech-facilitated transaction (e.g., during the user's attempt to watch a DVD on his speech-enabled home theater system).

Figure 10D:
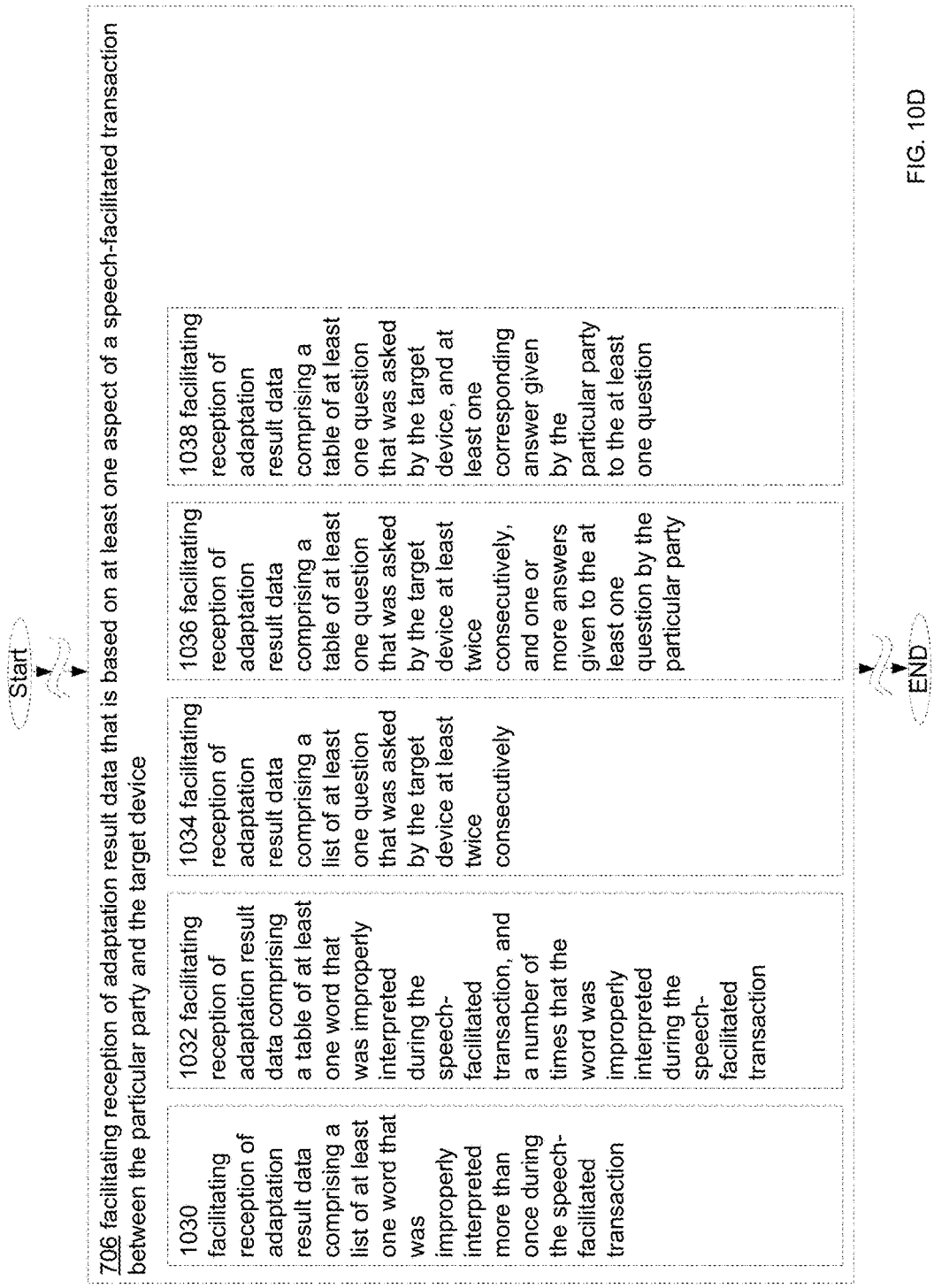
FIG. 10D is a high-level logic flowchart of a process depicting alternate implementations of an adaptation result data reception facilitating operation 706 of FIG. 7.

Referring now to FIG. 10D, operation 706 may include operation 1030 depicting facilitating reception of adaptation result data comprising a list of at least one word that was improperly interpreted more than once during the speech-facilitated transaction. For example, FIG. 4, e.g., FIG. 4D, shows adaptation result data comprising a list of at least one word improperly interpreted more than once during the speech-facilitated transaction reception facilitating module 430 facilitating reception (e.g., receiving) of adaptation result data (e.g., a list of the pronunciation of the words "lock safe" by the user) comprising a list of at least one word that was improperly interpreted more than once (e.g., the user said "lock safe" three times before it was recognized by the voice-enabled safe) during the speech-facilitated transaction (e.g., locking the safe via voice command).

Referring again to FIG. 10D, operation 706 may include operation 1032 depicting facilitating reception of adaptation result data comprising a table of at least one word that was improperly interpreted during the speech-facilitated transaction, and a number of times that the at least one word was improperly interpreted during the speech-facilitated transaction. For example, FIG. 4, e.g., FIG. 4D, shows adaptation result data comprising a table of at least one word improperly interpreted and a number of times the at least one word was improperly interpreted during the speech-facilitated transaction reception facilitating module 432 facilitating reception of adaptation result data comprising a table of at least one word that was improperly interpreted (e.g., "play") during the speech-facilitated transaction (e.g., instructing a speech-enabled media player to play a particular song), and a number of times that the at least one word was improperly interpreted (e.g., three) during the speech-facilitated transaction (e.g., the user had to repeat the command four times (e.g., it was properly interpreted on the fourth try)).

Referring again to FIG. 10D, operation 706 may include operation 1034 depicting facilitating reception of adaptation result data comprising a list of at least one question that was asked by the target device at least twice consecutively. For example, FIG. 4, e.g., FIG. 4D, shows adaptation result data comprising a list of at least one question asked by the target device at least twice consecutively reception facilitating module 434 facilitating reception of adaptation result data comprising a list of at least one question (e.g., "what city are you traveling to today") that was asked by the target device (e.g., an automated airline ticket dispenser) at least twice consecutively (e.g., during the ticket-printing transaction, the automated airline ticket dispenser repeated the question "what city are you traveling to today" twice).

Referring again to FIG. 10D, operation 706 may include operation 1036 depicting facilitating reception of adaptation result data comprising a table of at least one question that was asked by the target device at least twice consecutively, and one or more answers given to the at least one question by the particular party. For example, FIG. 4, e.g., FIG. 4D, shows adaptation result data comprising a list of at least one question asked by the target device at least twice consecutively and one or more answers given to the at least one question reception facilitating module 436 facilitating reception of adaptation result data comprising a table of at least one question (e.g., "please state your order") that was asked by the target device (e.g., an automated drive-thru window, and one or more answers given to the at least one question by the particular party (e.g., "cheeseburger, French fries, and chocolate shake").

Referring again to FIG. 10D, operation 706 may include operation 1038 depicting facilitating reception of adaptation result data comprising a table of at least one question that was asked by the target device, and at least one corresponding answer given by the particular party to the at least one question. For example, FIG. 4, e.g., FIG. 4D, shows adaptation result data comprising a table of at least one question asked by the target device and at least one corresponding answer given by the particular party reception facilitating module 438 facilitating reception of adaptation result data comprising a table of at least one question (e.g., "what number would you like to set the volume to") that was asked by the target device (e.g., a speech-enabled television), and at least one corresponding answer (e.g., "forty-five") given by the particular party (e.g., the user) to the at least one question.

Referring now to FIG. 10E, operation 706 may include operation 1040 depicting facilitating reception of adaptation result data comprising at least one phoneme appearing in at least one word that was improperly interpreted during the speech-facilitated transaction. For example, FIG. 4, e.g., FIG. 4E, shows adaptation result data comprising at least one phoneme appearing in at least one word that was improperly interpreted during the speech-facilitated transaction reception facilitating module 440 facilitating reception of adaptation result data (e.g., one or more pronunciations of one or more phonemes) comprising at least one phoneme (e.g., the "a" sound at the end of the word "café") appearing in at least one word (e.g., "Hard Times Cafe") that was improperly interpreted during the speech-facilitated transaction (e.g., asking a portable navigation device for directions to Hard Times Cafe).

Referring again to FIG. 10E, operation 1040 may include operation 1042 depicting facilitating reception of adaptation result data comprising at least one phoneme appearing in multiple words that were improperly interpreted during the speech-facilitated transaction. For example, FIG. 4, e.g., FIG. 4E, shows adaptation result data comprising at least one phoneme that was improperly interpreted during the speech-facilitated transaction reception facilitating module 442 facilitating reception of adaptation result data comprising at least one phoneme (e.g., the "ay" sound in "play") appearing in multiple words (e.g., the word "play" was misinterpreted more than once) that were improperly interpreted during the speech-facilitated transaction (e.g., "play Saving Private Ryan").

Referring again to FIG. 10E, operation 1042 may include operation 1044 depicting facilitating reception of adaptation result data comprising at least one phoneme appearing in more than one unique word that was improperly interpreted during the speech-facilitated transaction, For example, FIG. 4, e.g., FIG. 4E, shows adaptation result data comprising at least one phoneme appearing in more than one unique word that was improperly interpreted during the speech-facilitated transaction reception facilitating module 444 facilitating reception of adaptation result data comprising at least one phoneme (e.g., the "a" sound at the end of the words "café" and "beret") appearing in more than one unique word (e.g., "café" and "beret") that were improperly interpreted (e.g., a sentence of "please give me directions to the nearest café where berets are allowed to be worn inside," given to a smart device that accepts speech and has navigational capabilities) during the speech-facilitated transaction.

Referring again to FIG. 10E, operation 706 may include operation 1046 depicting facilitating reception of adaptation result data upon conclusion of the speech-facilitated transaction between the particular party and the target device. For example, FIG. 4, e.g., FIG. 4E, shows adaptation result data based on a result of at least one aspect of a speech-facilitated transaction reception facilitating upon conclusion of speech-facilitated transaction module 446 facilitating reception (e.g., receiving survey data) of adaptation result data (e.g., survey data filled out by the user upon prompting from the target device) upon conclusion (e.g., at the end) of the speech-facilitated transaction (e.g., withdrawing money from a speech-enabled automated teller machine device, and at the end, the device prompts for a survey) between the particular party (e.g., the user) and the target device (e.g., the speech-enabled automated teller machine device).

Referring again to FIG. 10E, operation 706 may include operation 1048 depicting facilitating reception of adaptation result data as a conclusion of the speech-facilitated transaction between the particular party and the target device. For example, FIG. 4, e.g., FIG. 4E, shows determining a conclusion of a speech facilitated transaction based on facilitating reception of adaptation result data module 448 facilitating reception (e.g., receiving) adaptation result data (e.g., a word frequency table indicating how many times each word was spoken during the transaction) as a conclusion (e.g., the reception of the word frequency table indicates that the speech-facilitated transaction is over) of the speech-facilitated transaction (e.g., dictating a memorandum to a computer configured to receive speech input) between the particular party (e.g., the user) and the target device (e.g., the speech input-enabled computer used in an enterprise setting).

Referring again to FIG. 10E, operation 706 may include operation 1050 depicting facilitating reception of adaptation result data during the speech-facilitated transaction between the particular party and the target device. For example, FIG. 4, e.g., FIG. 4E, shows adaptation result data based on a result of at least one aspect of a speech-facilitated transaction reception facilitating during speech-facilitated transaction module 450 facilitating reception of adaptation result data (e.g., a confidence rate that the previous phrase was correctly interpreted) during the speech-facilitated transaction (e.g., while the user is still giving commands to the audio/visual receiver) between the particular party (e.g., the user) and the target device (e.g., the speech-command enabled audio/visual receiver).

Referring again to FIG. 10E, operation 706 may include operation 1052 depicting facilitating reception of adaptation result data prior to completion of the speech-facilitated transaction, For example, FIG. 4, e.g., FIG. 4E, shows adaptation result data based on a result of at least one aspect of a speech-facilitated transaction reception facilitating prior to completing the speech-facilitated transaction module 452 facilitating reception of adaptation result data (e.g., a predicted error rate of the words interpreted up to this point in the speech-facilitated transaction) prior to completion of the speech-facilitated transaction (e.g., before the player has finished playing a level of a game, or finished giving all the speech commands for a particular game level).

Figure 11A:
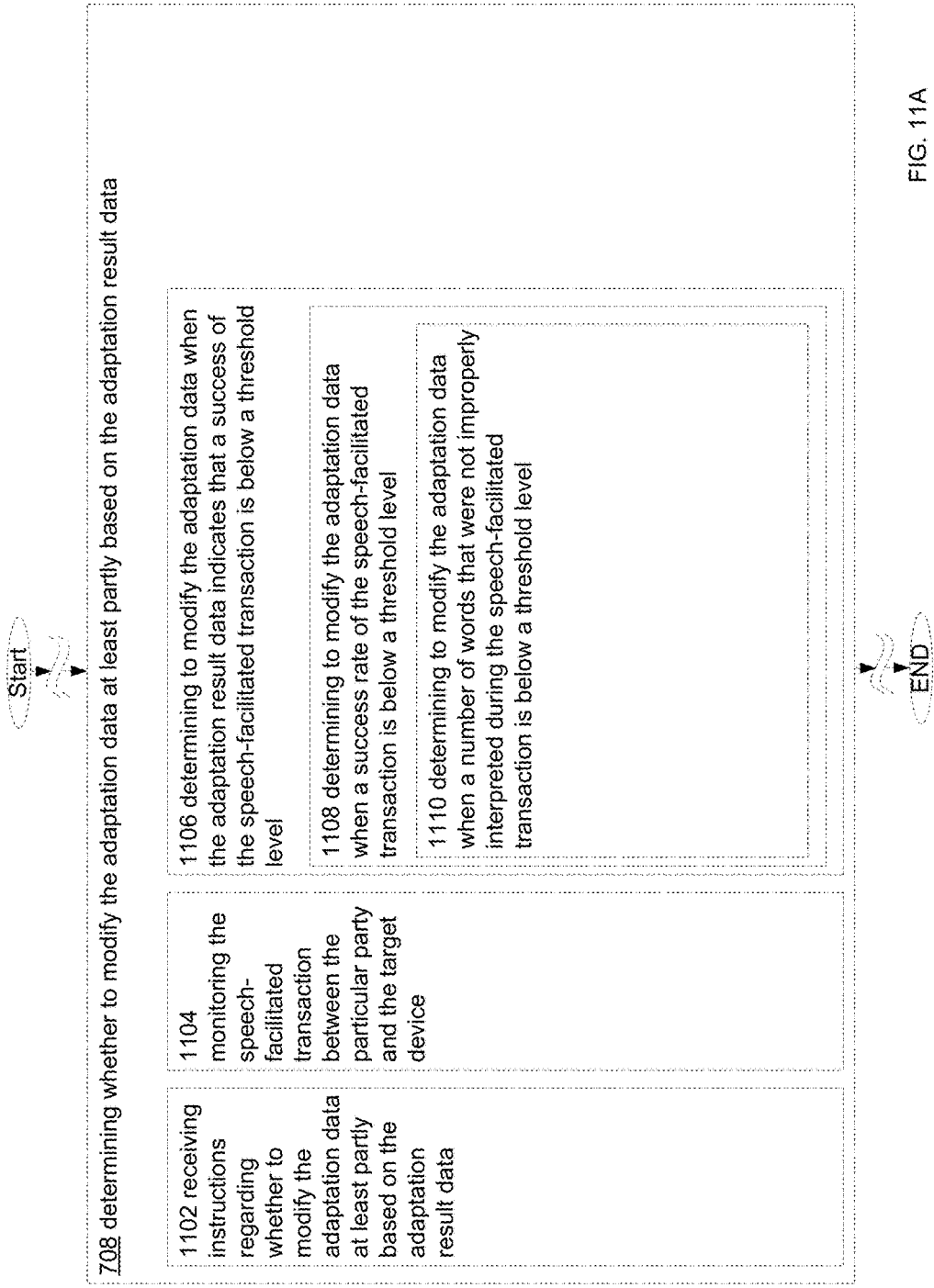
FIG. 11A is a high-level logic flowchart of an adaptation data modification determining operation 708 of FIG. 7.
Figure 11B:
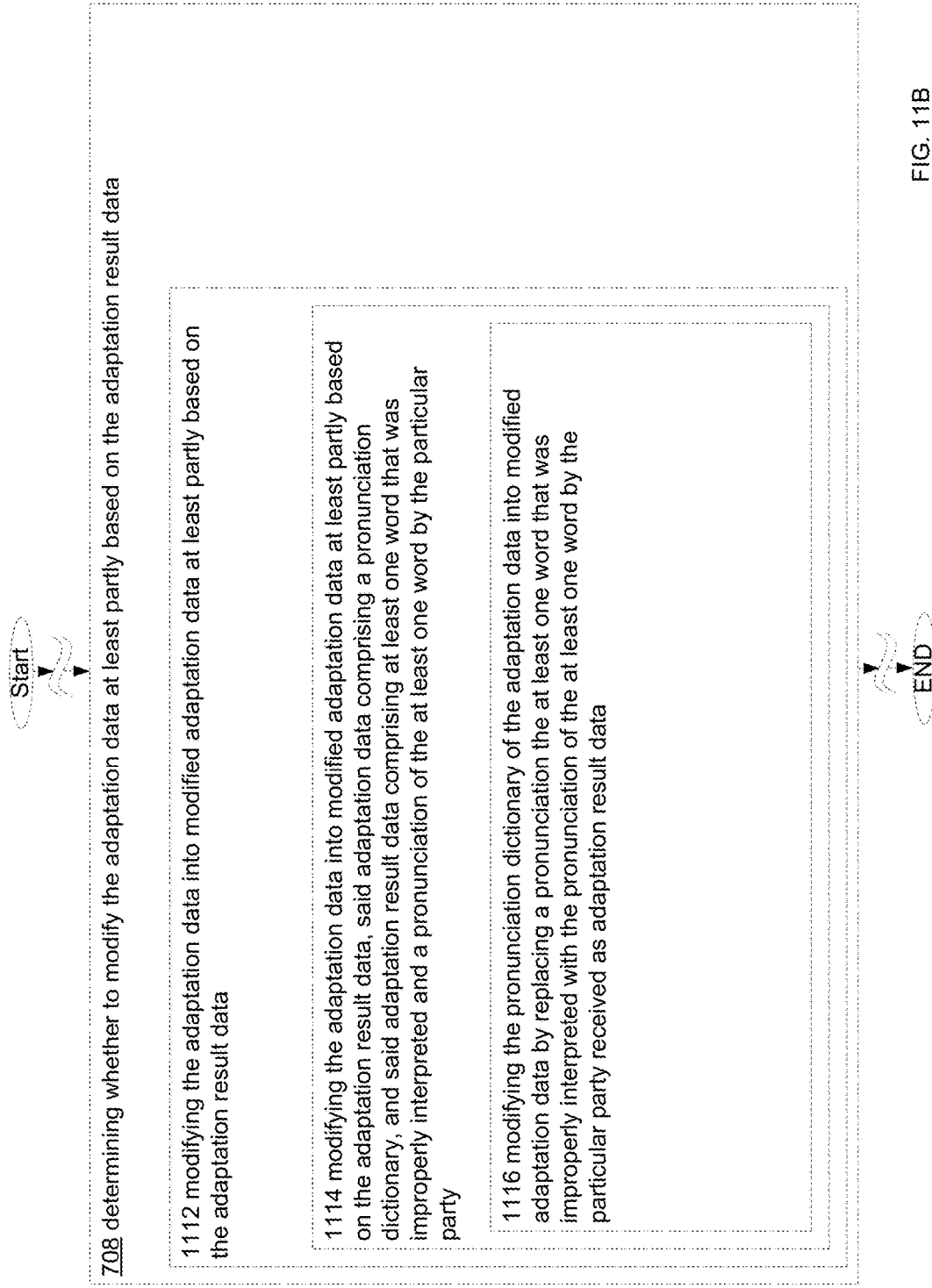
FIG. 11B is a high-level logic flowchart of an adaptation data modification determining operation 708 of FIG. 7.

FIGS. 11A-11B depict various implementations of operation 708, according to embodiments. Referring to FIG. 11A, operation 708 may include operation 1102 depicting receiving instructions regarding whether to modify the adaptation data at least partly based on the adaptation result data. For example, FIG. 5, e.g., FIG. 5A, shows adaptation data modification instructions at least partly based on adaptation result data receiving module 502 receiving instructions (e.g., "replace the pronunciation of the word "cheese" in the pronunciation dictionary with the following pronunciation") regarding whether to modify the adaptation data (e.g., a pronunciation dictionary) at least partly based on the adaptation result data (e.g., data showing that the word "cheese" was pronounced differently during the speech-facilitated transaction of ordering a western bacon cheese burger from an automated drive-thru device, than the pronunciation dictionary predicted).

Referring again to FIG. 11A, operation 708 may include operation 1104 depicting monitoring the speech-facilitated transaction between the particular party and the target device. For example, FIG. 5, e.g., FIG. 5A, shows speech-facilitated transaction between target device and particular party monitoring module 504 monitoring (e.g., tracking a user mood regarding the speech-facilitated transaction, e.g., frustrated, happy) the speech-facilitated transaction (e.g., printing an airline ticket for a trip to Wales) between the particular party (e.g., the user) and the target device (e.g., an automated airline ticket dispensing machine).

Referring again to FIG. 11A, operation 708 may include operation 1106 depicting determining to modify the adaptation data when the adaptation result data indicates that a success of the speech-facilitated transaction is below a threshold level. For example, FIG. 5, e.g., FIG. 5A, shows modification of adaptation data determining based on adaptation result data indication of success below threshold level module 506 determining to modify the adaptation data (e.g., modify at least one parameter of an algorithm used as a portion of the adaptation data, e.g., a phrase completion algorithm) when the adaptation result data (e.g., a success rate of the transaction measured by the target device making measurements regarding success of interpreting speech) indicates that a success of the speech-facilitated transaction (e.g., controlling one or more systems of an automobile with speech) is below a threshold level (e.g., the estimated success rate drops below 60%).

Referring again to FIG. 11A, operation 1106 may include operation 1108 depicting determining to modify the adaptation data when a success rate of the speech-facilitated transaction is below a threshold level. For example, FIG. 5, e.g., FIG. 5A, shows modification of adaptation data determining based on threshold level of success rate of speech-facilitated transaction module 508 determining to modify the adaptation data (e.g., changing an algorithm selection parameter for the current conditions surrounding the speech-facilitated transaction, e.g., microphone quality and environmental noise) when a success rate of the speech-facilitated transaction (e.g., an estimation of how many spoken words are properly interpreted) is below a threshold level (e.g., fifty percent).

Referring again to FIG. 11A, operation 1108 may include operation 1110 depicting determining to modify the adaptation data when a number of words that were not improperly interpreted during the speech-facilitated transaction is below a threshold level. For example, FIG. 5, e.g., FIG. 5A, shows modification of adaptation data determining based on a number of words improperly interpreted during speech-facilitated transaction below a threshold level module 510 determining to modify the adaptation data (e.g., changing the regional dialect application algorithm) when a number of words that were not improperly interpreted during the speech-facilitated transaction is below a threshold level (e.g., when five words in a row have been improperly interpreted, or when a proper interpretation rate drops below 55%).

Referring now to FIG. 11B, operation 708 may include operation 1112 depicting modifying the adaptation data into modified adaptation data at least partly based on the adaptation result data. For example, FIG. 5, e.g., FIG. 5B, shows adaptation data modifying at least partly based on adaptation result data module 512 modifying the adaptation data (e.g., a phoneme pronunciation database) into modified adaptation data (e.g., changing a pronunciation of one or more of the phonemes in the phoneme pronunciation database) at least partly based on the adaptation result data (e.g., data showing words containing a particular phoneme were incorrectly interpreted one or more times).

Referring again to FIG. 11B, operation 1112 may include operation 1114 depicting modifying the adaptation data into modified adaptation data at least partly based on the adaptation result data, said adaptation data comprising a pronunciation dictionary, and said adaptation result data comprising at least one word that was improperly interpreted and a pronunciation of the at least one word by the particular party. For example, FIG. 5, e.g., FIG. 5B, shows pronunciation dictionary modifying at least one word at least partly based on received adaptation result data comprising at least one word that was improperly interpreted and a pronunciation of the at least one word by the particular party module 514 modifying the adaptation data (e.g., a pronunciation dictionary of one or more words) into modified adaptation data (e.g., a pronunciation dictionary in which pronunciation of one or more words is changed), said adaptation data comprising a pronunciation dictionary, and said adaptation result data comprising at least one word (e.g., "defrost") that was improperly interpreted, and a pronunciation of the at least one word (e.g., in the form of a sound made when the particular party uttered the word "defrost," or a deconstruction of the particular party's pronunciation of the word "defrost") by the particular party (e.g., the user).

Referring again to FIG. 11B, operation 1114 may include operation 1116 depicting modifying the pronunciation dictionary of the adaptation data into modified adaptation data by replacing a pronunciation the at least one word that was improperly interpreted with the pronunciation of the at least one word by the particular party received as adaptation result data. For example, FIG. 5B shows pronunciation dictionary replacing at least one word received in adaptation result data with pronunciation received as adaptation data module 516 modifying the pronunciation dictionary of the adaptation data into modified adaptation data by replacing a pronunciation of the at least one word (e.g., "forty") that was improperly interpreted with the pronunciation of the at least one word (e.g., "forty") by the particular party (e.g., the user) received as adaptation result data (e.g., the adaptation result data included the user's pronunciation of the word "forty").

Figure 12A:
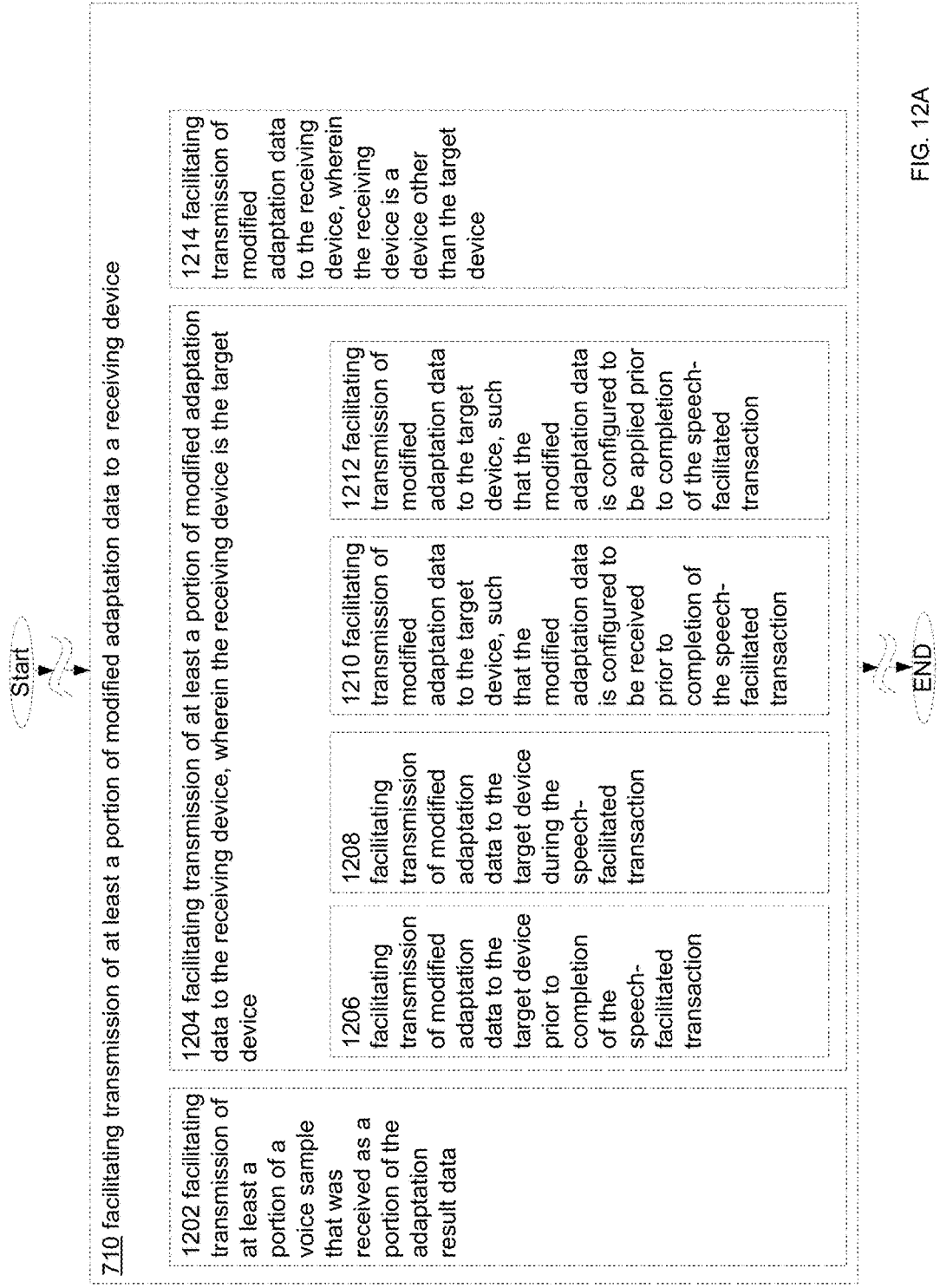
FIG. 12A is a high-level logic flowchart of a process depicting alternate implementations of an adaptation data portion transmission facilitating operation 710 of FIG. 7.

FIGS. 12A-12B depict various implementations of operation 710, according to embodiments. Referring to FIG. 12A, operation 710 may include operation 1202 depicting facilitating transmission of at least a portion of speech of the particular party that was received as a portion of the adaptation result data. For example, FIG. 6, e.g., FIG. 6A, shows at least a portion of a voice sample received as a portion of the adaptation result data transmission to receiving device facilitating module 602 facilitating transmission (e.g., transmitting) of at least a portion of speech of the particular party (e.g., the speech that the particular party used to speak the word "fire the gun north" was received, processed, and a processed version, e.g., a version in which the target device can more easily process the speech, e.g., the background noise was eliminated, and the accent of the particular party was adjusted for) that was received as a portion of the adaptation result data (e.g., the adaptation result data included some of the raw speech data from the user).

Referring again to FIG. 12A, operation 710 may include operation 1204 depicting facilitating transmission of at least a portion of modified adaptation data to the receiving device, wherein the receiving device is the target device. For example, FIG. 6, e.g., FIG. 6A, shows at least a portion of modified adaptation data transmission to target device as receiving device facilitating module 604 facilitating transmission of (e.g., instructing a remote server to transmit) at least a portion of modified adaptation data (e.g., a portion of a syllable pronunciation database that had been modified in view of the adaptation result data which suggested modification of syllable pronunciation for more efficient user speech processing, based on the syllable pronunciation spoken by the user during the speech-facilitated transaction) to the receiving device (e.g., the speech-enabled automated teller machine device), wherein the receiving device (e.g., the speech-enabled automated teller machine device) is the target device.

Referring again to FIG. 12A, operation 1204 may include operation 1206 depicting facilitating transmission of modified adaptation data to the target device, such that the modified adaptation data is configured to be applied prior to completion of the speech-facilitated transaction. For example, FIG. 6, e.g., FIG. 6A, shows at least a portion of modified adaptation data transmission prior to completion of speech-facilitated transaction facilitating module 606 facilitating transmission (e.g., transmitting) of modified adaptation data (e.g., changing of a parameter of one or more of the algorithms used as adaptation data, e.g., an accent-based pronunciation modification algorithm) to the target device (e.g., a speech-input enabled vehicle control system), such that the modified adaptation data (e.g., the accent-based pronunciation modification algorithm with the changed parameter) is configured to be applied (e.g., the speech will be processed using the accent-based pronunciation modification algorithm with the changed parameter) prior to completion of the speech-facilitated transaction (e.g., controlling the temperature inside a motor vehicle using speech).

Referring again to FIG. 12A, operation 1204 may include operation 1208 depicting facilitating transmission of modified adaptation data to the target device during the speech-facilitated transaction. For example, FIG. 6, e.g., FIG. 6A, shows at least a portion of modified adaptation data transmission to receiving device during speech facilitated transaction facilitating module 608 facilitating transmission of modified adaptation data (e.g., using a different algorithm than what was transmitted previously as adaptation data, e.g., the adaptation data included a basic pronunciation adjustment algorithm, and the modified adaptation data includes an utterance ignoring algorithm due to the adaptation result data indicating a number of false positives) to the target device (e.g., the automated drive-thru window) during the speech-facilitated transaction (e.g., while the customer is still attempting to place her order).

Referring again to FIG. 12A, operation 1204 may include operation 1210 depicting facilitating transmission of modified adaptation data to the target device, such that the modified adaptation data is configured to be received prior to completion of the speech-facilitated transaction. For example, FIG. 6, e.g., FIG. 6A, shows at least a portion of modified adaptation data configured to be received prior to completion of speech-facilitated transaction transmission facilitating module 610 facilitating transmission of modified adaptation data (e.g., a different set of proper noun pronunciations, because the proper noun pronunciations sent in the adaptation data were not being used at a sufficiently high rate to improve efficiency of the speech-facilitated transaction), such that the modified adaptation data is configured to be received prior to completion of the speech-facilitated transaction (e.g., purchasing a train ticket from an automated ticket dispensing device).

Referring again to FIG. 12A, operation 1204 may include operation 1212 depicting facilitating transmission of modified adaptation data to the target device, such that the modified adaptation data is configured to be applied prior to completion of the speech-facilitated transaction. For example, FIG. 6, e.g., FIG. 6A, shows at least a portion of modified adaptation data configured to be applied prior to completion of speech-facilitated transaction transmission facilitating module 612 facilitating transmission of modified adaptation data (e.g., a modified sentence diagramming path selection algorithm) to the target device (e.g., a speech input-enabled DVD recorder), such that the modified adaptation data (e.g., a sentence diagramming path selection algorithm with updated path weights each time a command is given) is configured to be applied prior to completion (e.g., before the user is finished interacting) of the speech-facilitated transaction (e.g., programming the DVD recorder to record television shows).

Referring again to FIG. 12A, operation 710 may include operation 1214 depicting facilitating transmission of modified adaptation data to the receiving device, wherein the receiving device is a device other than the target device. For example, FIG. 6, e.g., FIG. 6A shows at least a portion of modified adaptation data transmission to device other than the target device facilitating module 614 facilitating transmission of modified adaptation data (e.g., an updated utterance ignoring algorithm with a slightly modified threshold for identifying an ignorable utterance) to the receiving device (e.g., a new speech-command enabled television), wherein the receiving device (e.g., a speech-command enabled television) is a device other than the target device (e.g., which was an older speech-command enabled television that has been replaced).

Referring now to FIG. 12B, operation 710 may include operation 1216 depicting facilitating transmission of modified adaptation data to the receiving device, wherein the receiving device is a replacement of the target device. For example, FIG. 6, e.g., FIG. 6B, shows at least a portion of modified adaptation data transmission to a device that is a replacement for the target device facilitating module 616 facilitating transmission of modified adaptation data (e.g., a pronunciation dictionary with one or more new words added based on the user speaking those words) to the receiving device (e.g., a new home security system), wherein the receiving device (e.g., the new home security system) is a replacement of the target device (e.g., an older, outdated security system from a different company, which, although outdated, the speech recognition algorithms and training can be applied to the new home security system).

Referring again to FIG. 12B, operation 710 may include operation 1218 depicting facilitating transmission of modified adaptation data to the receiving device, which is connected to the target device via a network. For example, FIG. 6, e.g., FIG. 6B, shows at least at least a portion of modified adaptation data transmission to receiving device connected to the target device via a network facilitating module 618 facilitating transmission of modified adaptation data (e.g., an updated phrase completion algorithm) to the receiving device (e.g., a portable tablet device), that is connected to the target device (e.g., a home computer) via a network (e.g., a local area network provided by a router operating in the house).

Referring again to FIG. 12B, operation 710 may include operation 1220 depicting facilitating transmission of modified adaptation data to the receiving device, which is configured to communicate via a same network as the target device. For example, FIG. 6, e.g., FIG. 6B, shows at least a portion of modified adaptation data transmission to receiving device communicating on a same network as the target device facilitating module 620 facilitating transmission of modified adaptation data (e.g., a pronunciation dictionary) to the receiving device (e.g., a speech-enabled copier/scanner machine on a separate floor of an office building), that is configured to communicate via a same network (e.g., a company intranet) as the target device (e.g., the user's work computer where the user dictates her word processing, and then goes down to the copier to have copies made of the documents she generates).

Referring again to FIG. 12B, operation 710 may include operation 1222 depicting facilitating transmission of modified adaptation data to the receiving device, which is configured to perform a same function as the target device. For example, FIG. 6, e.g., FIG. 6B, shows at least a portion of modified adaptation data transmission to receiving device configured to perform a same function as the target device facilitating module 622 facilitating transmission of modified adaptation data (e.g., a noise level dependent filtration algorithm with a parameter changed) to the receiving device (e.g., a new speech input-enabled television), that is configured to perform a same function (e.g., playing television) as the target device (e.g., an Apple TV with speech-enabled input).

Referring again to FIG. 12B, operation 710 may include operation 1224 depicting facilitating transmission of modified adaptation data to the receiving device, which is a same type as the target device. For example, FIG. 6, e.g., FIG. 6B, shows at least a portion of modified adaptation data transmission to receiving device of a same type as the target device facilitating module 624 facilitating transmission of modified adaptation data (e.g., a modified pronunciation dictionary, modified to increase a counter showing how many times each word's pronunciation has been looked up) to the receiving device (e.g., the motor vehicle with an in-vehicle voice command system), which is a same type as the target device (e.g., a different motor vehicle that the user previously owned).

Figure 12C:
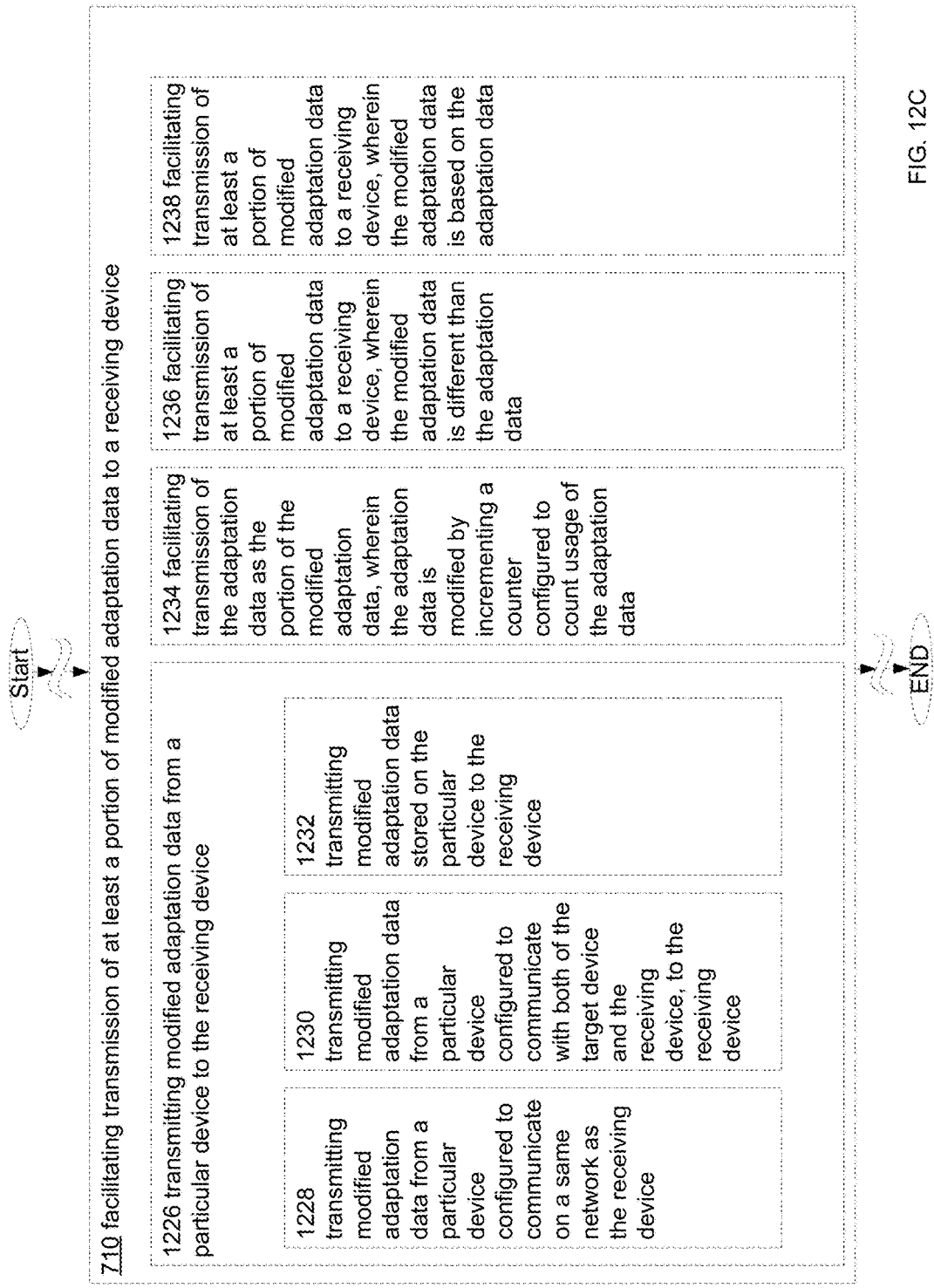
FIG. 12C is a high-level logic flowchart of a process depicting alternate implementations of an adaptation data portion transmission facilitating operation 710 of FIG. 7.

Referring now to FIG. 12C, operation 710 may include operation 1226 depicting transmitting modified adaptation data from a particular device to the receiving device. For example, FIG. 6, e.g., FIG. 6C, shows modified adaptation data transmitting from particular device to receiving device module 626 transmitting modified adaptation data (e.g., a pronunciation dictionary in which a counter indicating how many times the pronunciation dictionary was used has been incremented as a modification to the adaptation data) from a particular device (e.g., a user's smartphone) to the receiving device (e.g., a speech-enabled automated teller machine device).

Referring again to FIG. 12C, operation 1226 may include operation 1228 depicting transmitting modified adaptation data from a particular device configured to communicate on a same network as the receiving device. For example, FIG. 6, e.g., FIG. 6C, shows modified adaptation data transmitting from particular device configured to communicate on a same network as the receiving device module 628 transmitting modified adaptation data (e.g., a regional dialect application algorithm) from a particular device (e.g., a user's home computer) configured to communicate on a same network (e.g., a home network set up by a personal router connected to a Wide Area Network) as the receiving device (e.g., a speech enabled, integrated home theater system).

Referring again to FIG. 12C, operation 1226 may include operation 1230 depicting transmitting modified adaptation data from a particular device configured to communicate with both of the target device and the receiving device, to the receiving device. For example, FIG. 6, e.g., FIG. 6C, shows modified adaptation data transmitting from particular device configured to communicate with receiving device and target device module 630 transmitting modified adaptation data (e.g., a phrase completion algorithm with different path weights) from a particular device (e.g., a USB stick carried by a company worker, used to transmit adaptation data and/or other credentials to company property) configured to communicate with both of the target device (e.g., the company worker's regular computer in her office) and the receiving device (e.g., a check-out laptop available to company employees), to the receiving device (e.g., the check-out laptop).

Referring again to FIG. 12C, operation 1226 may include operation 1232 depicting transmitting modified adaptation data stored on the particular device to the receiving device. For example, FIG. 6, e.g., FIG. 6C, shows modified adaptation data stored on particular device transmitting from particular device to receiving device module 632 transmitting modified adaptation data (e.g., a syllable pronunciation database with updated pronunciations) stored on the particular device (e.g., a video game controller with a memory and a transmit/receive function) to the receiving device (e.g., a video game system).

Referring again to FIG. 12C, operation 710 may include operation 1234 depicting facilitating transmission of the adaptation data as the portion of the modified adaptation data, wherein the adaptation data is modified by incrementing a counter configured to count usage of the adaptation data. For example, FIG. 6, e.g., FIG. 6C, shows adaptation data, said adaptation data modified by incrementing a counter, as at least a portion of modified adaptation data transmission to receiving device facilitating module 634 facilitating transmission of the adaptation data (e.g., an accent-based pronunciation modification algorithm) as the portion of the modified adaptation data (e.g., the accent-based pronunciation modification algorithm is what is transferred, but the modified adaptation result data also includes a counter), wherein the adaptation data is modified by incrementing a counter configured to count usage (e.g., how many times the algorithm is selected and/or used) of the adaptation data (e.g., the accent-based pronunciation modification algorithm).

Referring again to FIG. 12C, operation 710 may include operation 1236 depicting facilitating transmission of at least a portion of modified adaptation data to a receiving device, wherein the modified adaptation data is different than the adaptation data. For example, FIG. 6, e.g., FIG. 6C, shows at least a portion of modified adaptation data, said modified adaptation data different than the adaptation data, transmission to receiving device facilitating module 636 facilitating transmission of at least a portion of modified adaptation data (e.g., particular words of a pronunciation dictionary) to a receiving device (e.g., a portable navigation system), wherein the modified adaptation data (e.g., particular words of a pronunciation dictionary) is different than the adaptation data (e.g., different words are chosen, although no words had a pronunciation change).

Referring again to FIG. 12C, operation 710 may include operation 1238 depicting facilitating transmission of at least a portion of modified adaptation data to a receiving device, wherein the modified adaptation data is based on the adaptation result data. For example, FIG. 6, e.g., FIG. 6C, shows at least a portion of modified adaptation data based on the adaptation data transmission to receiving device facilitating module 638 facilitating transmission of at least a portion of modified adaptation data (e.g., a list of one or more parameters to change in the speech processing algorithm) to a receiving device (e.g., a speech-enabled Blu-ray player), wherein the modified adaptation data (e.g., the list of parameters to change) is based on the adaptation result data (e.g., the result of the speech processing was used to determine which parameters to change, e.g., if heavy vowel words were taking longer to process, then a parameter for processing those words would be modified).

Figure 12D:
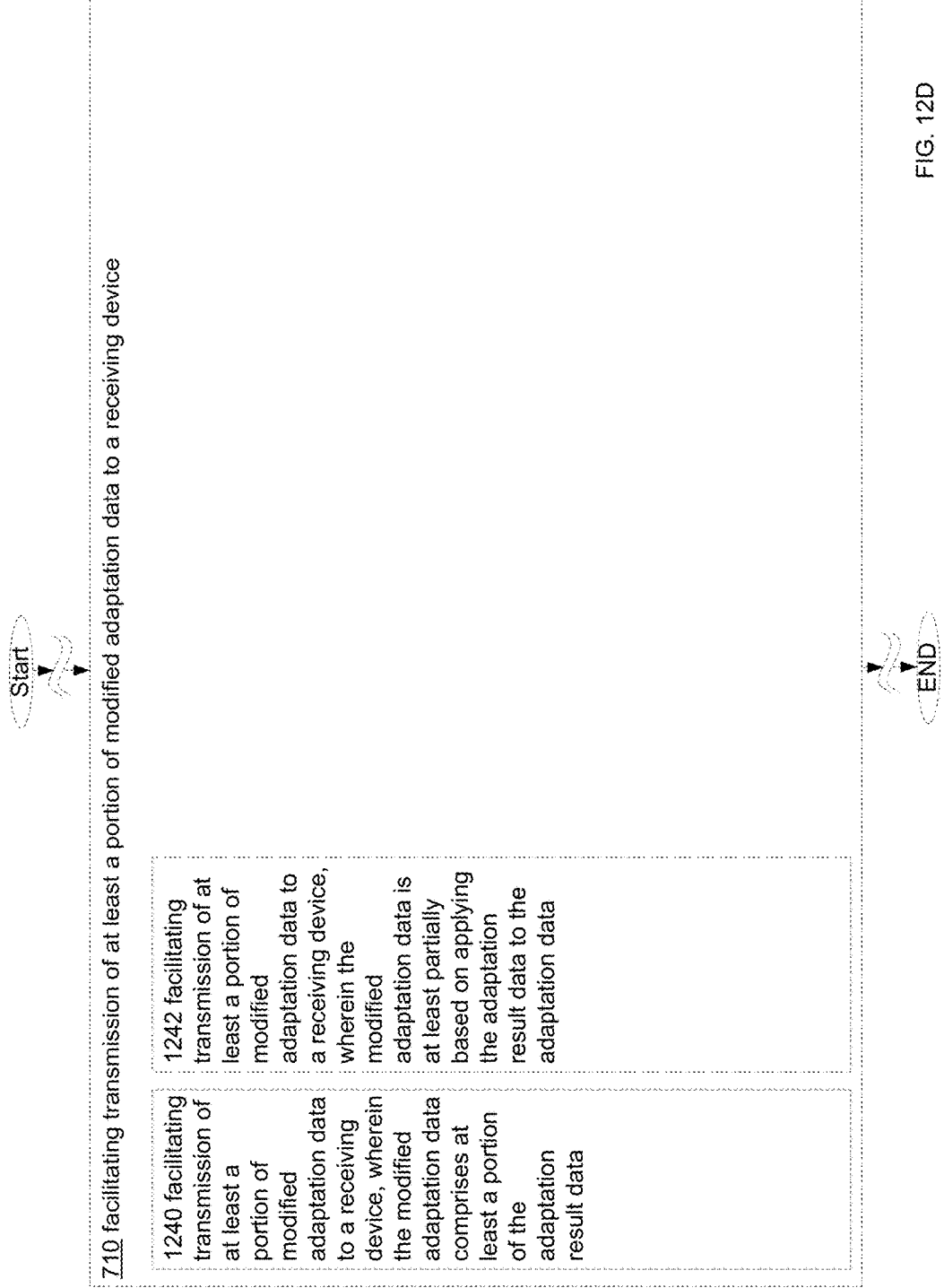
FIG. 12D is a high-level logic flowchart of a process depicting alternate implementations of an adaptation data portion transmission facilitating operation 710 of FIG. 7.

Referring now to FIG. 12D, operation 710 may include operation 1240 depicting facilitating transmission of at least a portion of modified adaptation data to a receiving device, wherein the modified adaptation data comprises at least a portion of the adaptation result data. For example, FIG. 6, e.g., FIG. 6D, shows at least a portion of modified adaptation data, said modified adaptation data including at least a portion of the adaptation result data, transmission to receiving device facilitating module 640 facilitating transmission (e.g., transmitting) of at least a portion of modified adaptation data (e.g., a pronunciation dictionary with a changed pronunciation of at least one word) to a receiving device (e.g., to a speech-enabled video game system), wherein the modified adaptation data (e.g., the pronunciation dictionary with a changed word pronunciation) comprises at least a portion (e.g., the changed pronunciation) of the adaptation result data (e.g., the adaptation result data included the way that the user was pronouncing the word "money," and that pronunciation was used to modify the adaptation data to change the pronunciation of the word "money" in the pronunciation dictionary to the way that the user most recently spoke the word "money" to the target device).

Referring again to FIG. 12D, operation 710 may include operation 1242 depicting facilitating transmission of at least a portion of modified adaptation data to a receiving device, wherein the modified adaptation data is at least partially based on applying the adaptation result data to the adaptation data. For example, FIG. 6, e.g., FIG. 6D, shows at least a portion of modified adaptation data, said modified adaptation data at least partially based on applying the adaptation result data, transmission to receiving device facilitating module 642 facilitating transmission (e.g., carrying out one or more actions to assist in transmitting, e.g., providing an address, e.g., an IP address, of the receiving device, so that data can be transmitted by a different device, e.g., a remote server with a web address, to the receiving device) of at least a portion of modified adaptation data (e.g., a phrase completion algorithm with modified path weights) to a receiving device (e.g., an automated teller machine device), wherein the modified adaptation data is at least partially based on applying the adaptation result data (e.g., a statistical analysis of which paths of the phrase completion algorithm led to high confidence of successful interpretation rates) to the adaptation data (e.g., the statistical analysis of the most effective paths is used to increase the path weights of the most effective paths in the phrase completion algorithm).

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "capable of being operably coupled", to each other to achieve the desired functionality. Specific examples of operably coupled include but are not limited to physically mateable and/or physically interacting components and/or wirelessly interactable and/or wirelessly interacting components and/or logically interacting and/or logically interactable components.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. In addition, although various operational flows are presented in a sequence(s), it should be understood that the various operations may be performed in other orders than those that are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A system comprising:
   circuitry configured to receive at least one property of a target device from the target device, the at least one property including at least a type of the target device;
   circuitry configured to select a subset of adaptation data associated with speech of a particular party based at least partly on the type of the target device, wherein the subset of the adaptation data includes pronunciation data for one or more words that have been linked to the type of the target device based at least partly on frequency of use of the one or more words during one or more prior speech-facilitated transactions of the particular party with one or more other target devices of the type;
   circuitry configured to transmit the subset of the adaptation data to the target device;
   circuitry configured to receive result data from the target device that is based at least partly on interpretation of speech of the particular party by the target device using the subset of the adaptation data; and
   circuitry configured to determine whether to modify the subset of the adaptation data that includes pronunciation data for the one or more words that have been linked to the type of the target device, at least partly based on the result data.

2. The system of claim 1, further comprising:
   circuitry configured to manage the adaptation data associated with speech of the particular party.

3. The system of claim 1, further comprising:
circuitry configured to selectively provide authorization to view the adaptation data.

4. The system of claim 1, wherein said circuitry configured to select a subset of adaptation data associated with speech of a particular party based at least partly on the type of the target device, wherein the subset of the adaptation data includes pronunciation data for one or more words that have been linked to the type of the target device based at least partly on frequency of use of the one or more words during one or more prior speech-facilitated transactions of the particular party with one or more other target devices of the type comprises:
circuitry configured to select a subset of adaptation data associated with a spoken language of a particular party based at least partly on the type of the target device, wherein the subset of the adaptation data includes pronunciation data for one or more words that have been linked to the type of the target device based at least partly on frequency of use of the one or more words during one or more prior speech-facilitated transactions of the particular party with one or more other target devices of the type.

5. The system of claim 1, wherein said circuitry configured to select a subset of adaptation data associated with speech of a particular party based at least partly on the type of the target device, wherein the subset of the adaptation data includes pronunciation data for one or more words that have been linked to the type of the target device based at least partly on frequency of use of the one or more words during one or more prior speech-facilitated transactions of the particular party with one or more other target devices of the type comprises:
circuitry configured to select a subset of adaptation data associated with speech of a particular party based at least partly on the type of the target device being a home device, wherein the subset of the adaptation data includes pronunciation data for one or more words that have been linked to the type of the target device based at least partly on frequency of use of the one or more words during one or more prior speech-facilitated transactions of the particular party with one or more other target devices of the type.

6. The system of claim 1, wherein said circuitry configured to select a subset of adaptation data associated with speech of a particular party based at least partly on the type of the target device, wherein the subset of the adaptation data includes pronunciation data for one or more words that have been linked to the type of the target device based at least partly on frequency of use of the one or more words during one or more prior speech-facilitated transactions of the particular party with one or more other target devices of the type comprises:
circuitry configured to select a subset of adaptation data associated with speech of a particular party based at least partly on the type of the target device and a processing capacity of the target device, wherein the subset of the adaptation data includes pronunciation data for one or more words that have been linked to the type of the target device based at least partly on frequency of use of the one or more words during one or more prior speech-facilitated transactions of the particular party with one or more other target devices of the type.

7. The system of claim 1, wherein said circuitry configured to select a subset of adaptation data associated with speech of a particular party based at least partly on the type of the target device, wherein the subset of the adaptation data includes pronunciation data for one or more words that have been linked to the type of the target device based at least partly on frequency of use of the one or more words during one or more prior speech-facilitated transactions of the particular party with one or more other target devices of the type comprises:
circuitry configured to select a subset of adaptation data associated with speech of a particular party based at least partly on the type of the target device and a speech processing capability of the target device, wherein the subset of the adaptation data includes pronunciation data for one or more words that have been linked to the type of the target device based at least partly on frequency of use of the one or more words during one or more prior speech-facilitated transactions of the particular party with one or more other target devices of the type.

8. The system of claim 1, further comprising:
circuitry configured to present the subset of the adaptation data for selection; and
circuitry configured to receive a selection of the subset of the adaptation data from the particular party.

9. The system of claim 1, wherein said circuitry configured to select a subset of adaptation data associated with speech of a particular party based at least partly on the type of the target device, wherein the subset of the adaptation data includes pronunciation data for one or more words that have been linked to the type of the target device based at least partly on frequency of use of the one or more words during one or more prior speech-facilitated transactions of the particular party with one or more other target devices of the type comprises:
circuitry configured to select a subset of adaptation data associated with speech of a particular party based at least partly on the type of the target device and one or more user preferences, wherein the subset of the adaptation data includes pronunciation data for one or more words that have been linked to the type of the target device based at least partly on frequency of use of the one or more words during one or more prior speech-facilitated transactions of the particular party with one or more other target devices of the type.

10. The system of claim 1, further comprising:
circuitry configured to select the target device.

11. The system of claim 1, wherein said circuitry configured to receive result data from the target device that is based at least partly on interpretation of speech of the particular party by the target device using the subset of the adaptation data comprises:
circuitry configured to receive result data from the target device that is based at least partly on a measure of success of interpretation of speech of the particular party by the target device using the subset of the adaptation data.

12. The system of claim 1, wherein said circuitry configured to receive result data from the target device that is based at least partly on interpretation of speech of the particular party by the target device using the subset of the adaptation data comprises:
circuitry configured to receive result data from the target device including at least one word improperly interpreted by the target device using the subset of the adaptation data.

13. The system of claim 1, wherein said circuitry configured to receive result data from the target device that is based at least partly on interpretation of speech of the particular party by the target device using the subset of the adaptation data comprises:
   circuitry configured to receive result data from the target device that is based at least partly on interpretation of speech of the particular party by the target device using the subset of the adaptation data, upon conclusion of a speech-facilitated transaction involving the target device.

14. The system of claim 1, wherein said circuitry configured to receive result data from the target device that is based at least partly on interpretation of speech of the particular party by the target device using the subset of the adaptation data comprises:
   circuitry configured to receive result data from the target device that is based at least partly on interpretation of speech of the particular party by the target device using the subset of the adaptation data, prior to completion of a speech-facilitated transaction involving the target device.

15. The system of claim 1, further comprising:
   circuitry configured to monitor a speech-facilitated transaction involving the target device and the particular party.

16. The system of claim 1, further comprising:
   circuitry configured to modify the adaptation data.

17. The system of claim 1, wherein said circuitry configured to receive result data from the target device that is based at least partly on interpretation of speech of the particular party by the target device using the subset of the adaptation data comprises:
   circuitry configured to receive result data from the target device including a voice sample.

18. The system of claim 1, further comprising:
   circuitry configured to transmit modified adaptation data to the target device.

19. The system of claim 1, further comprising:
   circuitry configured to transmit at least a portion of modified adaptation data to a receiving device.

20. The system of claim 1, further comprising:
   circuitry configured to transmit at least a portion of modified adaptation data to a receiving device that is of a same type as the type of the target device.

21. The system of claim 1, further comprising:
   circuitry configured to increment a counter at least partly based on the result data.

22. The system of claim 1, wherein the circuitry configured to transmit the subset of the adaptation data to the target device comprises:
   circuitry configured to transmit the subset of the adaptation data to the target device to enable application of the pronunciation data to interpret at least some of a speech-facilitated transaction between the particular party and the target device.

23. The system of claim 1, wherein the circuitry configured to transmit the subset of the adaptation data to the target device comprises:
   circuitry configured to transmit the subset of the adaptation data to the target device to reduce processing power load of the target device during speech recognition.

24. The system of claim 1, wherein the circuitry configured to receive result data from the target device that is based at least partly on interpretation of speech of the particular party by the target device using the subset of the adaptation data comprises:
   circuitry configured to receive word frequency data from the target device that is based at least partly on interpretation of speech of the particular party by the target device using the subset of the adaptation data.

25. The system of claim 1, wherein the circuitry configured to receive at least one property of a target device from the target device, the at least one property including at least a type of the target device comprises:
   circuitry configured to receive at least one property of a target device from the target device, the at least one property including at least a type of the target device and a mode of the target device.

26. The system of claim 25, wherein the circuitry configured to select a subset of adaptation data associated with speech of a particular party based at least partly on the type of the target device, wherein the subset of the adaptation data includes pronunciation data for one or more words that have been linked to the type of the target device based at least partly on frequency of use of the one or more words during one or more prior speech-facilitated transactions of the particular party with one or more other target devices of the type comprises:
   circuitry configured to select a subset of adaptation data associated with speech of a particular party based at least partly on the type of the target device and the mode of the target device, wherein the subset of the adaptation data includes pronunciation data for one or more words that have been linked to the type of the target device and the mode of the target device based at least partly on frequency of use of the one or more words during one or more prior speech-facilitated transactions of the particular party with one or more other target devices of the type.

27. The system of claim 1, wherein the circuitry configured to determine whether to modify the subset of the adaptation data that includes pronunciation data for the one or more words that have been linked to the type of the target device, at least partly based on the result data comprises:
   circuitry configured to determine whether to modify a selection of the one or more words that have been linked to the type of the target device, at least partly based on the result data.

28. A process implemented using at least one computer processor, the process comprising:
   receive at least one property of a target device from the target device, the at least one property including at least a type of the target device;
   select a subset of adaptation data associated with speech of a particular party based at least partly on the type of the target device, wherein the subset of the adaptation data includes pronunciation data for one or more words that have been linked to the type of the target device based at least partly on frequency of use of the one or more words during one or more prior speech-facilitated transactions of the particular party with one or more other target devices of the type;
   transmit the subset of the adaptation data to the target device;
   receive result data from the target device that is based at least partly on interpretation of speech of the particular party by the target device using the subset of the adaptation data; and
   determine whether to modify the subset of the adaptation data that includes pronunciation data for the one or more words that have been linked to the type of the target device, at least partly based on the result data.

29. A system comprising:
one or more computer readable media bearing one or more computer executable instructions;
at least one processor component configured by the one or more computer executable instructions to execute operations including at least:
receive at least one property of a target device from the target device, the at least one property including at least a type of the target device;
select a subset of adaptation data associated with speech of a particular party based at least partly on the type of the target device, wherein the subset of the adaptation data includes pronunciation data for one or more words that have been linked to the type of the target device based at least partly on frequency of use of the one or more words during one or more prior speech-facilitated transactions of the particular party with one or more other target devices of the type;
transmit the subset of the adaptation data to the target device;
receive result data from the target device that is based at least partly on interpretation of speech of the particular party by the target device using the subset of the adaptation data; and
determine whether to modify the subset of the adaptation data that includes pronunciation data for the one or more words that have been linked to the type of the target device, at least partly based on the result data.

* * * * *